US012373999B2

(12) United States Patent
Hirschfield et al.

(10) Patent No.: US 12,373,999 B2
(45) Date of Patent: Jul. 29, 2025

(54) USER INTERFACES FOR COLOR AND LIGHTING ADJUSTMENTS FOR AN IMMERSIVE CONTENT PRODUCTION SYSTEM

(71) Applicant: LUCASFILM ENTERTAINMENT COMPANY LTD., San Francisco, CA (US)

(72) Inventors: David Hirschfield, San Francisco, CA (US); Michael Jutan, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 594 days.

(21) Appl. No.: 17/716,384

(22) Filed: Apr. 8, 2022

(65) Prior Publication Data

US 2022/0343562 A1 Oct. 27, 2022

Related U.S. Application Data

(60) Provisional application No. 63/179,027, filed on Apr. 23, 2021.

(51) Int. Cl.
*G06T 11/00* (2006.01)
*G06F 3/04847* (2022.01)
(Continued)

(52) U.S. Cl.
CPC ........ *G06T 11/001* (2013.01); *G06F 3/04847* (2013.01); *G06T 7/90* (2017.01);
(Continued)

(58) Field of Classification Search
CPC ....... G06T 11/001; G06T 7/90; G06T 19/006; G06T 2207/10024; G06T 2219/2012;
(Continued)

(56) References Cited

U.S. PATENT DOCUMENTS 6,034,739 A 3/2000 Rohlfing et al.
6,201,579 B1 3/2001 Tamir et al.
(Continued)

FOREIGN PATENT DOCUMENTS

| JP | 6245567 B1 | 12/2017 |
| KR | 20180094253 A | 8/2018 |
| WO | 2014130458 A1 | 8/2014 |

OTHER PUBLICATIONS

U.S. Appl. No. 17/716,474, "Corrected Notice of Allowability", Aug. 18, 2023, 3 pages.
(Continued)

*Primary Examiner* — Molly Wilburn
(74) *Attorney, Agent, or Firm* — Kilpatrick Townsend & Stockton LLP

(57) ABSTRACT

In some implementations, a computing device in communication with an immersive content generation system may generate a first set of user interface elements configured to receive a first selection of a shape of a virtual stage light. In addition, the device may generate a second set of user interface elements configured to receive a second selection of an image for the virtual stage light. Also, the device may generate a third set of user interface elements configured to receive a third selection of a position and an orientation of the virtual stage light. Further, the generate a fourth set of user interface elements configured to receive a fourth selection of a color for the virtual stage light. Numerous other aspects are described.

13 Claims, 31 Drawing Sheets

(51) Int. Cl.
*G06T 7/90* (2017.01)
*G06T 19/00* (2011.01)
*H04N 23/50* (2023.01)

(52) U.S. Cl.
CPC ........... *G06T 19/006* (2013.01); *H04N 23/50* (2023.01); *G06T 2207/10024* (2013.01); *G06T 2219/2012* (2013.01)

(58) Field of Classification Search
CPC ..... G06T 11/00; G06F 3/04847; H04N 23/50; H04N 5/2224
See application file for complete search history.

(56) References Cited

U.S. PATENT DOCUMENTS

| | | | |
|---|---|---|---|
| 6,784,856 B2 | 8/2004 | Berstis | |
| 7,734,070 B1 | 6/2010 | Sharma et al. | |
| 7,817,006 B2 | 10/2010 | Fullerton et al. | |
| 8,062,126 B2 | 11/2011 | Marks et al. | |
| 9,121,577 B2 | 9/2015 | Hajjar et al. | |
| 9,188,839 B2 | 11/2015 | Rodriguez et al. | |
| 9,195,119 B2 | 11/2015 | Wendt | |
| 9,600,936 B2 | 3/2017 | Boivin et al. | |
| 9,619,931 B1 | 4/2017 | Klabunde | |
| 9,729,765 B2 | 8/2017 | Balakrishnan et al. | |
| 9,781,354 B2 | 10/2017 | Wooley et al. | |
| 10,373,342 B1* | 8/2019 | Perez, III | G06F 3/011 |
| 10,489,968 B1 | 11/2019 | Livingston et al. | |
| 10,553,036 B1 | 2/2020 | Perez, III et al. | |
| 10,567,641 B1 | 2/2020 | Rueckner | |
| 10,594,786 B1 | 3/2020 | Perez, III et al. | |
| 10,665,011 B1* | 5/2020 | Sunkavalli | G06N 3/084 |
| 10,666,856 B1 | 5/2020 | Rueckner | |
| 10,705,412 B2 | 7/2020 | Thomas | |
| 10,706,565 B2 | 7/2020 | Bellis et al. | |
| 10,732,797 B1 | 8/2020 | Perez, III et al. | |
| 10,756,773 B2 | 8/2020 | Kovacs | |
| 10,819,886 B2 | 10/2020 | Derry et al. | |
| 10,852,872 B2 | 12/2020 | Choi et al. | |
| 10,987,573 B2 | 4/2021 | Nietfeld et al. | |
| 11,036,299 B2 | 6/2021 | Choi et al. | |
| 11,086,395 B2 | 8/2021 | Okutani | |
| 11,107,195 B1 | 8/2021 | Cordes et al. | |
| 11,132,837 B2 | 9/2021 | Cordes et al. | |
| 11,132,838 B2 | 9/2021 | Cordes et al. | |
| 11,182,960 B2 | 11/2021 | Boivin et al. | |
| 11,200,752 B1 | 12/2021 | Cordes et al. | |
| 11,232,626 B2 | 1/2022 | Griffith | |
| 11,238,619 B1 | 2/2022 | Perez, III et al. | |
| 11,375,179 B1 | 6/2022 | Clemens et al. | |
| 11,403,769 B2 | 8/2022 | Warner | |
| 11,496,691 B2 | 11/2022 | Chapman et al. | |
| 11,507,039 B2 | 11/2022 | Grossman et al. | |
| 11,601,572 B2 | 3/2023 | Gordon et al. | |
| 2001/0035848 A1 | 11/2001 | Johnson et al. | |
| 2002/0109701 A1 | 8/2002 | Deering | |
| 2003/0174286 A1 | 9/2003 | Trumbull | |
| 2004/0223190 A1 | 11/2004 | Oka | |
| 2005/0072032 A1 | 4/2005 | Mccollum et al. | |
| 2005/0099603 A1 | 5/2005 | Thomas et al. | |
| 2007/0117625 A1 | 5/2007 | Marks et al. | |
| 2009/0002501 A1 | 1/2009 | Silsby et al. | |
| 2010/0229741 A1 | 9/2010 | Kerz et al. | |
| 2011/0134204 A1 | 6/2011 | Rodriguez et al. | |
| 2011/0157318 A1 | 6/2011 | Nalibotski | |
| 2011/0304735 A1 | 12/2011 | Van Eaton | |
| 2013/0002815 A1 | 1/2013 | Smoot et al. | |
| 2013/0182225 A1* | 7/2013 | Stout | G03B 15/10 352/89 |
| 2014/0378222 A1 | 12/2014 | Balakrishnan et al. | |
| 2015/0084951 A1 | 3/2015 | Boivin et al. | |
| 2015/0245020 A1 | 8/2015 | Meier et al. | |
| 2015/0250041 A1 | 9/2015 | Jobe et al. | |
| 2015/0350628 A1 | 12/2015 | Sanders et al. | |
| 2016/0005234 A1 | 1/2016 | Boivin et al. | |
| 2016/0048988 A1 | 2/2016 | Lee et al. | |
| 2016/0227132 A1 | 8/2016 | Wooley et al. | |
| 2016/0343166 A1 | 11/2016 | Inoko | |
| 2017/0076491 A1 | 3/2017 | Jiang et al. | |
| 2017/0078447 A1 | 3/2017 | Hancock et al. | |
| 2017/0078654 A1 | 3/2017 | Facin et al. | |
| 2017/0148217 A1 | 5/2017 | Poursohi et al. | |
| 2017/0204541 A1 | 7/2017 | Grossman et al. | |
| 2017/0237971 A1 | 8/2017 | Pitts | |
| 2017/0243406 A1 | 8/2017 | Yamazaki | |
| 2017/0249742 A1 | 8/2017 | Kadri et al. | |
| 2017/0339440 A1 | 11/2017 | Galpin et al. | |
| 2017/0358094 A1 | 12/2017 | Sun et al. | |
| 2018/0005430 A1 | 1/2018 | Griffith | |
| 2018/0031950 A1 | 2/2018 | Thomas | |
| 2018/0033210 A1* | 2/2018 | Vats | G06F 3/04815 |
| 2018/0157047 A1 | 6/2018 | Chapman et al. | |
| 2018/0165816 A1 | 6/2018 | Bellis et al. | |
| 2018/0322688 A1 | 11/2018 | Ozguner et al. | |
| 2018/0349008 A1* | 12/2018 | Manzari | H04N 23/64 |
| 2019/0015177 A1 | 1/2019 | Elazar et al. | |
| 2019/0066349 A1 | 2/2019 | Huang et al. | |
| 2019/0082118 A1 | 3/2019 | Wang et al. | |
| 2019/0098230 A1* | 3/2019 | Lovemelt | H04N 23/11 |
| 2019/0102949 A1 | 4/2019 | Sheftel et al. | |
| 2019/0114017 A1 | 4/2019 | Choi et al. | |
| 2019/0138107 A1 | 5/2019 | Nietfeld et al. | |
| 2019/0227419 A1 | 7/2019 | Mcnelley et al. | |
| 2019/0378326 A1 | 12/2019 | Ito | |
| 2020/0143592 A1 | 5/2020 | Cordes et al. | |
| 2020/0145644 A1 | 5/2020 | Cordes et al. | |
| 2020/0154059 A1 | 5/2020 | Derry et al. | |
| 2020/0265633 A1 | 8/2020 | Okutani | |
| 2021/0041955 A1 | 2/2021 | Choi et al. | |
| 2021/0110598 A1* | 4/2021 | Evans | G06F 3/011 |
| 2022/0005279 A1 | 1/2022 | Cordes et al. | |
| 2022/0067948 A1 | 3/2022 | Warner | |
| 2022/0076501 A1 | 3/2022 | Boivin et al. | |
| 2022/0101593 A1* | 3/2022 | Rockel | A63F 13/426 |
| 2022/0201269 A1 | 6/2022 | Atwell et al. | |
| 2022/0237819 A1 | 7/2022 | Kato et al. | |
| 2022/0272235 A1 | 8/2022 | Gordon et al. | |
| 2022/0343590 A1* | 10/2022 | Jutan | G06F 3/04847 |
| 2022/0343591 A1* | 10/2022 | Jutan | G06T 15/50 |
| 2022/0358720 A1 | 11/2022 | Kim et al. | |
| 2023/0154395 A1 | 5/2023 | Mcnelley et al. | |

OTHER PUBLICATIONS

GB2205399.5, "Office Action", Aug. 17, 2023, 4 pages.
U.S. Appl. No. 17/716,333, "Non-Final Office Action", Sep. 28, 2023, 11 pages.
U.S. Appl. No. 17/716,437, "Notice of Allowance", Oct. 2, 2023, 13 pages.
"Behind the Scenes with UE4's Next-Gen Virtual Production Tools—Project Spotlight—Unreal Engine", Available Online at: https://www.youtube.com/watch?v=Hjb-AqMD-a4&t=124s, Oct. 10, 2022, 7 pages.
U.S. Appl. No. 17/716,474, "Non-Final Office Action", Oct. 27, 2022, 28 pages.
GB2205399.5, "Combined Search and Examination Report", Oct. 12, 2022, 6 pages.
CA3,157,013, "Office Action", Mar. 26, 2024, 4 pages.
CA3,157,013, "Office Action", Jun. 6, 2023, 6 pages.
Joshi et al., "Image Deblurring Using Inertial Measurement Sensors", Association for Computing Machinery Transactions on Graphics, vol. 29, No. 4, Jul. 2010, pp. 1-9.
"Why 'The Mandalorian' Uses Virtual Sets Over Green Screen | Movies Insider", Insider, Available online at: :https://www.youtube.com/watch?v=Ufp8weYYDE8, Jun. 12, 2020.
U.S. Appl. No. 17/716,474, "Notice of Allowance", Mar. 24, 2023, 15 pages.
AU2022202424, "First Examination Report", Mar. 10, 2023, 5 pages.
U.S. Appl. No. 17/716,437, "Non-Final Office Action", Jun. 22, 2023, 8 pages.

(56) References Cited

OTHER PUBLICATIONS

Robertson, "Bounty-ful VFX", Available Online at: https://www.cgw.com/Publications/CGW/2020/Edition-1-2020/Bounty-ful-VFX.aspx, 2020, 17 pages.
Seymour, "Art of (LED Wall) Virtual Production Sets, Part Two: 'How you make one'", Available Online at: https://www.fxguide.com/fxfeatured/art-of-led-wall-virtual-production-sets-part-two-how-you-make-one/, 2020, 25 pages.
Seymour, "Art of LED Wall Virtual Production, Part One: Lessons from the Mandalorian", Available Online at: https://www.fxguide.com/fxfeatured/art-of-led-wall-virtual-production-part-one-lessons-from-the-mandalorian/, 2020, 18 pages.
AU2022202424, "Second Examination Report", Oct. 27, 2023, 8 pages.
NZ787202, "First Examination Report", Oct. 25, 2023, 4 pages.

\* cited by examiner

USER INTERFACES FOR COLOR AND LIGHTING ADJUSTMENTS FOR AN IMMERSIVE CONTENT PRODUCTION SYSTEM

RELATED APPLICATION(S)

This application claims priority to U.S. Provisional Patent Application Ser. No. 63/179,027, filed Apr. 23, 2021, entitled "Color And Lighting Adjustment For Immersive Content Production System," which is herein incorporated by reference in its entirety and for all purposes.

This application is related to U.S. Non-provisional application Ser. No. 17/716,333, now U.S. Pat. No. 11,978,154, entitled "SYSTEM AND TECHNIQUES FOR LIGHTING ADJUSTMENT FOR AN IMMERSIVE CONTENT PRODUCTION SYSTEM" by Jutan et al., which is incorporated herein by reference. This application is related to concurrently filed U.S. Non-provisional application Ser. No. 17/716,437, now U.S. Pat. No. 11,887,251, entitled "SYSTEM AND TECHNIQUES FOR PATCH COLOR CORRECTION FOR AN IMMERSIVE CONTENT PRODUCTION SYSTEM" by Jutan et al., which is incorporated herein by reference. This application is related to concurrently filed U.S. Non-provisional application Ser. No. 17/716,474, now U.S. Pat. No. 11,762,481, entitled "LIGHT CAPTURE DEVICE" by Jutan et al., which is incorporated herein by reference.

FIELD

The present disclosure generally relates to generating content using one or more displays configured for operation in an immersive content production system. In some embodiments, the images shown on the displays may be color corrected in real-time or at interactive frame rates. In addition, virtual lights can be generated using the interactive displays.

BACKGROUND

One method of creating a virtual reality experience can include surrounding a user with large display screens that present a virtual environment for the user. For example, an immersive content production system that can be used in production of movies and videos can include a stage or performance area that is at least partially enclosed with one or more walls and/or a ceiling each of which can be covered with display screens. One or more cameras can be placed in the performance area and live actors can interact with physical props placed on the stage, as well as with virtual elements displayed on the displays. Such immersive content production systems can present challenges.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method of content production may include receiving a first input from a user indicating a lighting value. The method can include receiving a second input indicating a region of an immersive virtual environment to which the lighting value is to be applied. The method can also include applying the lighting value to the region of the immersive virtual environment. The method can include outputting one or more images of the immersive virtual environment, the one or more images based, in part, on the input lighting value. Other embodiments of this aspect include corresponding computer systems, apparatus, and computer programs recorded on one or more computer storage devices, each configured to perform the actions of the methods.

Implementations may include one or more of the following features. The method may include receiving a selection of an image for a virtual light and generating the image for the virtual light in the region of the immersive virtual environment to which the lighting value is to be applied. In various embodiments, the lighting value may include an intensity value. In various embodiments, the lighting value may include a color value. In various embodiments, the lighting value may include a shape value. In various embodiments, the lighting value may include a softness value. In various embodiments, the method may include: receiving a third input from an user indicating a size value, the size value may include a height value, a width value, and a rotation value; applying the size value to the region of the immersive virtual environment; and outputting one or more images of the immersive virtual environment, the one or more images based, in part, on the size value.

In one general aspect, a non-transitory computer-readable medium may include one or more instructions that, when executed by one or more processors of a computing device, cause the computing device to perform operations that can include receiving a first input from a user indicating a lighting value. The operations can include receiving a second input indicating a region of an immersive virtual environment to which the lighting value is to be applied. The operations can include applying the lighting value to the region of the immersive virtual environment. The operations can include outputting one or more images of the immersive virtual environment, the one or more images based, in part, on the input lighting value. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the one or more instructions further cause the computing device to perform operations including receiving a selection of an image for a virtual light and generating the image for the virtual light in the region of the immersive virtual environment to which the lighting value is to be applied. In various embodiments, the lighting value may include an intensity value. In various embodiments, the lighting value may include a color value. In various embodiments, the lighting value may include a shape value. In various embodiments, the lighting value may include a softness value. In various embodiments, the one or more instructions further cause the computing device to perform operations including receiving a third input from an user indicating a size value, the size value may include a height value, a width value, and a rotation value; apply the size value to the region of the immersive virtual environment; and output one or more images of the immersive virtual environment, the one or more images based, in part, on the size value.

In one general aspect, a computing device may include one or more memories. The computing device may in addition include one or more processors, communicatively coupled to the one or more memories, configured to perform operations. The operations can include receiving a first input from a user indicating a lighting value. The operations can include receiving a second input indicating a region of an immersive virtual environment to which the lighting value is to be applied. The operations can include receiving applying the lighting value to the region of the immersive virtual environment. The operations can include outputting one or more images of the immersive virtual environment, the one or more images based, in part, on the input lighting value.

In various embodiments, the operations can include receiving a selection of an image for a virtual light and generating the image for the virtual light in the region of the immersive virtual environment to which the lighting value is to be applied.

In one aspect, a method may include generating a first set of user interface elements configured to receive a first selection of a shape of a virtual stage light. The method may include generating a second set of user interface elements configured to receive a second selection of an image for the virtual stage light. The method may also include generating a third set of user interface elements configured to receive a third selection of a position and an orientation of the virtual stage light. The method may further include generating a fourth set of user interface elements configured to receive a fourth selection of a color for the virtual stage light. Other embodiments of this aspect include corresponding computer systems, apparatus, and computer programs recorded on one or more computer storage devices, each configured to perform the actions of the methods.

Implementations may include one or more of the following features. In various embodiments, the method may include generating a fifth set of user interface elements configured to receive a fifth selection of at least one of an intensity, an exposure, a softness, and a roundness of the virtual stage light. In various embodiments, the shape of the virtual stage light may include one of a circle, a square, or a triangle. In various embodiments, the method may include generating a plurality of software switches. The software switches may include at least one of an active switch, an order switch, and a wrapping switch. In various embodiments, the plurality of software switches may include at least one of a show border switch, a color and opacity switch, a display transform switch, and a gamut transformation switch. In various embodiments, the third set of user interface elements configured to receive the third selection of the position and an orientation of the virtual stage light may include at least one of a rotation wheel, a latitude slider, a longitude wheel, a height slider, and a width slider. In various embodiments, the fourth set of user interface elements can be configured to receive the fourth selection of the color for the virtual stage light may include at least one of a color wheel, a plurality of Red Green Blue sliders, a plurality of Hue Saturation Value sliders, and a color temperature slider.

In one general aspect, method may include generating a first set of user interface elements configured to receive a first selection of an offset value for adjusting a color of a virtual object. The method may include generating a second set of user interface elements configured to receive a second selection of a gamma value for adjusting the color of the virtual object. The method may include generating a third set of user interface elements configured to receive a third selection of a gain value for adjusting the color of the virtual object. The method may further include generating a software switch for receiving a selection to enable or disable the offset value, the gamma value, and the gain value adjustments to the color of the virtual object. Other embodiments of this aspect include corresponding computer systems, apparatus, and computer programs recorded on one or more computer storage devices, each configured to perform the actions of the methods.

Implementations may include one or more of the following features. In various embodiments, the method may include generating a fourth set of user interface elements configured to receive a fourth selection of at least one of an exposure, a saturation, and a contrast of the virtual object. In various embodiments, the method may include generating a fifth set of user interface elements configured to receive a fifth selection of at least one of a mix, a softness, and a roundness of the virtual object. In various embodiments the method may include generating a plurality of software switches. The plurality of software switches may include at least one of a bounds switch, an all projectors switch, and an all cameras switch. In various embodiments, at least one of the first, the second, or the third set of user interface elements may include at least one of a color wheel, a plurality of Red Green Blue sliders, a plurality of Hue Saturation Value sliders, and a color temperature slider. In various embodiments, the method may include generating a brightness slider for at least one of the first set of user interface elements, the second set of user interface elements, and the third set of user interface elements.

In one aspect, a method may include generating a first set of user interface elements configured to receive a first selection of a color of a panosphere. A panosphere can be a 360-degree image that can be projected onto the surface of the walls or LED displays. In various embodiments, the method may in addition include generating a second set of user interface elements configured to receive a second selection of a position and an orientation of the panosphere. In various embodiments, the method may also include generating a window containing preview the panosphere. Other embodiments of this aspect include corresponding computer systems, apparatus, and computer programs recorded on one or more computer storage devices, each configured to perform the actions of the methods.

Implementations may include one or more of the following features. In various embodiments, the method may include generating a third set of user interface elements configured to receive a third selection of at least one of an exposure, a saturation, and a contrast of the panosphere. In various embodiments, the first set of user interface elements can be configured to receive the first selection of the color for the panosphere may include at least one of a color wheel, a plurality of Red Green Blue sliders, a plurality of Hue Saturation Value sliders, and a color temperature slider. In various embodiments, the second set of user interface elements can be configured to receive the second selection of the position and an orientation of the panosphere may include at least one of a pan wheel, a tilt wheel, and a height slider. In various embodiments, the method may include generating a switch to receive a selection to invert movement of direction of at least one of second set of user interface elements for the panosphere. In various embodiments, the method may include generating a switch to receive a selection for a fade to gray transition effect of the panosphere. In various embodiments, the method may include generating a software switch for receiving a selection to enable or disable adjustments to the panosphere.

Implementations of the described techniques may include hardware, a method or process, or a computer tangible medium.

In one general aspect, a computer-implemented method may include generating and presenting images of a virtual environment on one or more light-emitting diode (LED) displays at least partially surrounding a performance area. The computer-implemented method may include capturing a plurality of images of a performer or a physical object in the performance area along with at least some portion of the images of the virtual environment by a taking camera. The computer-implemented method may include identifying a color mismatch between a portion of the performer or the physical object and a virtual image of the performer or the physical object in the images of the virtual environment. The computer-implemented method may include generating a patch for the images of the virtual environment to correct the color mismatch. The computer-implemented method may include inserting the patch into the images of the virtual environment. The computer-implemented method may include generating content based on the plurality of captured images. Other embodiments of this aspect include corresponding computer systems, apparatus, and computer programs recorded on one or more computer storage devices, each configured to perform the actions of the methods.

In various embodiments, the patch can be displayed flat with respect to the one or more LED displays. In various embodiments, the computer-implemented method may include adjusting an intensity of the patch displayed on the one or more LED displays. In various embodiments, the computer-implemented method may include adjusting a position of the patch displayed on the one or more LED displays. In various embodiments, the computer-implemented method may include adjusting an orientation of the patch displayed on the one or more LED displays. In various embodiments, the computer-implemented method may include adjusting an exposure of the patch displayed on the one or more LED displays. In various embodiments, the computer-implemented method may include adjusting a size of the patch displayed on the one or more LED displays.

In an aspect of the disclosure, a non-transitory computer-readable medium may include one or more instructions that, when executed by one or more processors of a computing device, cause the computing device to perform operations. The operations can include generating and presenting images of a virtual environment on one or more light-emitting diode (LED) displays at least partially surrounding a performance area. The operations can include capturing a plurality of images of a performer or a physical object in the performance area along with at least some portion of the images of the virtual environment by a taking camera. The operations can include identifying a color mismatch between a portion of the performer or the physical object and a virtual image of the performer or the physical object in the images of the virtual environment. The operations can include generating a patch for the images of the virtual environment to correct the color mismatch. The operations can include inserting the patch into the images of the virtual environment. The operations can include generating content based on the plurality of captured images. Other embodiments of this aspect include corresponding computer systems, apparatus, and computer programs recorded on one or more computer storage devices, each configured to perform the actions of the methods.

In various embodiments, the patch can be displayed flat with respect to the one or more LED displays. In various embodiments, the operations can include adjusting an intensity of the patch displayed on the one or more LED displays. In various embodiments, the operations can include adjusting a position of the patch displayed on the one or more LED displays. In various embodiments, the operations can include adjusting an orientation of the patch displayed on the one or more LED displays. In various embodiments, the operations can include adjusting an exposure of the patch displayed on the one or more LED displays. In various embodiments, the operations can include adjusting a size of the patch displayed on the one or more LED displays.

In one aspect, an immersive content generation system may include one or more memories. Immersive content generation system may in addition include one or more processors, communicatively coupled to the one or more memories, configured to perform operation. The operations can include generating and presenting images of a virtual environment on one or more light-emitting diode (LED) displays at least partially surrounding a performance area. The operations can include capturing a plurality of images of a performer or a physical object in the performance area along with at least some portion of the images of the virtual environment by a taking camera. The operations can include identifying a color mismatch between a portion of the performer or the physical object and a virtual image of the performer or the physical object in the images of the virtual environment. The operations can include generating a patch for the images of the virtual environment to correct the color mismatch. The operations can include inserting the patch into the images of the virtual environment. The operations can include generating content based on the plurality of captured images. Other embodiments of this aspect include corresponding computer systems, apparatus, and computer programs recorded on one or more computer storage devices, each configured to perform the actions of the methods.

In various embodiments, the patch is displayed flat with respect to the one or more LED displays. In various embodiments, the operations can include adjusting an intensity of the patch displayed on the one or more LED displays. In various embodiments, the operations can include adjusting a position of the patch displayed on the one or more LED displays. In various embodiments, the operations can include adjusting an orientation of the patch displayed on the one or more LED displays. In various embodiments, the operations can include adjusting an exposure of the patch displayed on the one or more LED displays.

In one general aspect, an apparatus may include a housing enclosing a circuitry. The circuitry may include a processor and a memory. The housing can form a handgrip. The apparatus can include a plurality of light sensors arranged in a particular configuration. Each of the plurality of light sensors can be coupled to an exterior the housing via a sensor arm. The apparatus can include one or more controls mounted on the exterior of the housing. The controls can be electrically coupled to the circuitry. Other embodiments of this aspect include corresponding computer systems, apparatus, and computer programs recorded on one or more computer storage devices, each configured to perform the actions of the methods.

Implementations may include one or more of the following features. The apparatus can include one or more antenna mounted on an exterior of the housing. The apparatus can include a transmitter connected to the circuitry and electrically connected to the one or more antenna to send data from the apparatus via a wireless protocol. In various embodiments, the wireless protocol can be one of Bluetooth, Bluetooth Low Energy, or Wi-Fi. In various embodiments, the apparatus can include an electronic device for mounting an electronic device to the housing. The electronic device can be configured to execute an application for an immersive content generation system. In various embodiments, the apparatus may include one or more universal mounts coupled to the exterior of the housing. In various embodiments, the particular configuration includes a first light sensor mounted to a first sensor arm that is mounted perpendicular to the handgrip on an opposite side of the housing. The particular configuration can include a plurality of additional sensor arms with additional light sensors mounted thereon. The additional sensor arms can be mounted to the opposite side of the housing of the handgrip. The additional sensor arms can be mounted at distinct angles above and below the first sensor arm. The additional light sensors can be distributed in a distinct pattern. In various embodiments, the apparatus may include a trigger switch formed as part of the handgrip. The trigger switch can be coupled with the circuitry. In various embodiments, the plurality of light sensors can be active sensors.

In one aspect, a light capture device can include a body enclosing a circuitry. The circuitry can include a processor and a memory. The body can form a handgrip. In various embodiments, the light capture device can include a plurality of light sensors arranged in a particular configuration. Each of the plurality of light sensors can be coupled to an exterior the body via a sensor arm. The light capture device can include one or more controls mounted on the exterior of the body and electrically coupled to the circuitry. Other embodiments of this aspect include corresponding computer systems, apparatus, and computer programs recorded on one or more computer storage devices, each configured to perform the actions of the methods.

In various embodiments, the light capture device can include one or more antenna mounted on an exterior of the body. In various embodiments, the light capture device can include a transmitter connected to the circuitry and electrically connected to the one or more antenna to send data from the light capture device via a wireless protocol. In various embodiments, the wireless protocol can be one of Bluetooth, Bluetooth Low Energy, or Wi-Fi. In various embodiments, the light capture device may include an electronic device mount configured to attach an electronic device to the body. The electronic device can be configured to execute an application for an immersive content generation system. In various embodiments the light capture device may include one or more universal mounts coupled to the exterior of the body. The universal mounts can be configured for mounting a crown of light sensors. The crown can include a plurality of light sensors. In various embodiments, the particular configuration includes a first light sensor mounted to a first sensor arm that is mounted perpendicular to the handgrip on an opposite side of the body. The particular configuration can include a plurality of additional sensor arms with additional light sensors mounted thereon. The additional sensor arms can be mounted to the opposite side of the body of the handgrip. The additional sensor arms can be mounted at distinct angles above and below the first sensor arm. The additional light sensors can be distributed in a distinct pattern. In various embodiments, the light capture device can include a trigger switch formed as part of the handgrip. The trigger switch can be coupled with the circuitry. In various embodiments, the plurality of light sensors can be active sensors. Implementations of the described techniques may include hardware, a method or process, or a computer tangible medium.

In one general aspect, a light capture device may include a housing molded to form a handgrip enclosing a circuit. The circuit may include one or more processors connected to a bus, a memory connected to the bus, and a wireless transceiver with at least one antenna connected to the bus. The light capture device may also include a battery. The light capture device may include a plurality of markers arranged in a predetermined configuration. Each of the plurality of markers can be coupled to an exterior surface the housing via a sensor arm. The light capture device can include one or more controls mounted on the exterior surface of the housing and electrically coupled to the circuit. Other embodiments of this aspect include corresponding computer systems, apparatus, and computer programs recorded on one or more computer storage devices, each configured to perform the actions of the methods.

In various embodiments, the wireless transceiver can transmit data via a wireless protocol that can include at least one of Bluetooth, Bluetooth Low Energy, or Wi-Fi. The light capture device can include an electronic device mount configures to removably couple an electronic device to the exterior surface of the housing. The electronic device can be configured to execute an application for an immersive content generation system.

In various embodiments, the light capture device can include one or more universal mounts coupled to the exterior surface of the housing. The universal mounts can be configured for mounting an accessory. In various embodiments, the predetermined configuration can include a first light marker mounted to a first sensor arm that is mounted perpendicular to the handgrip on an opposite side of the housing. The predetermined configuration can include a plurality of additional markers arms with additional markers mounted thereon. The additional sensor arms can be mounted to the opposite side of the housing of the handgrip. The additional markers can be mounted at distinct angles above and below the first sensor arm. The additional markers can be distributed in a distinct pattern. In various embodiments, the light capture device can include a trigger switch formed as part of a handgrip formed as part of the exterior surface of the housing. The trigger switch can be coupled with the circuit. In various embodiments, the plurality of markers can reflect light and are detected by a plurality of motion cameras to determine a location of the light capture device.

These and other embodiments are described in detail below. For example, other embodiments are directed to systems, devices, and computer readable media associated with methods described herein.

To better understand the nature and advantages of the present invention reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

Figure 1:
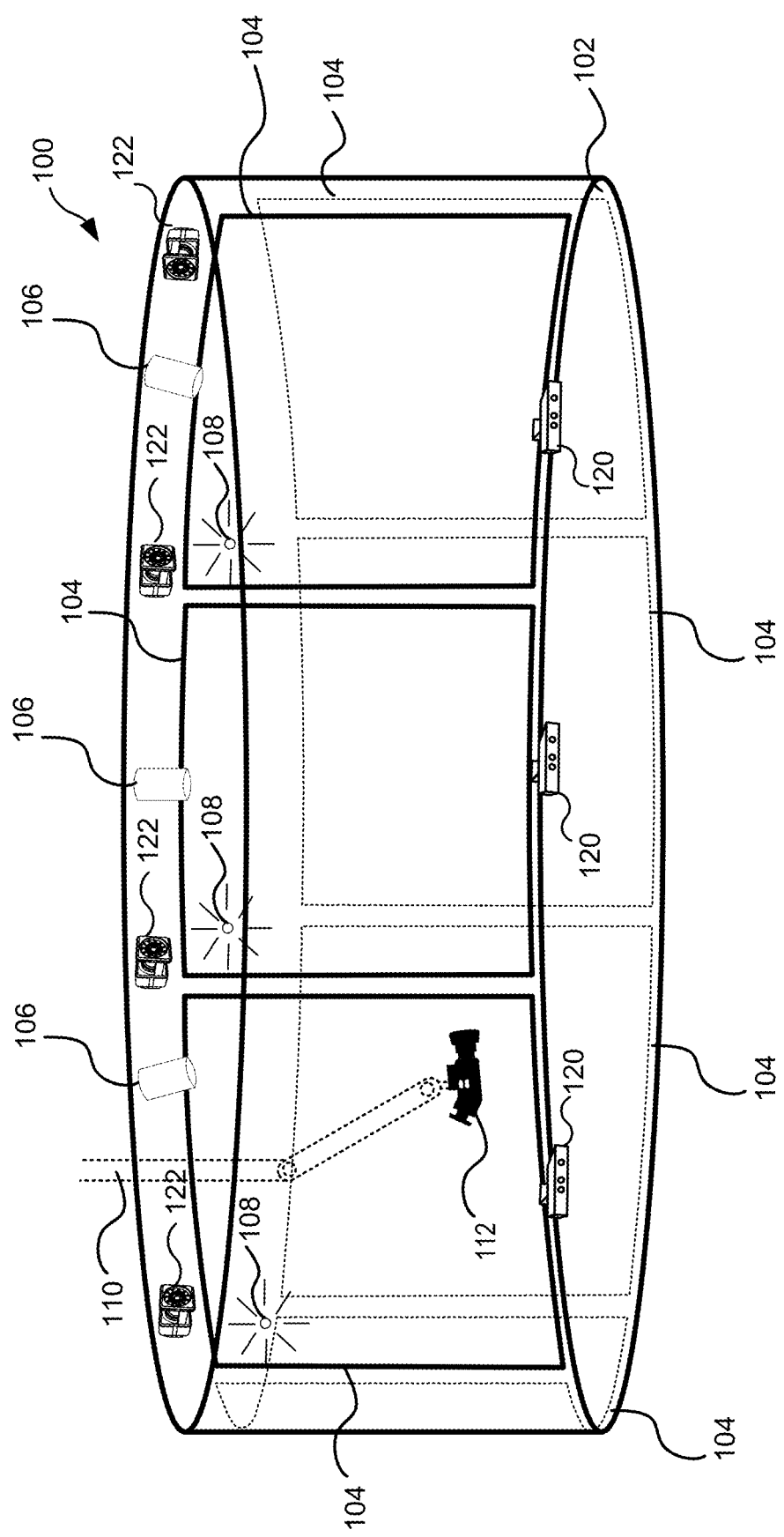
FIG. 1 illustrates an immersive content production system according to some embodiments.

Like reference, symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc., or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following detailed description of example implementations refers to the accompanying drawings. The same reference numbers in different drawings may identify the same or similar elements.

Embodiments are directed at an immersive content production system that includes a plurality of displays. Immersive content (e.g., virtual reality content, mixed reality content, augmented reality content, content configured for immersive caves/walls, etc.) may be leveraged as part of a system used by users (e.g., artists, engineers, technicians, directors, and other individuals involved in content production) in order to generate content (e.g., movies, television programming, online or streamed videos, etc.). As described herein, the immersive content production system may also be referred to as simply the content production system or production system.

In one aspect, the immersive content production system presents images in real-time or at interactive frame rates (e.g., 24, 30, 60, 120, or 240 frames per second) to users of the content production system. The images may be presented over immersive devices (e.g., virtual reality goggles and augmented reality glasses) or via an immersive environment, such as an immersive "cave" or one or more immersive "walls" (e.g., a performance area partially or completely surround with image displays). In one embodiment, the immersive environment may include a performance area, such as a stage. The performance area may be partially or completely surrounded by light emitting diode (LED) or liquid crystal display (LCD) display screens. For example, the performance area may include one or more walls and a ceiling of LED display screens enclosing or surrounding the performance area. Alternatively, the performance area may be partially or completely surrounded by projector screens. A set of projectors may additionally be configured to generate images on the projector screens. In some embodiments, the performance area may be partially or completely surrounded by a combination of LED or LCD display screens and projector screens. In some embodiments, the content production system may obtain virtual environment content and display the content on the image displays around the performance area. In this way, a performer/actor in the performance area may appear to be within the virtual environment. In some embodiments, the images displayed by the images displays are primarily background content (e.g., trees, buildings, the sun, etc.).

In various embodiments, the content production system can include one or more cameras usable for capturing a performance being performed by a performer in the performance area. The performance area may be, for example, a movie/television set, stage, stadium, park, etc. During the performance, the content production system may detect the motion and/or positioning of the performer. Such detection may be based on markers or sensors worn by the performer, depth and/or other motion detection sensors of the content production system (e.g., light detection and ranging (LIDAR)), motion capture cameras, etc. For example, an array of depth sensors may be positioned in proximity to and directed at the performance area. For instance, the depth sensors may surround the perimeter of the performance area. In some embodiments, the depth sensors measure the depth of different parts of the performer in the performance area over the duration of a performance. The depth information may then be stored and used by the content production system to determine the positioning of the performer over the performance.

In certain embodiments, a taking camera can be aimed at the performance area may capture the performance of the performer as well as the virtual environment displayed by the image displays (e.g., LED displays) behind the performer. In some embodiments, sensors may be used to determine the position and orientation of the taking camera during a performance. For example, Global Navigation Satellite System (GNSS) based sensors may be attached to the taking camera to determine its position within or relative to the performance area. As another example, other cameras may be directed at the taking camera configured to capture the performance. One or more markers may be attached to the taking camera. During a performance, the other cameras may capture images of the taking camera as the taking camera is moved and/or oriented during the performance. The production system may use the images captured of the taking camera to determine the movement and orientation of the taking camera during the performance. Such information may be used to support the content production process. For example, such information regarding the orientation and movement of the taking camera may be used to determine the distance of the taking camera from the performer over a performance. Based on the orientation and movement (and other attributes such as lens aperture and focal length) of the taking camera, the content production system may adjust the virtual environment displayed by the immersive cave or walls in real-time or at interactive frame rates to correspond to orientation and position of the camera. In this way, images of the virtual environment can be perspective-correct over a performance of the performer.

According to some embodiments, methods, and systems of color calibration and adjustment for a content production system are provided. For example, immersive content (e.g., virtual reality content, mixed reality content, augmented reality content, and the like) can be leveraged as part of a content production system used by users (e.g., artists, engineers, technicians, directors, and other individuals involved in content production) in order to generate content (e.g., movies, television programming, online or streaming videos, and the like). To configure such a content production system, the lighting and color provided by displays surrounding the performance area can be advantageously calibrated and adjusted so that the performers, physical items in the performance area, and virtual items shown on the screen can have a selected lighting and color.

Embodiments described herein provide for applying lighting and or color adjustments made to the virtual environment. Various graphical user interfaces are described that can be used by an operator to make adjustments to color and lighting of virtual environment images, generate virtual stage lights, create attached and unattached green screens, generate two-dimensional (2D) virtual objects (e.g., stickers) and/or trigger virtual effects from a tablet computing device. A light measuring device is also disclosed to determine lighting and color values generated by the displays of the immersive cave/wall. The light measuring device may provide information regarding the measured light and color values to the content production system.

FIG. 1 is a simplified illustration of an immersive content production system 100 according to some embodiments. The immersive content production system 100 can include a performance area 102 that is partially or completely surrounded by image displays 104 (also referred to herein as just "displays"). The immersive content production system 100 can obtain virtual content and display the virtual content on the displays 104.

The performance area 102 can be, for example, a movie or television set, a stage, a stadium, a park, or the like. In one aspect, the immersive content production system 100 presents images in real-time or at interactive frame rates to users of the immersive content production system 100 (e.g., performers within the performance area 102). Since the displays 104 surround or partially surround the performance area 102, the immersive content production system 100 can create an immersive environment (also referred to as an immersive "cave" or immersive "walls") for performances that take place within the performance area 102. In this way, an actor or actress performing within the performance area 102 can appear to be in a virtual environment.

In some embodiments, the displays 104 can include light emitting diode (LED) display screens or liquid crystal display (LCD) display screens. For example, the performance area 102 can include one or more walls of LED or LCD displays 104 enclosing the performance area 102. Alternatively, the performance area 102 can be partially or completely surrounded by projector screens. A set of projectors can be configured to project images on the projector screens. In some embodiments, the performance area 102 can be surrounded by a combination of LED display screens, LCD display screens, and/or projector screens.

According to various embodiments, the displays 104 can have various sizes, and the performance area 102 can also have various sizes. In some embodiments the displays 104 can be 20-40 feet tall, and the performance area 102 can be, for example, between 50-100 feet in diameter. In some embodiments, the displays 104 can include multiple displays 104 that are generally fixed in position and mostly surround the performance area 102, along with additional moveable or mobile displays 104 that can be moved into positions that create an immersive environment that extends completely or almost completely (i.e., 300-360 degrees) around the performance area 102. As an example, in one embodiment, fixed position displays 104 can extend approximately 270 degrees around the performance area 102, while moveable displays 104 can be used to augment the fixed position displays to further extend the immersive environment up to 320 degrees or up to 360 degrees around the performance area. Additionally, while not shown in FIG. 1, in some embodiments, the immersive content production system 100 can further include one or more displays 104 as a ceiling on the performance area 102 and/or as part of the floor of the performance area 102. Also, while for ease of illustration, the displays 104 are shown in FIG. 1 as having a small space or gap 105 between adjacent displays 104, the displays 104 can be installed so as to be seamless, with less than a threshold distance or even no space between adjacent displays 104. In some instances, the displays 104 may be curved.

A taking camera 112 can be attached to a rig 110 and can be aimed at the performance area 102 to capture the performance of a performer as well as the virtual environment displayed on the displays 104. In some embodiments, sensors can be used to determine the position and orientation of the taking camera 112 during a performance. For example, GPS based sensors (not shown) can be attached to the taking camera 112 to determine its position within or relative to the performance area 102.

In some embodiments, other cameras (e.g., motion capture, and/or alignment cameras 122 discussed below) can be directed at the taking camera 112 and/or configured to capture the performance. One or more markers can be attached to the taking camera 112. During a performance, the other cameras can capture images of the taking camera 112 as the taking camera 112 is moved and oriented during the performance. The immersive content production system 100 can use the captured images of the taking camera 112 to determine the movement and orientation of the taking camera 112 during the performance. Such information can be used to support the content production process. For example, such information regarding the orientation and movement of the taking camera 112 can be used to determine the distance of the taking camera 112 from a performer over a performance. Based on the orientation and the movement (as well as other intrinsic attributes such as lens aperture and focal length) of the taking camera 112, the immersive content production system 100 can adjust the virtual environment displayed by the immersive cave or walls in real-time or at interactive frame rates to correspond to the orientation and the position of the taking camera 112. In this way, images of the virtual environment can be made perspective-correct with respect to the performance of the performer.

In some embodiments, the immersive cave or walls can include one or more lighting elements to provide lighting for performance area 102. For example, the immersive cave or walls can include supplemental LED lights 106 separate from the displays 104 that can light the performance area 102 (including the performer) and create various desired lighting effects. Thus, the LED lights 106 can have the ability to project lighting levels of different intensities and project such light from different locations around the stage. In some embodiments the additional LED lights 106 can be controlled during a performance in order to change the intensity of the lighting of performance area 102 (including the performer).

In some embodiments, additional lighting elements can be created within one or more portions of the various displays 104 that create the virtual environment. For example, instead of depicting the virtual environment in a portion of one or more of the displays 104 surrounding the performance area, that portion of the display 104 can simulate an LED light 108 that illuminates the performance area 102. The immersive content production system 100 can include multiple simulated lights 108. The location of each simulated light 108 on the displays 104 can be selected in order to achieve a desired lighting effect. The selection and placement of simulated lights 108 can be made by a director, lighting technician or other user of the immersive content production system 100, prior to the performance taking place within the performance area 102 and being filmed by the taking camera 112. The number and the location of the simulated lights 108 can be readily adjusted at any time during the performance.

Since the simulated lights 108 are created by the displays 104 and are thus part of the displays 104, such simulated lights 108 are also referred to as "embedded lights" or "virtual lights." The simulated lights 108 can be in addition to or instead of the supplemental lights 106. In some embodiments, the immersive content production system 100 can include simulated lights 108 without any supplemental lights 106. In some embodiments, the taking camera 112 that is capturing images of the performance area and/or the camera rigs 110 do not include any attached lights. For example, in some embodiments the taking camera 112 does not include a ring of LED lights or other form of lighting for illuminating the performance area 102.

In some embodiments, the immersive content production system 100 can further include one or more depth sensors 120 and/or one or more alignment cameras 122. The alignment cameras 122, also referred to as motion cameras, can capture motions in the performance area 102. During a performance, the immersive content production system 100 can detect the motion and/or the positions and the orientations of the performers within the performance area 102. The detection can be based on markers or sensors worn by a performer, as well as by the depth sensors 120 and/or by the alignment cameras 122. For example, an array of depth sensors 120 can be positioned in proximity to and directed at the performance area 102. For instance, the depth sensors 120 can surround the perimeter of the performance area. In some embodiments, the depth sensors 120 can measure the depth of different parts of a performer in the performance area 102 over the duration of a performance. The depth information can then be stored and used by the immersive content production system 100 to determine the positions of the performer over the course of the performance.

The depth sensors 120 can include a motion-sensing input device. The depth sensor 120 can include a monochrome complementary metal-oxide semiconductor (CMOS) sensor and an infrared projector. The infrared projector can project infrared light throughout the first performance area 102, and the CMOS sensor can measure the distance of each point of reflected infrared (IR) radiation in the performance area 102 by measuring a time it takes for the emitted infrared light to return to the CMOS sensor. Software in the depth sensors 120 can process the IR information received from the depth sensor 120 and use an artificial intelligence machine-learning algorithm to map the visual data and create three-dimensional (3-D) depth models of solid objects in the performance area 102. For example, the one or more depth sensors 120 can receive emitted infrared radiation to generate 3-D depth models of a performer, along with the floor, walls, and/or ceiling of the performance area 102. In one test embodiment, the performance area 102 was surrounded by six to eight Kinect® cameras to capture depth information of objects and performers in the performance area 102.

The alignment cameras 122 can be part of a motion capture system that can track the movement of performers or objects within the immersive content production system 100. The alignment cameras 122 can be used to support alignment of virtual assets and physical assets, as described in more detail below. In some instances, the alignment cameras 122 can be used to track the movement of the taking camera 112 and provide a location of the taking camera to the immersive content production system 100. The immersive content production system 100 can use this information to determine what portion of the displays 104 is to be rendered from the tracked position and the perspective of the taking camera 112.

Figure 2:
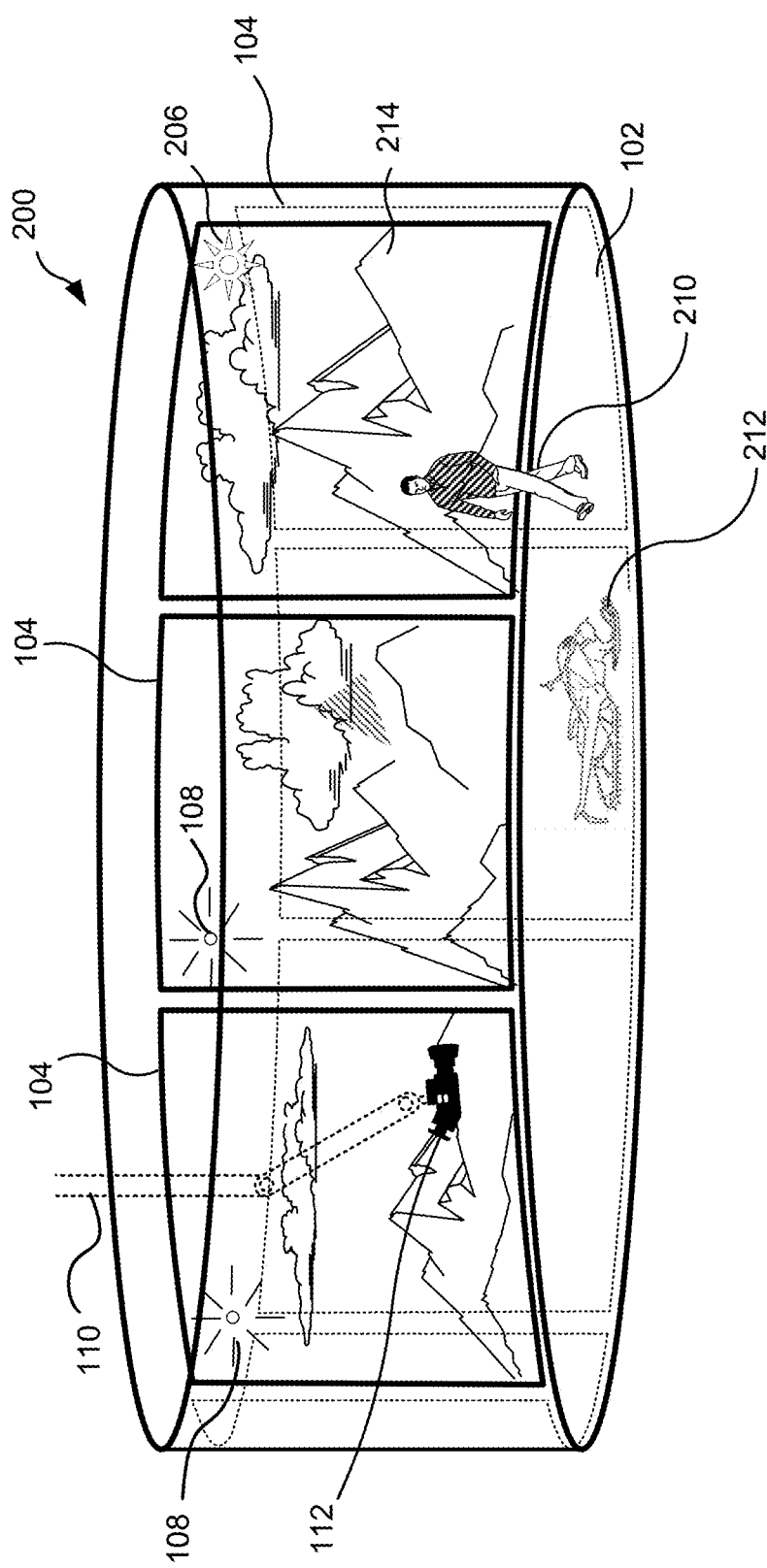
FIG. 2 illustrates an immersive content production system with a performer on the stage and scenery depicted on the image displays according to some embodiments.

FIG. 2 is a simplified illustration of an immersive content production system 200 according to some embodiments. The immersive content production system 200 can be similar to the immersive content production system 100, and thus includes many or all of the same components as described with respect to FIG. 1. As shown in FIG. 2, the immersive content production system 200 can include the performance area 102, the displays 104, the simulated lights 108, and the taking camera 112 attached to the rig 110.

In FIG. 2, a performer 210 is also shown within the performance area 102. The performance area 102 can include one or more physical props 212 (e.g., the snowmobile depicted in FIG. 2). Scenery images 214 of a virtual environment can be presented on the displays 104 to generate the immersive environment in which the performer 210 can conduct his or her performance (e.g., act out a scene in a movie being produced). In some embodiments, the scenery images 214 can be seamlessly presented across several displays 104 as described with respect to FIG. 1. The scenery images 214 can include one or more virtual light sources 206 that can be, for example, an image of a sun, a moon, stars, street lights, or other natural or manmade light sources displayed in the scenery images 214.

The scenery images 214 can also provide a background for the video content captured by the taking camera 112 (e.g., a visible light camera). The taking camera 112 can capture a view of performance area 202 from a certain perspective. In some embodiments, the taking camera 112 can be stationary, while in some other embodiments, the taking camera 112 can be mounted to a track 110 that can move the taking camera 112 during a performance.

Embodiments of the invention can generate and display perspective-correct images (as rendered from the tracked position and perspective of taking camera 112) onto portions of the surrounding image display walls that are within the field of view (i.e., the frustum) of the taking camera. Areas of the displays 104 outside the field of view of taking camera 112 can be displayed according to a global view perspective. Further details associated with generating and displaying content on displays 104 according to two different perspectives in accordance with some embodiments of the invention are discussed below.

I. Color Correction and Lighting Adjustment

Figure 3:
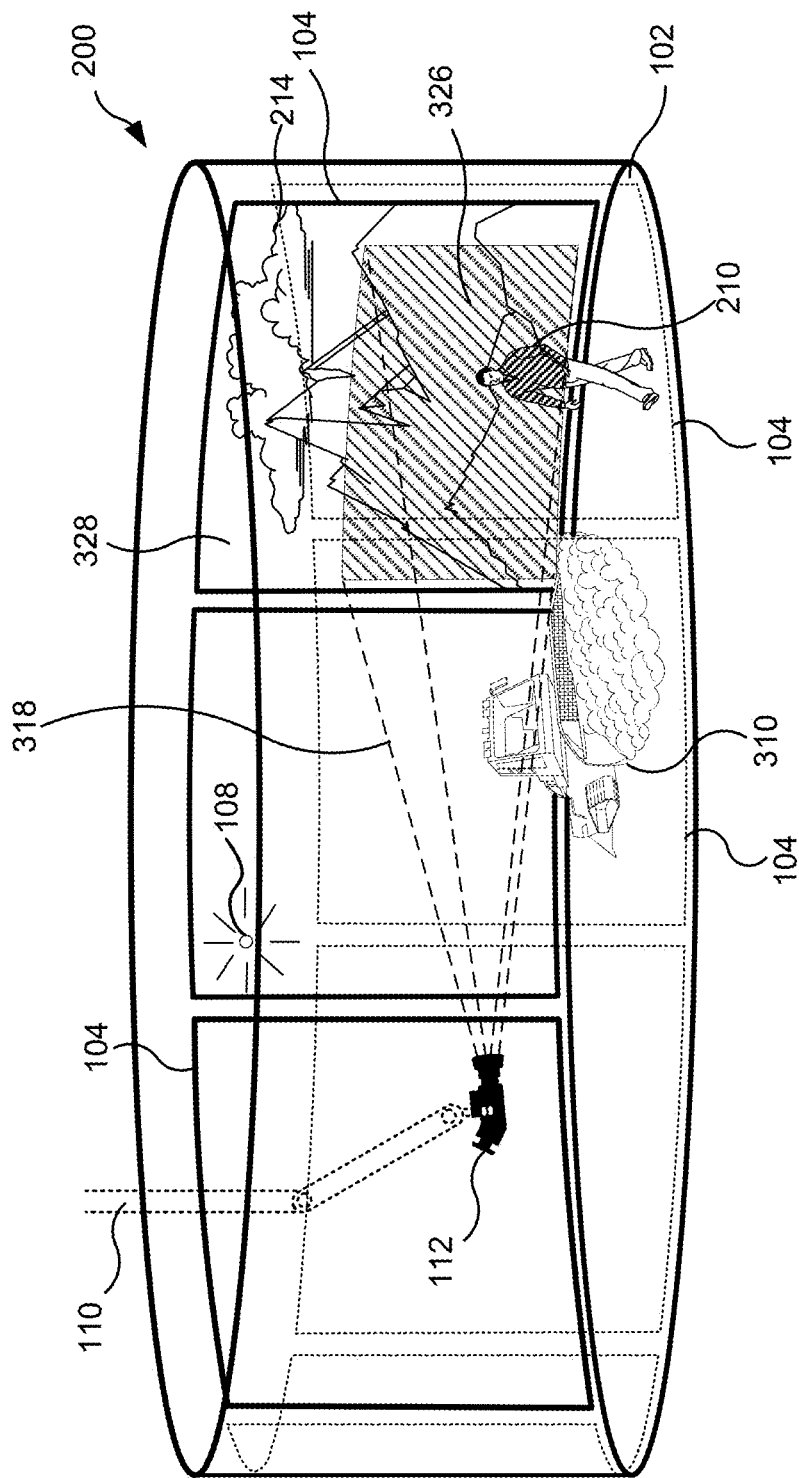
FIG. 3 illustrates an example of the frustum of a taking camera within the immersive content production system shown in FIG. 2.
Figure 4:
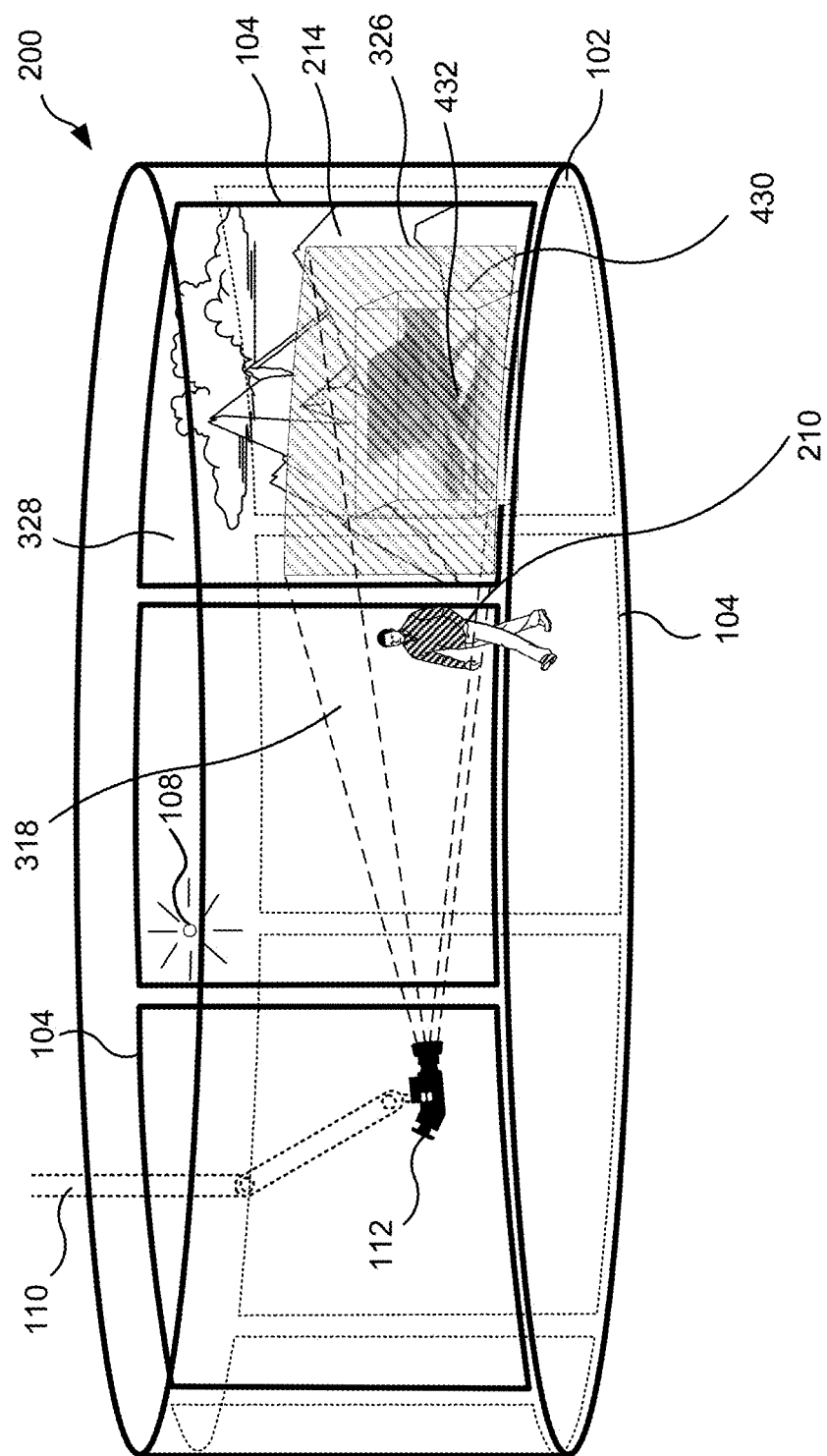
FIG. 4 illustrates an example of determining a volume of images within the frustum of the taking camera within the immersive content production system.

FIGS. 3 and 4 are simplified drawings of immersive environment production system 200 from FIG. 2. Shown in each of FIG. 3 and FIG. 4 is a frustum 318 of taking camera 112 within the content production system 200 that includes displays 104 that at least partially encircle a performance area 102 with a performer 210. Scenery images 214 can appear on the one or more displays 104. For three-dimensional (3D) graphics, the frustum of a camera, also known as a viewing frustum, can be the region of space in the modeled world that would appear on video taken from the taking camera 112. Thus, the frustum 318 is the field of view of the taking camera 112. The exact shape of viewing frustum 318 can vary and will depend on the lens of taking camera 112 but typically it is a frustum of a rectangular pyramid.

In creating the immersive environment presented on displays 104, immersive content production system 200 can render the portion within the frustum of the taking camera 112 differently than it renders the portion outside the frustum of the taking camera 112. For example, embodiments of the disclosure can render the portion 326 of the displays 104 that corresponds to frustum 318 as perspective-correct images that can update based on movement of the taking camera 112. For example, taking camera 112 can move during a performance as performer 210 moves or to capture the performer from a different angle. As the taking camera 112 moves, portions of the scenery images 214 within the viewing frustum 318 can be updated in accordance with the perspective of the camera. Portion 328 of the displays 104 outside of the frustum 318 can be rendered from a global view perspective and thus display relatively static images that do not change based on the movement of the taking camera 112.

In some embodiments, the images inside the frustum of the taking camera 112 can be at a higher resolution than the images outside the frustum. In some embodiments, the images displayed outside the frustum of the taking camera 112 can be relatively basic scenery images (e.g., blue sky, green grass, gray sea, or brown dirt.) In some instances the scenery images can be completely static. In other instances the scenery images 214 can dynamically change over time providing a more realistic background for the performance in the immersive content production system 200. For example, clouds can move slowly across the displays 104, branches of trees can blow in the wind, etc. to create realistic, life-like effects. Further, the scenery images 214 can dynamically change over time to represent changes in the environment over time.

In some instances, the colors of virtual objects (e.g., the performer 210 or snow cat 310) on a display 104 of the immersive cave or walls may not match or may become unsynchronized with the real world colors of the actors and physical objects within the performance area 102. For example, a performer 210 can be wearing a jacket that appears to be one color in the taking camera 112 and appears to be a different color or shade in the virtual environment. This could be a result of changing lighting patterns, light from the displays illuminating the actors, etc. As a result, content generated from images captured by the taking camera 112 may not appear realistic to viewers due to color discrepancies between the virtual and physical objects.

A set extension can provide an example of the color distortion for an immersive content generation system. For example, a set may have a checkerboard floor that extends into the display that portrays a bigger floor than the physical set. At some point the floor meets up against the LED wall. The LEDs on the wall will light up the real checkerboard floor. The lighting can result in a color mismatch unless the immersive content system is able to color correct the images in the display 104 to smooth out the seam between the physical floor and the virtual floor scenery images.

In order to have the colors of the displayed virtual objects, actors, and physical objects match visually, the content production system 200 may adjust the color of the virtual objects shown on the display in real-time (or at interactive frame rates) based on the color of the actors and physical objects in the earlier images (i.e., frames) of a given performance. In various embodiments, the technical supervisors and directors can view the images from the taking camera 112 via one or more monitors and detect the color mismatch.

More specifically, the content production system 200 may automatically or periodically receive input from a user to generate a set of three-dimensional (3D) volumes, such as volume 430 shown in FIG. 4. The 3D volumes may surround one or more virtual objects (e.g., a virtual spacecraft 432 in a virtual environment to be displayed on the displays 104 of the content production system 200. In various embodiments, all virtual objects within the volumes can receive color correction as defined by the parameters of the volume. For example, the immersive content production system can take the exposure of the color in a defined volume 430 down by half a stop. In some embodiments, the content generation system 200 may present an input tool to enable the user to draw or otherwise define the boundaries of the volumes 430.

In certain embodiments, the content generation system 200 may additionally or alternatively generate volumes 430 automatically. In some instances, the automatic generation of the volumes 430 may be based on the virtual position of the virtual objects within the virtual environment, tags or types associated with the virtual objects (e.g., all virtual objects with a certain tag may be contained within the same volume 430), an overall color or some other attribute of the virtual objects, etc. The technique of identifying the specific volumes that need correction saves computational power because the system does not need to determine what areas of the screen may have over lapping pixels and requiring the screen to be rendered multiple times to apply a color correction.

In an example, if a performer is standing in the middle of the performance area surrounded by displays showing a virtual world with Greek columns around the performer (e.g., 12 columns surrounding the performer). Each one of the columns can have a color correction capsule volume fully enclosing just that one column. The immersive content system could be running 12 different color corrections operations. Using a brute force method, the system could render the whole screen including the entire circle of LEDs 12 times over to account for all 12 of those color correction volumes. Using the techniques disclosed herein, the display area can be segmented up into multiple grid zones with each of the columns occupying a number of grids (e.g., three zones wide by ten zones tall). Whenever the system renders one of those grid zones, the system need only apply the color corrections for volumes that are occupied as grid zones. So now the system can apply all 12 of those color corrections in parallel. This process of color correction can be done in near real-time, with the color correction process being completed in a few milliseconds.

Figure 5:
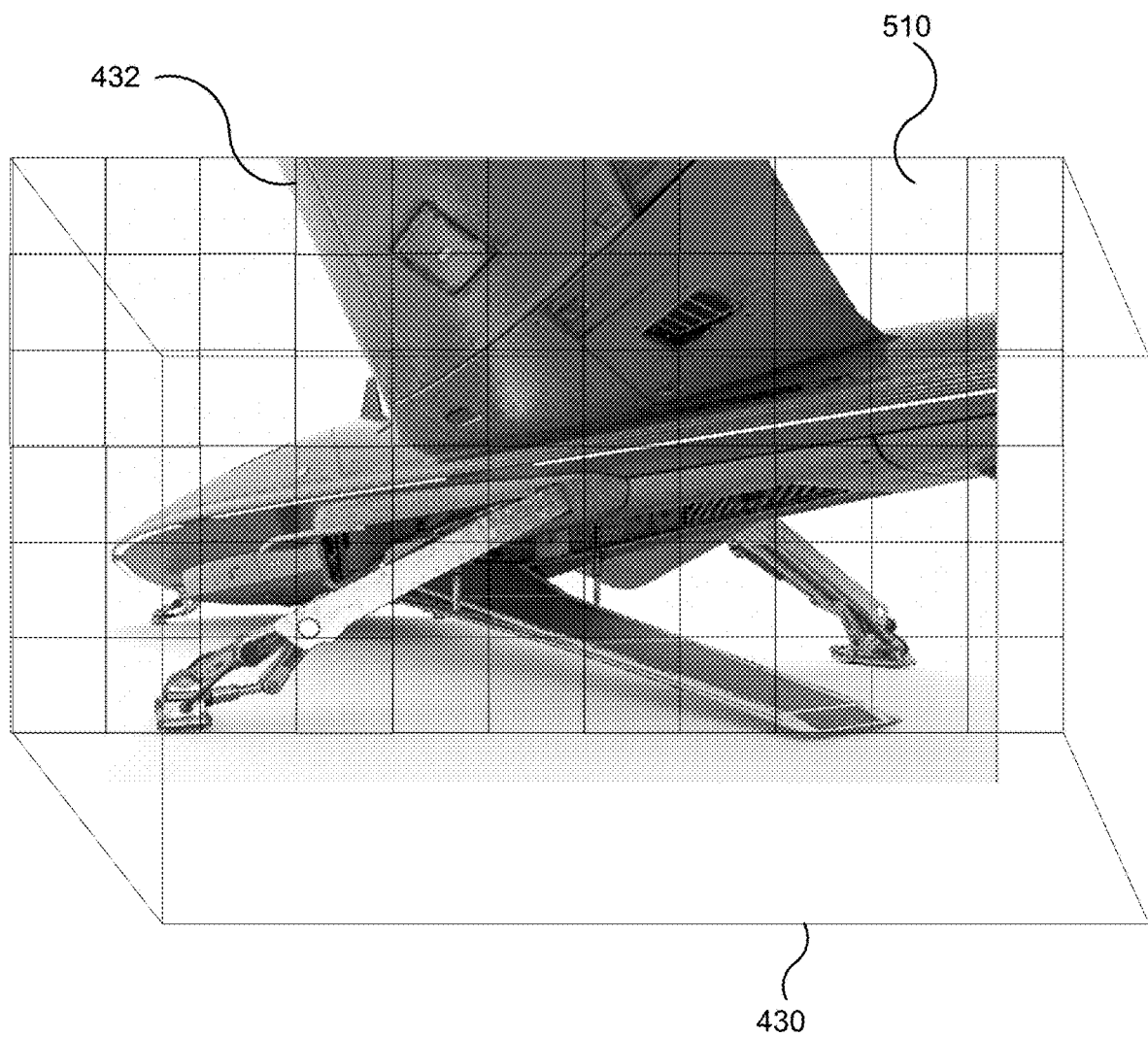
FIG. 5 illustrates an example of a two-dimensional tiling technique for a volume of an image.

During a performance, the content production system may perform a tiled, deferred color correction pass that handles multiple individual 3D color correction volumes simultaneously, bins the volumes into two-dimensional (2D) tiles in screen space, and then processes the affected pixels in each tile in order according to a per-volume priority factor. For example, FIG. 5 illustrates a volume 430 around a virtual spacecraft 432. The volume 430 can be divided into a plurality of tiles 510. For example, for an 8K LED wall that is 30 feet wide at 1.22 mm pixel pitch can have 7680 pixels by 4320 pixels. Using 64 pixel by 64 pixels, that would produce 120 by 68 tiles. The tiles 510 are not drawn to scale and are used for demonstrative purpose. In various embodiments, the tiles can be 64 pixels by 64 pixels. The tiles 510 may be used to determine areas in which the color correction needs to be applied. For example, the director may indicate that the color of the ramp for the virtual spacecraft 432 needs to be corrected due to a lighting artifact. The tiles 510 containing the ramp 512 may be identified by the user and only the pixels contained within the identified tiles 512 that include the ramp may have the color correction applied, therefore leaving the rest of the virtual image of the virtual spacecraft 432 unaffected.

In some embodiments, color correction may be performed by determining one or more color error values or mismatch values between a physical reference target (e.g., a virtual spacecraft 432) in the performance area 102 and a given virtual object. The content production system 200 may iteratively or progressively modify color related attributes for the virtual object until the color error values or mismatch values meet one or more threshold color correction values. As a simple example, the threshold color correction value for a color green may be set at a value of 1. The content production system may continuously color correct the green color for a virtual object until the virtual object's mismatch value is below 1. The iterative process can be a differential render where the color of the selected tiles are compared to a desired color. When the mismatch is above a predetermined threshold, the color is adjusted on the selected tiles until the comparisons are within the predetermined threshold. In various embodiments, a user provides a second input to manual adjust the colors for the selected tiles. In various embodiments, the system detects the colors of the selected tiles and compares the detected colors with a color for the physical object.

Figure 6:
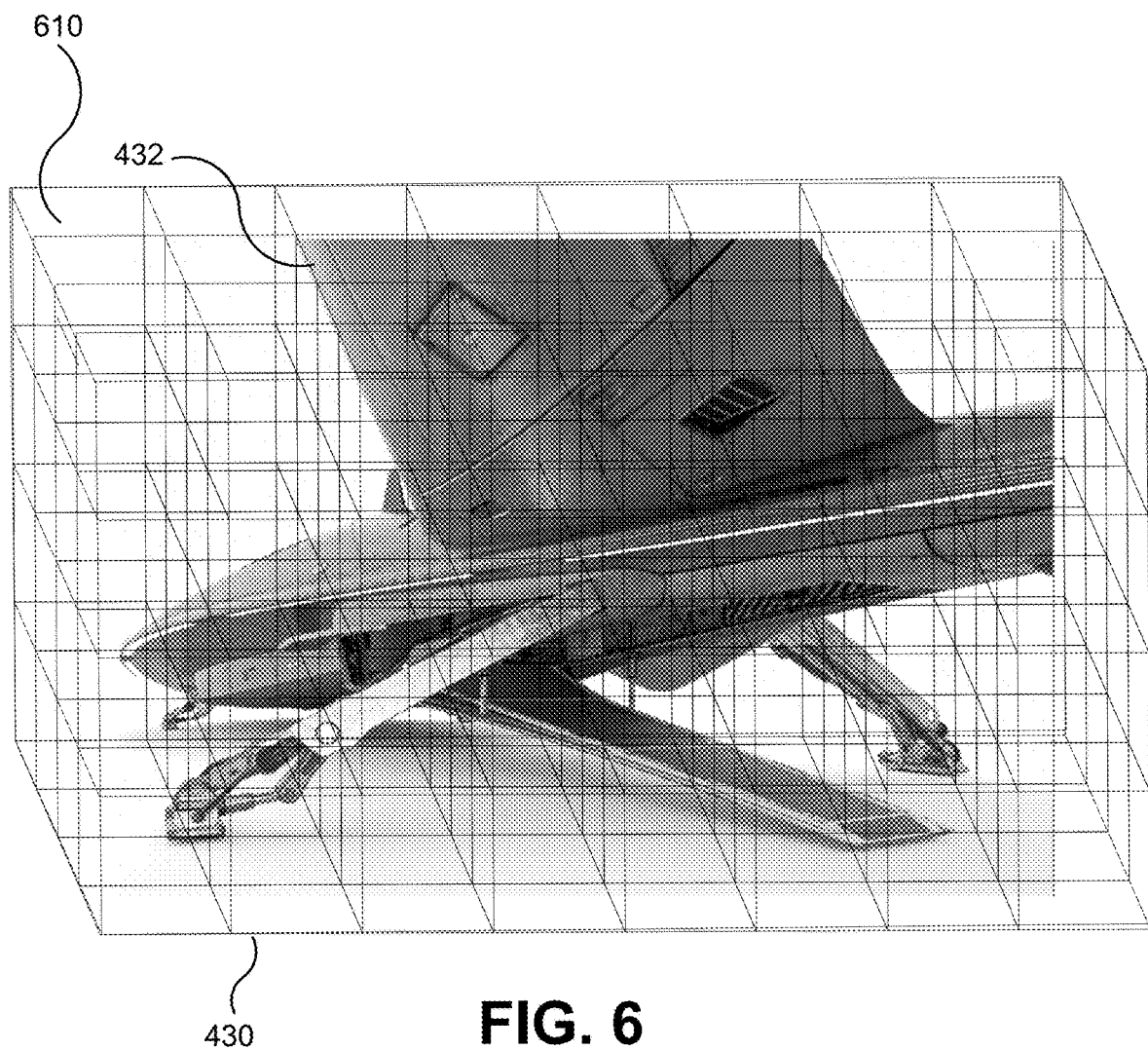
FIG. 6 illustrates an example of a three-dimensional volume technique for an object in an image.

FIG. 6 illustrates an example of a three-dimensional volume technique for an object in an image. FIG. 6 illustrates breaking up the volume 430 into multiple, sub-volumes 610 instead of the tiles 510 shown in FIG. 5. Using the same example as described above, the director may indicate that the color of the ramp for the virtual spacecraft 432 needs to be corrected due to a lighting artifact. In this case, the sub-volumes 610 containing the ramp may be identified by the user and only the identified sub-volumes 610 that include the ramp may have the color correction applied, therefore leaving the rest of the virtual image of the virtual spacecraft 432 unaffected.

In various embodiments, there may be insufficient processing power to make all the color corrections required and thus the corrections can be prioritized. In these cases, the lower priority corrections may not be made.

In some embodiments, the per-volume priority factor for each volume may be assigned via user input. In other embodiments, the per-volume priority factor may be based on one or more criteria or heuristics. For example, the content production system may assign higher per-volume priorities for volumes that take up a larger portion of a given image frame. As another example, the content production system may assign higher per-volume priorities to volumes that contain virtual objects that are moving at least a threshold velocity or that are moving faster relative to other virtual objects. As yet another example, the content production system may assign higher per-volume priorities to volumes that contain virtual objects of certain shapes. For instance, volumes with virtual objects containing humans (e.g., background characters) may be assigned higher per-volume priorities. As yet another example, the content protection system may assign higher per-volume priorities to volumes that are virtually closer to the taking camera. The content production system may determine the closeness of a virtual object based on the virtual depth of the object. As still another example, the content production system may be trained using previously assigned priority factors for various volume shapes and/or virtual object shapes. Based on the training, the content production system may automatically assign per-volume priority factors for volumes in a given performance.

Figure 7:
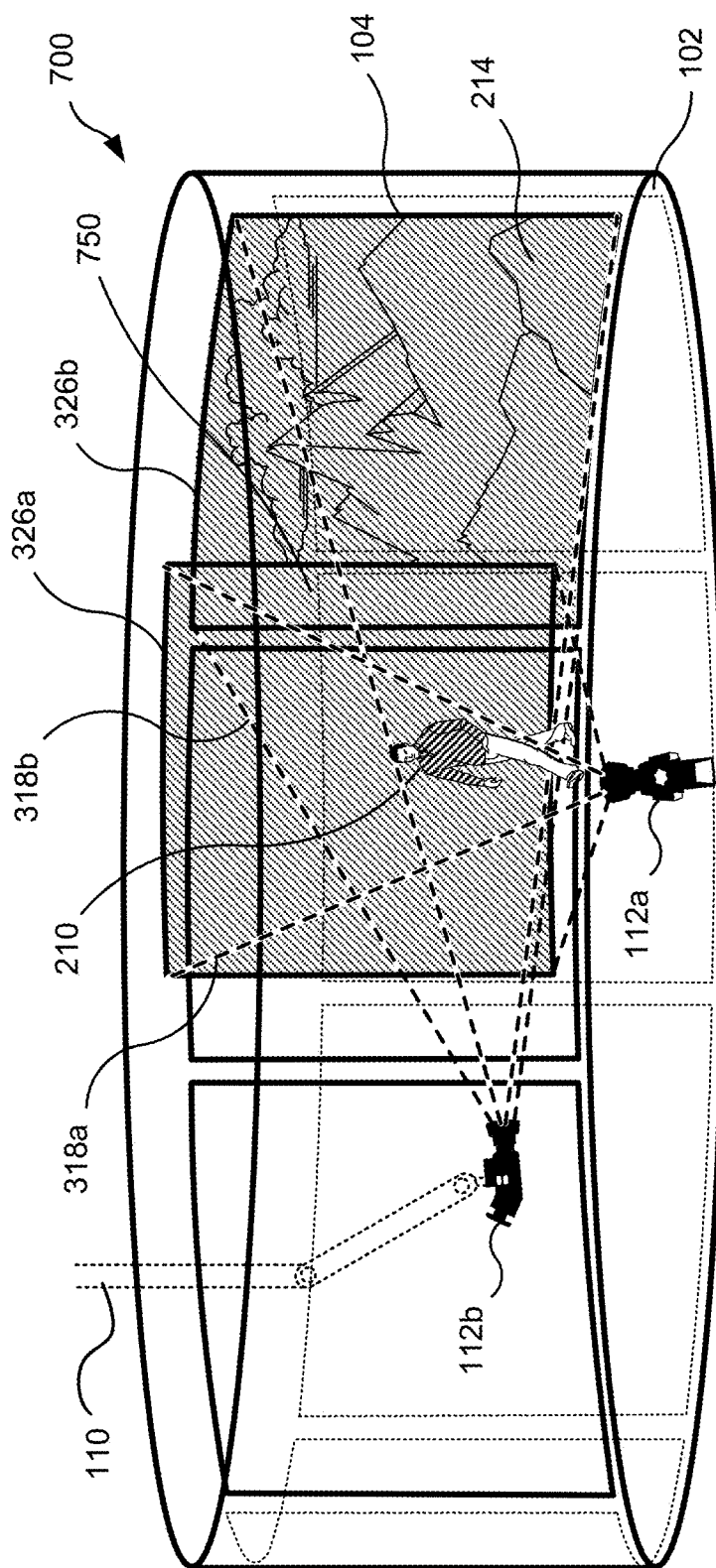
FIG. 7 illustrates an example of a virtual stage light for the immersive content production system.
Figure 8:
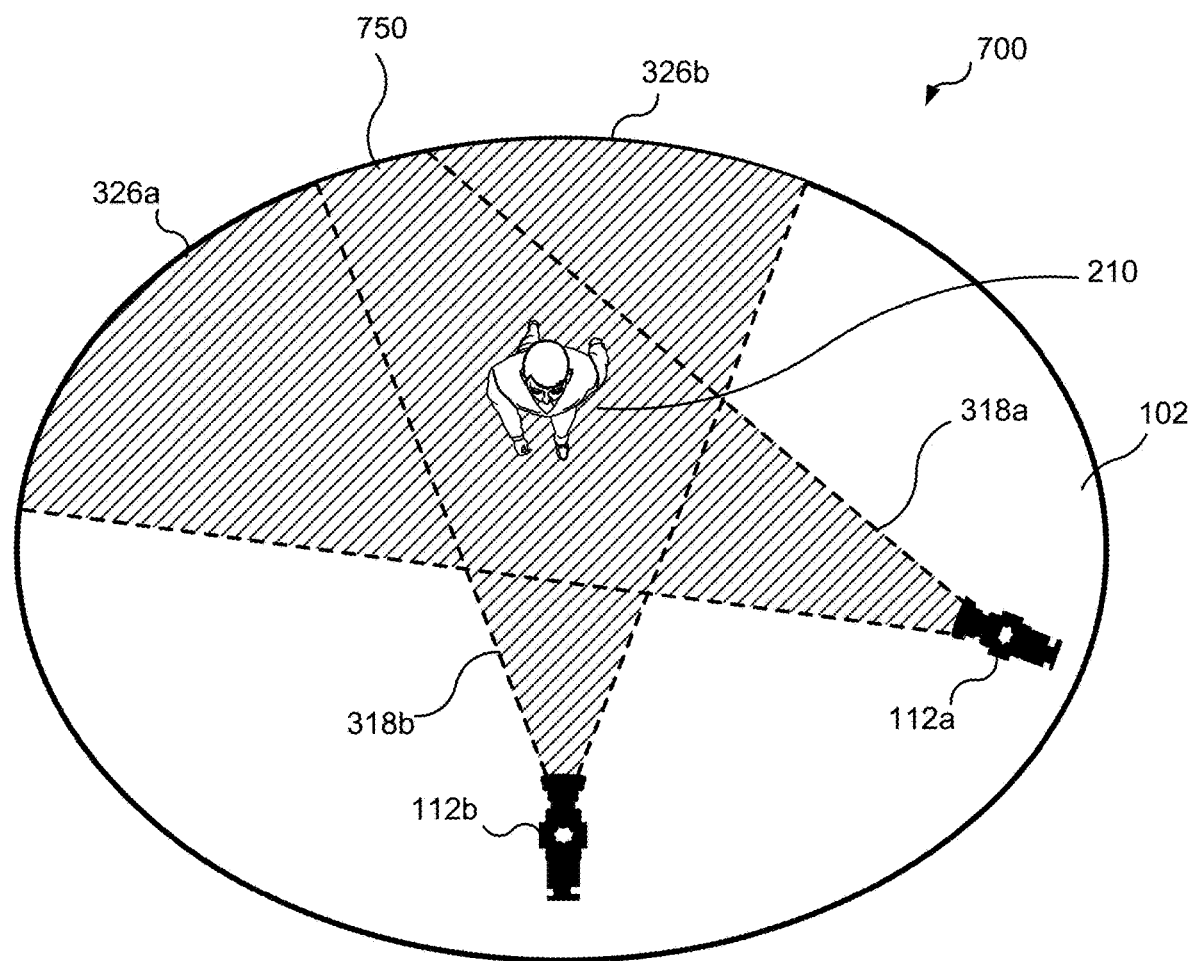
FIG. 8 is a simplified illustration of the immersive content production system shown in FIG. 3 depicting the frustum of the taking camera from a top view.

FIG. 7 is a simplified drawing of immersive environment production system 700. FIG. 8 is a simplified top view of production system 700. Immersive environment production system 700 includes many elements that are the same as or similar to elements described above with respect to system 200 described above. The same reference numbers used in conjunction with system 200 are used in in FIGS. 7 and 8 with respect to system 700 to indicate like elements and, Thus, for the sake of convenience and brevity, details of such like elements are not repeated.

Shown in each of FIGS. 7 and 8 is a frustum 318 of taking camera 112 within the content production system. As described above for three-dimensional (3D) graphics, the frustum of a camera, also known as a viewing frustum, can be the region of space in the modeled world that would appear on video taken from the camera. Thus, the frustum 318 is the field of view of the camera 112. The exact shape of viewing frustum 318 can vary and will depend on the lens of camera 112 but typically it is a frustum of a rectangular pyramid (hence the name).

If the entirety of scenery 214 is rendered from the tracked position and perspective of the taking camera 112 to present perspective-correct images across the entirety of surrounding displays 104, in some instances view-dependent lighting artifacts will be present on the physical foreground components within the performance area 102 (e.g., the performers/actors, props, and physical set decorations). As the taking camera 112 moves, the rendered images on the displays 104 update, which can result in a visual discrepancy between the static physical set in the performance area 102 and the virtual assets of the virtual environment rendered by displays 104 on the walls. As a result, light sources (e.g., virtual sun 206) within the virtual environment might appear to move across the performers 210, across the props 212, and/or across various set decorations, just because the taking camera 112 is physically moving. Thus, it might appear that virtual sun 206 moves relative to a performer based on movement of the taking camera when in fact the position of virtual sun 206 relative to the performer should not change.

To mitigate this visual artifact, two separate renderings can be performed in some instances by the content production system of embodiments of the invention when displaying a virtual environment. A method of rendering content onto the displays 104 according to some embodiments of the invention, the two renderings can be performed simultaneously and in real-time. In one rendering, a global view of the virtual environment (including any virtual assets) is rendered independent from the perspective of the taking camera. The global view can include background or scenery images that create much of the virtual or immersive environment that provides context for the one or more performers on stage 102. The global view can also include lighting effects produced from displays outside the frustum of the taking camera 112. Depending on the size of frustum 318, this global view rendering can be displayed on the majority of the display area within the virtual environment.

The system can render the global view from a virtual spherical camera placed at a virtual location within the virtual environment based on predefined criteria. In some embodiments, the placement of the virtual spherical camera can be based on a threshold error value for the lighting of virtual objects within the virtual environment and/or lighting of the physical objects in the performance area. The threshold error value can indicate a minimal acceptable level of visual inaccuracy of the lighting of the objects within the virtual environment and/or performance area. In some embodiments, the images of the virtual environment rendered by in the global-view rendering can remain completely static. In other words, objects within the virtual environment might not move or change in location on the displays 104 over time or during a performance. In other embodiments, objects within the global-view of the virtual environment are not completely static but simply do not update in response to movement of the taking camera 112. Images of the virtual environment generated during the global-view rendering can be used for lighting and reflection purposes onto the physical foreground/performance area.

In another rendering, a portion of the virtual environment is rendered from the location and perspective of the taking camera. The perspective-correct rendering can be completely independent from the global-view render and can include performers, props and background scenery within the frustum (e.g., frustum 318) of the taking camera 112. The perspective-correct rendering represents a portion of the virtual environment and can thought of as a patch that can be displayed on a portion of displays 104. As the global view can be captured by a virtual spherical camera, discrepancies can exist for images displayed on the displays in the background from the spherical camera as compared with images that captured within the frustum of the taking camera. Therefore, a patch can be created to correct the images in the background displays that appear within the frustum of the taking camera. In this way as the taking camera captures the one or more images with actors, props, and background, the background appears to be perspective-correct and do not move abnormally due to movement of the taking camera.

Embodiments of the invention can combine the patch from the perspective-correct rendering with the global-view render to present the virtual environment on the content production system without (or with fewer) undesirable lighting effects. For example, images of the virtual environment can be generated onto displays 104 and updated over the course of a performance so that the perspective of the virtual environment displayed compensates for corresponding changes to the positioning and orientation of the taking camera 112. In some embodiments, rendered content is combined such that the displays 104 display the perspective-correct rendering in the portion of the displays 104 that is viewable by the frustum 318 of the taking camera 112 and the portions of the displays 104 outside of the frustum 318 of the taking camera 112 only include the rendered images from the global-view render.

II. Additional Color Correction Techniques

An objective of the color correction techniques is to produce as many in camera finals as possible. This will reduce the cost of post processing video products. The techniques can be the equivalent to running a 2D and 3D compositing tool (e.g., Nuke) in an interactive environment. The color correction techniques attempt to match the 3D elements in the virtual environment with the real life set pieces that are physically on the set. For example, for a science fiction show, an entire spacecraft may not be built on the set, but just a portion (e.g. a ramp or a cockpit) may be physically constructed. The color correction techniques help match the physical portion with the virtual images of the ship that is presented on the displays to make the video as seamless as possible. The technique can include blending the practical set with digital sets so there is very little to no discrepancies perceptible between the real world environment and the digital environment on the displays.

There can be a few different types of color correction methods. One type can be known as a global color correction. For examples where the entire scene is too dark an operator may want to stop (e.g., camera stops) everything up to increase the exposure by some camera stops, to make the entire scene brighter. Global corrections can be made to an entire virtual works on all the LED walls. For example, the global correction can increase the brightness or make it bluer or make it warmer or make it cooler using color charts.

Color correction can be a very artistic process, and in many cases, the operator can be an artist with over 20 years of experience making color correction adjustments as part of a post-production process. Aspects discussed herein allow for color correction adjustments to be made in real time. There can be some cases where the adjustments can be automated or at least partially automated. For example, an operator may want to adjust the temperature of a group of virtual streetlamps (e.g., turn up all the streetlamps from 5500 kelvin temperature to 6500 kelvin temperature). A script can be used for this type of adjustment.

As described above, there can be color correction objects, color correction volumes, and color correction windows, and sky color correction. For color correction objects, the objects in the virtual environment can be selected by a pointing tool. For example, there may be hundreds of streetlamps requiring the same color correction. The streetlamp can be designated as a color correction object and the color correction controls can be used to change the color or temperature of all the streetlamps.

The color correction volumes are similar to a voxel pic. The color correction volume is a literal volume of the cube. The edges of the color correction volumes can be rounded. The shape of the color correction volumes can be changed. In various embodiments, the volumes can be spherical a cube, a rectangular prism. The 3-D scene can have its own 3-D coordinates and can move right to the step in the scene. The 3-D effects can be complicated because it is projected onto a curved, flat 2-D wall. The 3-D virtual scene has volume and characters can virtually walk around in the images with some depth.

The color correction volume allows for selection of a volume in that 3-D space. For example, it can be an area around where a virtual space ship is parked. If the ship is only a 3-D virtual ship and there is some dirt on the ground around the ship that the operator wants to adjust the visuals, one of these volumes can be used for the ground. In that way, the ground area, and anything within that volume can receive a color correction. Anything outside of the volume would not. In various embodiments, there are other mechanisms for making different shapes to combine these squares or cubes together so there can be a sort of a blobby shape that would roughly cover a ship or some other odd shape. The color correction volume does not need to be spherical or a defined prism.

A color correction window is similar to a virtual stage light or other stage projections. Stage projections can be a 2-D virtual object (e.g., a sticker) that can be displayed over the images on the LED displays. As the taking camera moves around the performance area, the 2-D virtual object stays pointing straight at the taking camera so it does not bend as the camera moves around in the 3-D scenes. The 2-D virtual object stays as the normal to the display or stated otherwise stays flat to the wall. Other 3-D objects in the virtual space can have depth so they are not flat to the wall and can be distorted. By using 2-D virtual objects, the shape of the object does not change based on the position of the camera.

If the camera is locked off, if the camera is not moving, the operator can turn off the low pass system temporarily for the camera. With the camera being fixed there is no wobble. With the motion capture driver temporarily switched off, an operator can even pick the camera off a stand and move it around and the frustum will not move as it will remain locked to its previous location. The operator can detect an area that appears too yellow and the operator may want it to be greener. The color correction window can approach the correction from a 2-D perspective as if the operator was editing a single frame in video. The operator may want to change out one area or cover over one area and blend it out in some way or another. If the camera does not move, the immersive content production system can maintain this parallax trick of ensuring that it is perspective correct-enough to "sell" the trick and still potentially achieve an in-camera final. The color correction window provides that kind of workflow to these artists. Color correction windows are not limited for use with locked off camera, but that can be an obvious use case where the operator can fix something in the scene and make it work for the very specific camera perspective through the lens of the camera.

In certain embodiments, upon selection of a point of region of the immersive cave/wall, the content production system may enable a user to select a color and/or lighting values currently associated with the point or region at a given playback time for the virtual scene displayed by the immersive cave/wall. For example, at one minute into the playback of a virtual scene, a region may be associated with the blue color of a virtual sky. The content production system may select the blue color in response to a user selection input. The content production system may then store the color and/or lighting values for the selected point or regions. Thereafter, the user may select another point or region of the immersive cave/wall using the mechanisms and/or in the same manner as previously described. Upon selection, the content production system may modify the color and/or lighting values of the selected another point or region based on the color and/or lighting values of the initially selected point or region.

In some embodiments, the modification of the color and/or lighting values of the selected another point or region may include blend processing. More specifically, the content production system may determine the color and/or lighting values of neighboring or nearby regions surrounding the selected another point or region. Based on the values for the neighboring regions and the values for the initially selected point or region, the content production system may use a blending processing function such that the color and/or lighting values of the selected another point or region may be blended with its surrounding neighbor regions. In various embodiments, the blending processing function can support linear blending. In various embodiments, the blending processing function can support radial or three dimensional blending. In this way, the modification of the color and/or lighting values may appear more seamless to a viewer.

In some embodiments, a user may directly input a particular color and/or lighting value for a selected region. These include, for example, color temperature, hue, intensity, exposure, softness, roundness, saturation, etc.

In some embodiments, modification of the point or region may include selecting one or more individual 3D geometries or meshes of the 3D virtual scene displayed by the immersive cave/wall that correspond to the selected point or region of the immersive cave/wall. In doing so, the modification is made to the virtual objects of the 3D virtual scene. Thereafter, a 2D image is generated based on the modified 3D virtual scene for display on the immersive cave/wall. This is in contrast to other embodiments where the underlying 3D virtual scene is not modified. In those embodiments, a 2D image is first generated from the unmodified 3D virtual scene. Thereafter, the 2D image is modified to adjust for lighting/color.

In certain embodiments, selection of the underlying geometry includes casting a virtual ray from a projector camera origin, through the selected point on the immersive cave/wall and intersecting the ray with geometries existing in the 3D virtual scene displayed by the immersive cave/wall. In other embodiments, the content production system initially casts a ray with the wall geometry to place a reticle in the 3D virtual scene. Thereafter, the content production system may ray cast from the projector camera position through the reticle's 3D position to get the targeted geometry in the 3D virtual scene. In other words, the system would place a reticle on a 3D virtual object in a 3D scene corresponding to the direction and/or orientation of the handheld mechanism. Thereafter, a 2D image would be rendered from the 3D scene including the reticle to be displayed on the immersive cave/wall. This is, in contrast, to the system adding a reticle to a corresponding location on a 2D image displayed on the immersive cave/wall following rendering of the 2D image from the unmodified 3D virtual scene. Note that the ray cast is always from the projector camera position and not from the handheld mechanism position.

In some embodiments, the content production system is configured to cause the immersive cave/wall to display a camera frustum. One benefit of having the reticle live in 3D space (3D virtual scene) exactly on the immersive cave/wall is that the reticle position in 2D space will not change regardless of what projection is used. As such, the reticle as viewed through a frustum would be in exactly the same position as viewed through the projector camera.

III. Virtual Stage Lighting

The LED displays can be used as a light source for the performance area. In the past, a director would request a stage light be set up in a certain area, with a certain size, and a certain color. This would take time for the lights to be assembled, a colored gel to be applied, and cooling to be set up for the hot lights. Virtual Stage Lights (also known as light cards) can emulate physical lights but with much greater flexibility and responsiveness. The virtual stage lights can be controlled through a graphical user interface (GUI) on a tablet computer. For example, the GUI can allow an operator to set up a new light, adjust the location, adjust the size and shape of the light, and adjust various lighting properties (e.g., brightness, color, temperature, etc.)

In various embodiments, the virtual stage lights can emulate a black flag which is an area that is fully dark so the background is not casting light onto the performance area (or actors). In various embodiments, the virtual stage lights can emulate a net which can be a half-light card and a half black flag. This can control the amount of light on the performance area. The virtual stage lights are not just for illumination but can also be used to control reflections. The virtual stage lights can be used to create interesting and unusual reflections on a ship or on a character.

Virtual green screens can be a way of using a 2-D object in order to have a real time way to replace the physical green screen. The green screen can be the fabric that flips down on the set and then actors act against it, not in the context of a 3-D world because it is just green. The green screen is typically replaced in post-production with visual effects.

But in some cases, it may not be possible to achieve an in-camera final for a shot, but it would be undesirable to just make the whole back wall green. Using virtual green screen can provide some of the benefits of controlling the reflections or from the lighting or other projected scene elements displayed on the LED displays except for maybe one section. For example, maybe there is an area around an actor someone with very specific hair. There can be issues with hair and other fine clothing details in general with visual effects compositing. In various embodiments, it may be desirable to mask out a character, for example in a face replacement. In those cases a green light card or a blue light card for a blue screen may also have some digital markers on top of the base color. Instead of taping up a green screen and putting literal "Xs" or "+" signs made out of tape as on a real "green screen" on a set, a virtual green screen can be generated digitally. The virtual green screen can further enhance the ability to get in-camera finals for the rest of the shot but not maybe for one section that is potentially being pinned up.

In the virtual green screen, the operator can adjust lights also. There can still be lighting coming off the virtual green screen that may help with some of the rest of the image. Lights can be combined with green screen so you could either have a green screen on top of or below the lights.

In another case, one stage can have a strong light on one side of the volume and a very dark region on the wall on the other side so it was flaring out on the far wall. It was just making it too bright. So while it was imperfect for the rest of the scene, that particular angle shooting that wall, it was not possible to get an acceptable shot so the operator chose to use green screen for that.

In other examples, there may be no 3-D elements and the operator may just have this wrapped beautiful panosphere view that was captured using a 360 degree camera in a unique location. That scene is being projected on the displays and then the operator can layer light cards and color correction or other real-time creative edits on top of that unwrapped 360-degree image. That lighting effect can be known as a panosphere. The panosphere can receive color, position, and other corrections.

Panosphere is like the sky itself. The sky may be separate from the 3-D scene. The displays may have a layered sky behind it. For example, the scene may have a desert landscape and then the operator has an image of sky. The operator may want to change the position of the sun and color correct the sky or rotate the position of the clouds in the sky separately from the scene.

Figure 9:
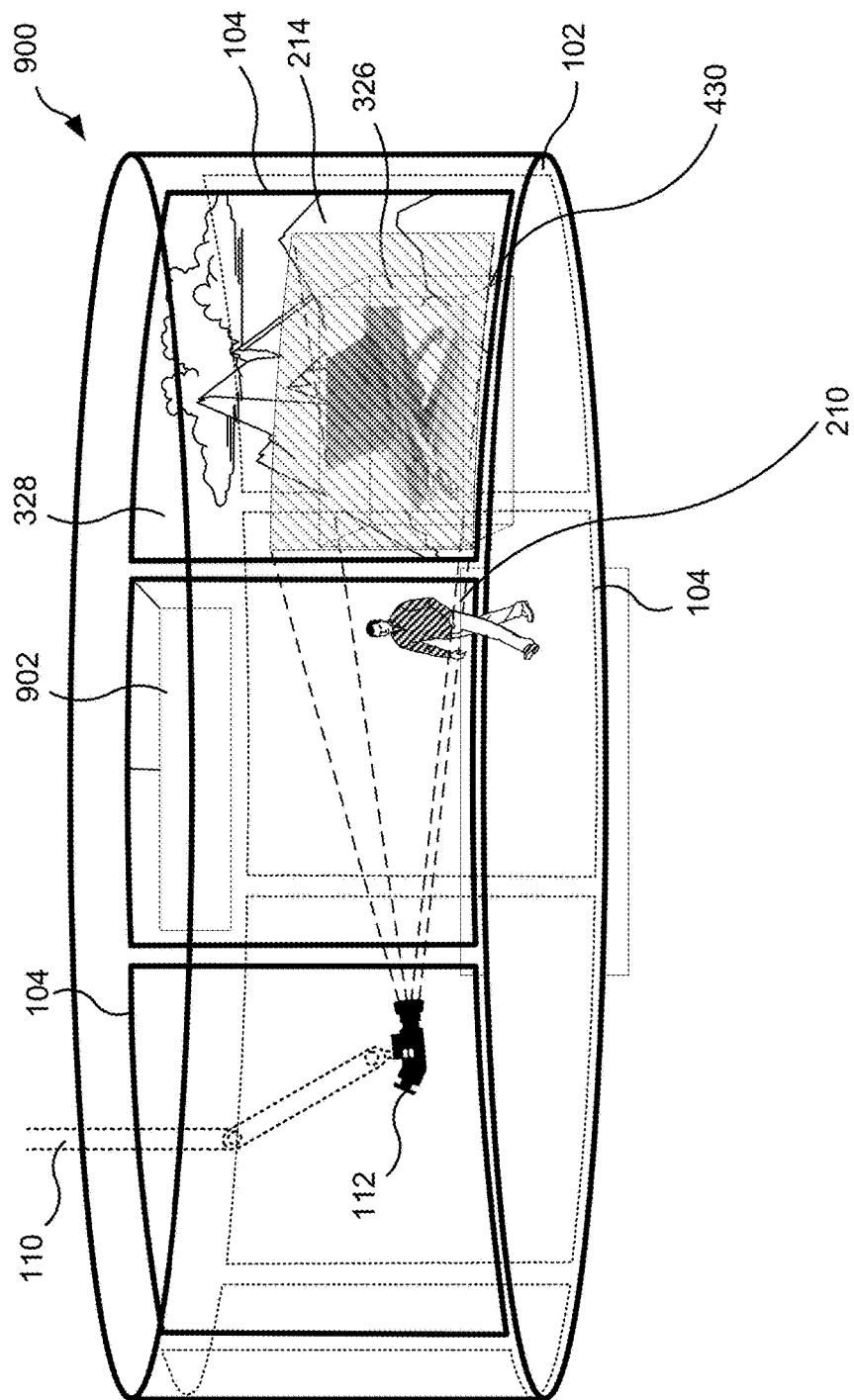
FIG. 9 illustrates a simplified illustration of the immersive content production system depicting a virtual stage light.

FIG. 9 illustrates a modification of the immersive content production system of FIG. 2 to include an example of a virtual stage light 902. The immersive content production system 900 can be similar to the immersive content production system 200, and thus includes many or all of the same components as described with respect to FIG. 2. As shown in FIG. 9, the immersive content production system 900 can include the performance area 102, the displays 104, the simulated lights 108, and the taking camera 112 attached to the rig 110. A performer 210 is also shown within the performance area 102. The performance area 102 can include one or more physical props 212 (e.g., the snowmobile depicted in FIG. 2). Scenery images 214 of a virtual environment can be presented on the displays 104 to generate the immersive environment in which the performer 210 can conduct his or her performance (e.g., act out a scene in a movie being produced). In some embodiments, the scenery images 214 can be seamlessly presented across several displays 104 as described with respect to FIG. 1. The scenery images 214 can include one or more virtual light sources 206 that can be, for example, an image of a sun, a moon, stars, street lights, or other natural or manmade light sources displayed in the scenery images 214.

The scenery images 214 can also provide a background for the video content captured by the taking camera 112 (e.g., a visible light camera). The taking camera 112 can capture a view of performance area 202 from a certain perspective. In some embodiments, the taking camera 112 can be stationary, while in some other embodiments, the taking camera 112 can be mounted to a track 110 that can move the taking camera 112 during a performance.

Embodiments of the invention can generate and display perspective-correct images (as rendered from the tracked position and perspective of taking camera 112) onto portions of the surrounding image display walls that are within the field of view (i.e., the frustum) of the taking camera. Areas of the displays 104 outside the field of view of taking camera 112 can be displayed according to a global view perspective. Further details of associated with generating and displaying content on displays 104 according to two different perspectives in accordance with some embodiments of the invention are discussed below.

In some embodiments, the size and/or shape of a selected region may be altered by the user in real-time or substantially real-time. In some instances, the light/color adjustment element used for selecting a region and/or the selected region itself (used for the purpose of adjusting the lighting of another region) may be referred to as a Lightcard. In some embodiments, a gradient may be selected and applied to a particular region or point. More specifically, two or more colors and/or lighting values may be selected for a gradient to be applied to a region. Thereafter, gradient points may be placed on the region that corresponds to each selected color and/or light value. In response, the system may apply a gradient in which the color and/or lighting values are progressively changed from one corresponding color and/or lighting value to another corresponding color and/or lighting value between two gradient points.

In some embodiments, the lighting and/or color may be applied based on the 3D virtual objects corresponding to the region to which the lighting and/or color values is to be applied. Specifically, the system may determine/account for the 3D virtual object type in applying the color and/or lighting. For example, the color and/or lighting may be applied differently if the corresponding 3D virtual object type is metal as opposed to grass. In some embodiments, the system may determine a boundary between two 3D virtual objects and blend the two virtual objects accordingly. For example, the system may determine that a selected region includes a boundary between a virtual sky and virtual ground. In response, the system may apply a blending technique to make the boundary between the two objects more seamless to a viewer.

IV. Virtual Stage Lights Flow

Figure 10:
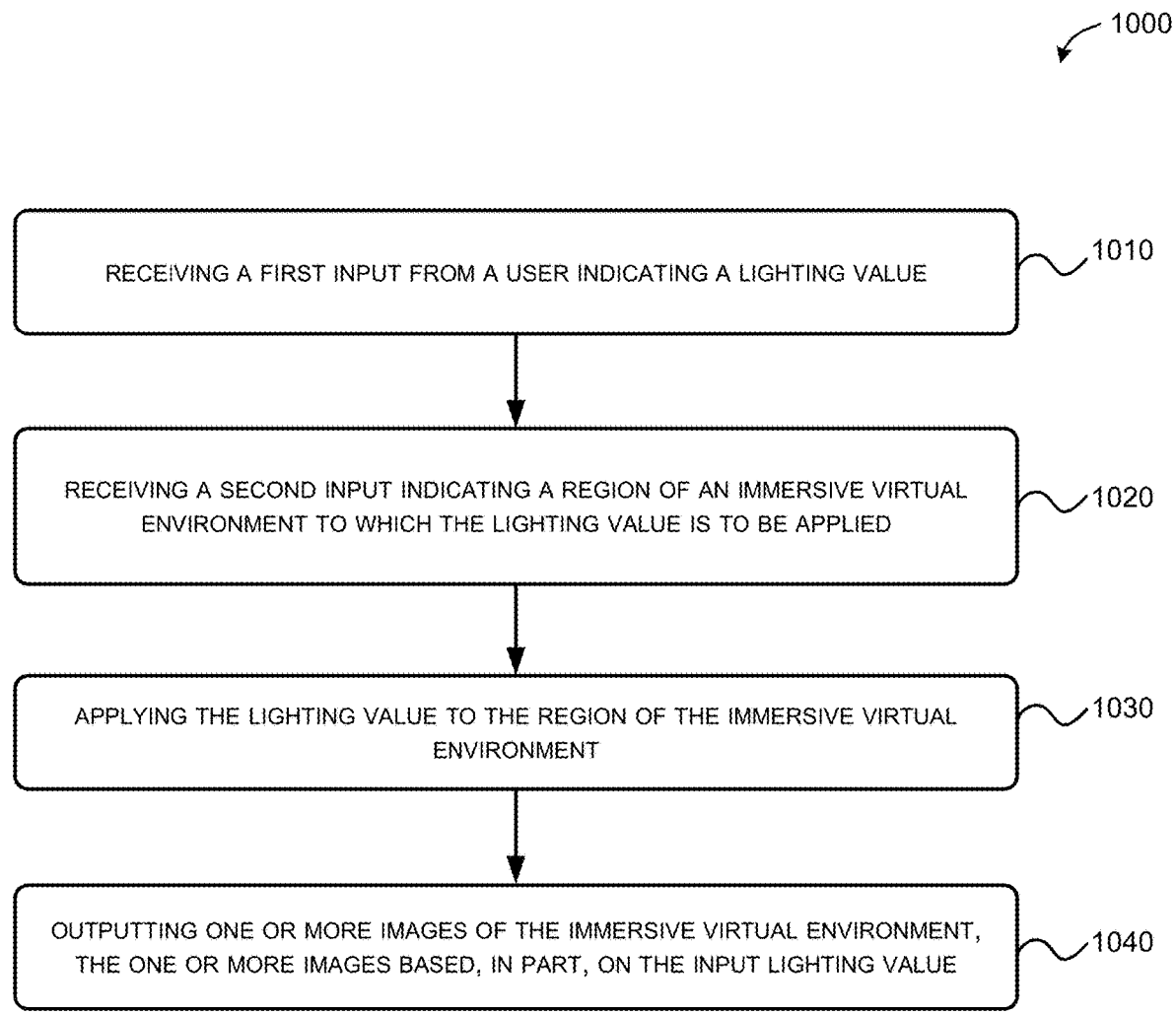
FIG. 10 is a flowchart of an example process associated with a lighting adjustment for immersive content production system.

FIG. 10 is a flowchart of an example process 1000 associated with a lighting adjustment for immersive content production system. In some implementations, one or more process blocks of FIG. 10 may be performed by a computing device (e.g., computing device 3100 discussed below with respect to FIG. 31). In some implementations, one or more process blocks of FIG. 10 may be performed by another device or a group of devices separate from or including the computing device. Additionally, or alternatively, one or more process blocks of FIG. 10 may be performed by one or more components of computing device 3100, such as processing unit 3104, storage subsystem 3118, system memory 3110, cameras 3134, displays 3132, communications subsystems 3124, and bus 3102.

At block 1010, process 1000 may include receiving a first input from a user indicating a lighting value. For example, the computing device may receive a first input from a user indicating a lighting value, as described above. The input can be received via a pointing device or a lighting capture device as described later. In various embodiments, the first input can be received on a GUI via an application on a tablet computer. In various embodiments, the first inputs can be made via a laptop computer or a desktop computer.

In a first implementation, process 1000 includes receiving a selection of an image for a virtual light, and generating the image for the virtual light in the region of the immersive virtual environment to which the lighting value is to be applied. In a second implementation, the lighting value comprises an intensity value. In a third implementation, the lighting value comprises a color value. In a fourth implementation, the lighting value comprises a shape value. In a fifth implementation, the lighting value comprises a softness value.

At block 1020, process 1000 may include receiving a second input indicating a region of an immersive virtual environment to which the lighting value is to be applied. For example, the computing device may receive a second input indicating a region of an immersive virtual environment to which the lighting value is to be applied, as described above. The second input can be received via a pointing device or a lighting capture device as described later. In various embodiments, the second input can be received on a GUI via an application on a tablet computer. In various embodiments, the second input can be made via a laptop computer or a desktop computer.

In various embodiments, process 1000 includes receiving a third input from a user indicating a size value, the size value comprising a height value, a width value, and a rotation value, and applying the size value to the region of the immersive virtual environment, outputting one or more images of the immersive virtual environment, the one or more images based, in part, on the size value.

At block 1030, process 1000 may include applying the lighting value to the region of the immersive virtual environment. For example, the computing device may apply the lighting value to the region of the immersive virtual environment, as described above.

At block 1040, process 1000 may include outputting one or more images of the immersive virtual environment, the one or more images based, in part, on the input lighting value. For example, the computing device may output one or more images of the immersive virtual environment, the one or more images based, in part, on the input lighting value, as described above.

Process 1000 may include additional implementations, such as any single implementation or any combination of implementations described below and/or in connection with one or more other processes described elsewhere herein.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

V. Lighting and Color Correction Graphical User Interfaces

Figure 15:
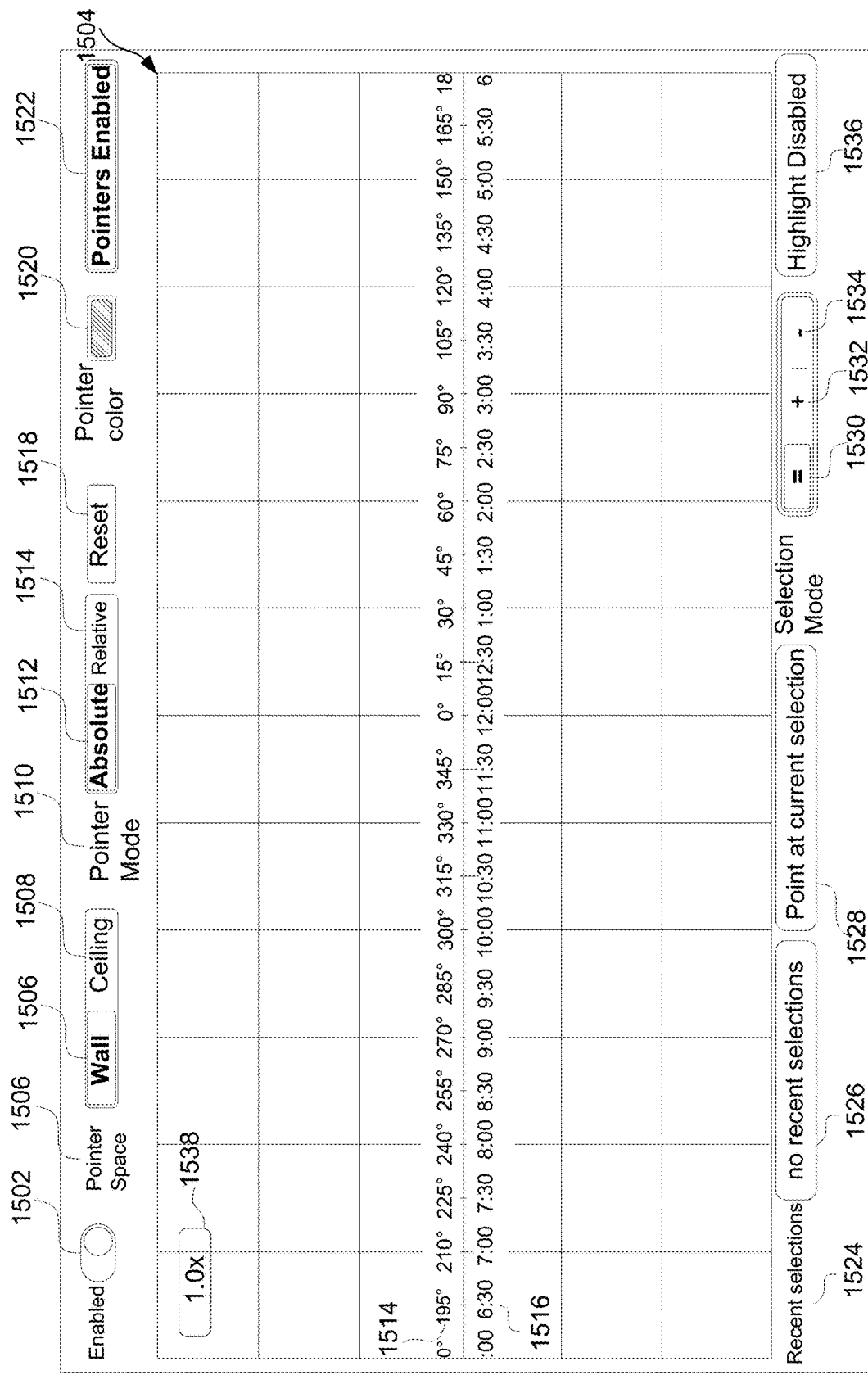
FIG. 15 illustrates a trackpad user interface according to various aspects of the disclosure.
Figure 16:
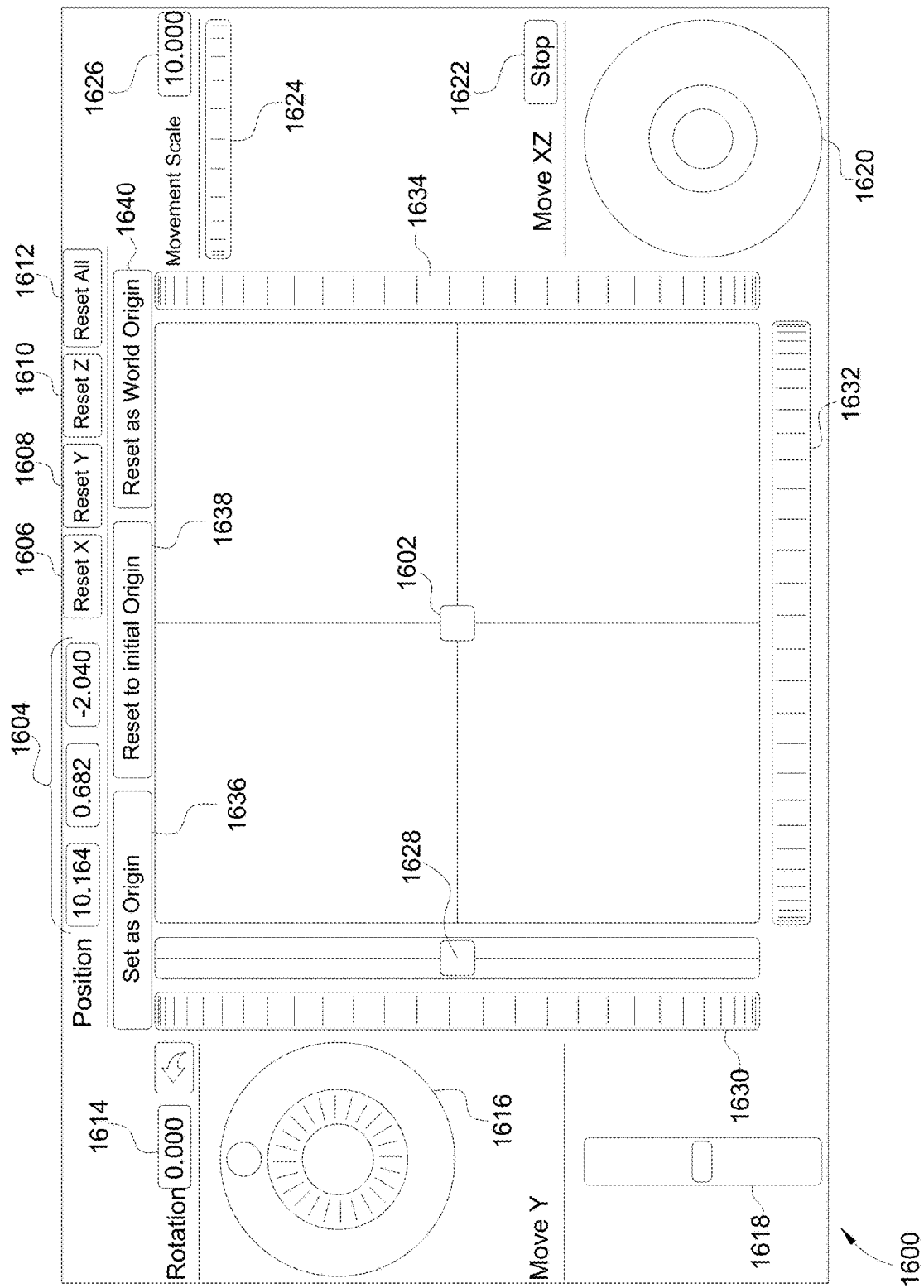
FIG. 16 illustrates a stage positioning panel according to various aspects of the disclosure.

In some embodiments, the content production system may enable a user to adjust the color and lighting of the displays 104 in real or substantially real-time (e.g., at interactive frame rates). In some embodiments, the content production system may include a mechanism to enable the user to select a region of the displays 104 for which the color and/or lighting should be adjusted. In certain embodiments, the mechanism may be a tablet or other mobile computing device. FIGS. 15-16 provide exemplary graphical user interfaces that can be executed on the tablet or the other mobile computing device.

The mobile computing device may present an interface that includes a representation of the immersive cave/wall comprising the displays 104. The representation may be presented as flattened version of the immersive cave/wall. In some instances, mapping data may be stored and leveraged by the content production system to map the flattened representation of the immersive cave/wall presented on the mobile computing device to the curved/cylindrical physical immersive cave/wall. In some instances, the mapping data may be based on a longitudinal and latitudinal mapping system. In some instances, the tablet may be configured to receive input from a user, such as a finger press or combination of finger presses. Based on the location of the finger press received at the tablet screen displaying the immersive cave/wall representation, the content production system may select a corresponding region of or point on the immersive cave/wall.

The GUI may include various layers, windows, screens, templates, or other graphical elements that may be displayed in all, or a portion, of the display. Generally, the GUI may include graphical elements that represent applications and functions of the electronic device. The graphical elements may include icons and other images representing buttons, sliders, menu bars, and the like. The icons may correspond to various applications of the electronic device that may open upon selection of a respective icon. Furthermore, selection of an icon may lead to a hierarchical navigation process, such that selection of an icon leads to a screen that includes one or more additional icons or other GUI elements. The icons may be selected via a touch screen included in the display, or may be selected by a user input structure, such as a wheel or button.

In various embodiments, various input devices can be connected to the tablet computers via either wired or wireless connections (e.g., Bluetooth). For example, a device having a plurality of physical sliders, switches (e.g., fader switches), buttons, etc. can be connected to the tablet computer to provide improved tactile experience.

A touch-sensitive display provides an input interface and an output interface between the device and a user. The display controller can receive and/or sends electrical signals from/to touch screen. The touch screen displays visual output to the user. The visual output may include graphics, text, icons, video, and any combination thereof (collectively termed "graphics"). In some embodiments, some or all of the visual output may correspond to user-interface objects.

The touch screen can include a touch-sensitive surface, sensor, or set of sensors that accepts input from the user based on haptic and/or tactile contact. The touch screen and display controller (along with any associated modules and/or sets of instructions stored in memory of the tablet computer) detect contact (and any movement or breaking of the contact) on the touch screen and convert the detected contact into interaction with user-interface objects (e.g., one or more soft keys, icons, web pages or images) that are displayed on touch screen. In an exemplary embodiment, a point of contact between the touch screen and the user corresponds to a finger of the user.

The touch screen may use LCD (liquid crystal display) technology, LED (light emitting polymer display) technology, or LED (light emitting diode) technology, although other display technologies may be used in other embodiments. The touch screen and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch screen. In an exemplary embodiment, projected mutual capacitance sensing technology can be used.

In some embodiments, in addition to the touch screen, a computing device (e.g., a tablet computer or a notebook computer) may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen or an extension of the touch-sensitive surface formed by the touch screen.

In some embodiments, the computing device may include a physical or virtual wheel (e.g., a click wheel) as an input control device. A user may navigate among and interact with one or more graphical objects (e.g., icons) displayed in the touch screen by rotating the click wheel or by moving a point of contact with the wheel (e.g., where the amount of movement of the point of contact is measured by its angular displacement with respect to a center point of the wheel). The wheel may also be used to select one or more of the displayed icons. For example, the user may press down on at least a portion of the wheel or an associated button. User commands and navigation commands provided by the user via the wheel may be processed by an input controller as well as one or more of the modules and/or sets of instructions in the memory of the computing device. For a virtual wheel, the wheel and wheel controller may be part of the touch screen and the display controller, respectively. For a virtual wheel, the wheel may be either an opaque or semi-transparent object that appears and disappears on the touch screen display in response to user interaction with the device. In some embodiments, a virtual wheel is displayed on the touch screen of a portable multifunction device and operated by user contact with the touch screen. In various embodiments, haptic feedback can be used on the tablet computer when making changes on the user interface.

A contact/motion module may detect contact with the touch screen (in conjunction with the display controller) and other touch sensitive devices (e.g., a touchpad or physical click wheel). The contact/motion module can include various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module can receive contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multi-touch"/multiple finger contacts). In some embodiments, the contact/motion module and the display controller can detect contact on a touchpad. In some embodiments, the contact/motion module and controller can detect contact on a click wheel.

The contact/motion module may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

In various embodiments, augmented reality or virtual reality controllers (e.g., Google Glass, or Oculus controllers) can be used to select and modify various elements of the virtual environment. Other hand-held pointers and controllers can be used by the operator.

Figure 11:
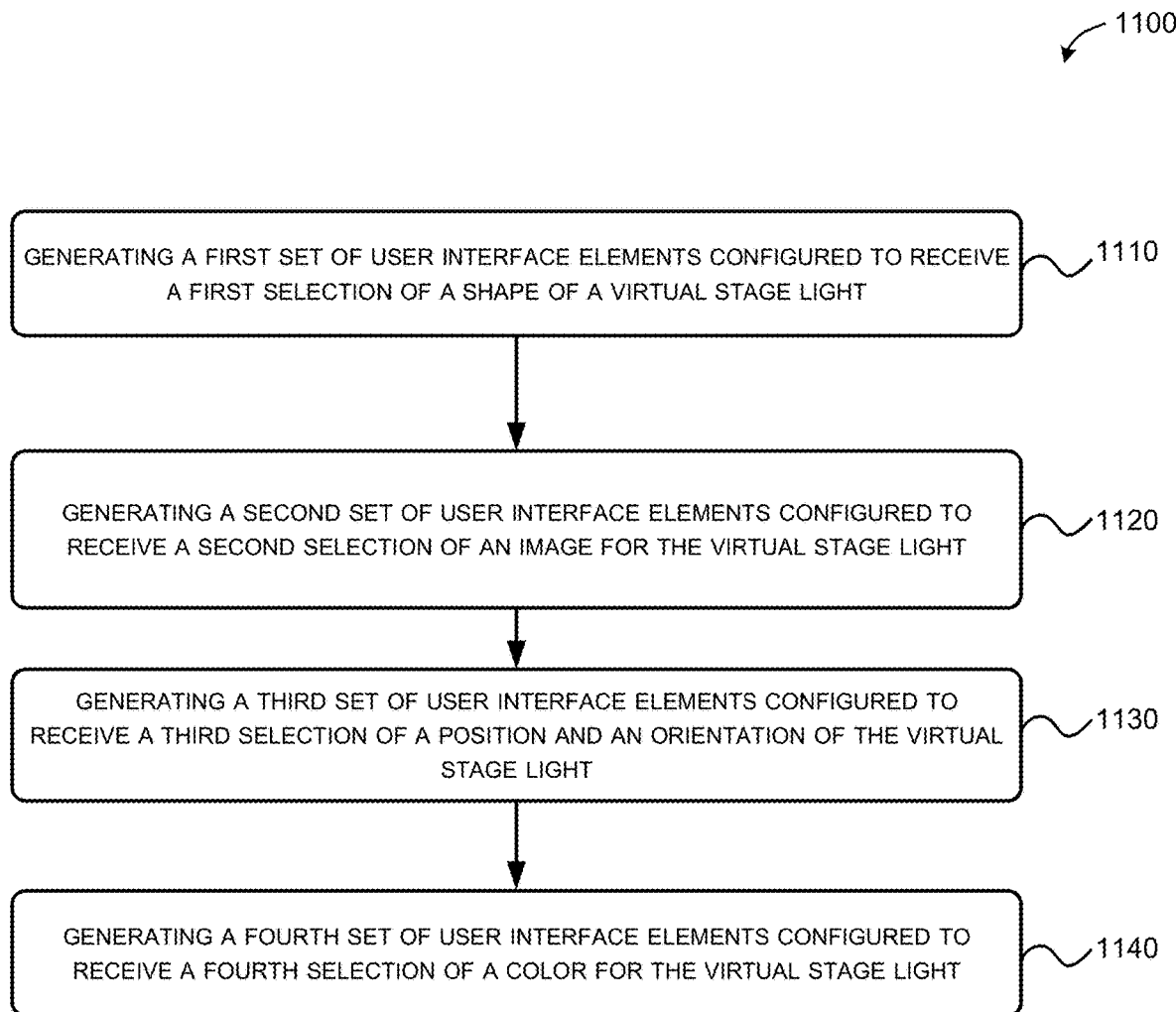
FIG. 11 is a flowchart of an example process associated with generation of a graphical user interface for color and lighting adjustment for immersive content production system.

FIG. 11 is a flowchart of an example process 1100 associated with generation of a graphical user interface for color and lighting adjustment for immersive content production system. In some implementations, one or more process blocks of FIG. 11 may be performed by a computing device (e.g., computing device 3100). Additionally, or alternatively, one or more process blocks of FIG. 10 may be performed by one or more components of device 3100, such as processing unit 3104, storage subsystem 3118, system memory 3110, cameras 3134, displays 3132, communications subsystems 3124, and bus 3102.

At block 1110, process 1100 may include generating a first set of user interface elements configured to receive a first selection of a shape of a virtual stage light. For example, the computing device may generate a first set of user interface elements configured to receive a first selection of a shape of a virtual stage light, as described above. In various implementations, the shape of the virtual stage light comprises one of a circle, a square, or a triangle. The first selection can be received via a GUI on a tablet computing device as described below. The first selection can be received via a light capture device as described below. The first selection can be received via an input/output device on a computing device (e.g., a desktop or laptop computer). The first selection can be received via a virtual interface using augmented reality devices or virtual reality devices.

At block 1120, process 1100 may include generating a second set of user interface elements configured to receive a second selection of an image for the virtual stage light. For example, the computing device may generate a second set of user interface elements configured to receive a second selection of an image for the virtual stage light, as described above. The second selection can be received via a GUI on a tablet computing device as described below. The second selection can be received via a light capture device as described below. The second selection can be received via an input/output device on a computing device (e.g., a desktop or laptop computer). The second selection can be received via a virtual interface using augmented reality devices or virtual reality devices.

At block 1130, process 1100 may include generating a third set of user interface elements configured to receive a third selection of a position and an orientation of the virtual stage light. For example, the computing device may generate a third set of user interface elements configured to receive a third selection of a position and an orientation of the virtual stage light, as described above. The third selection can be received via a GUI on a tablet computing device as described below. The third selection can be received via a light capture device as described below. The third selection can be received via an input/output device on a computing device (e.g., a desktop or laptop computer). The third selection can be received via a virtual interface using augmented reality devices or virtual reality devices.

In various implementations, the third set of user interface elements configured to receive the third selection of the position and an orientation of the virtual stage light comprise at least one of a rotation wheel, a latitude slider, a longitude wheel, a height slider, and a width slider.

At block 1140, process 1100 may include generating a fourth set of user interface elements configured to receive a fourth selection of a color for the virtual stage light. For example, the computing device may generate a fourth set of user interface elements configured to receive a fourth selection of a color for the virtual stage light, as described above. The fourth selection can be received via a GUI on a tablet computing device as described below. The fourth selection can be received via a light capture device as described below. The fourth selection can be received via an input/output device on a computing device (e.g., a desktop or laptop computer). The fourth selection can be received via a virtual interface using augmented reality devices or virtual reality devices.

In various implementations, the fourth set of user interface elements configured to receive the fourth selection of the color for the virtual stage light comprise at least one of a color wheel, a plurality of red green blue sliders, a plurality of Hue Saturation Value sliders, and a color temperature slider.

In various implementations, process 1100 includes generating a fifth set of user interface elements configured to receive a fifth selection of at least one of an intensity, an exposure, a softness, and a roundness of the virtual stage light.

In various implementations, process 1100 includes generating a plurality of software switches, the software switches comprising at least one of an active switch, an order switch, and a wrapping switch.

In various implementations, process 1100 includes generating a plurality of software switches, the plurality of software switches comprising at least one of a show border switch, a color and opacity switch, a display transform switch, and a gamut transformation switch.

Process 1100 may include additional implementations, such as any single implementation or any combination of implementations described below and/or in connection with one or more other processes described elsewhere herein.

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

In various embodiments, a computing device can include one or more memories; and one or more processors in communication with the one or more memories and configured to execute instructions stored in the one or more memories to performing operations of any of the methods described above.

In various embodiments, a computer-readable medium storing a plurality of instructions that, when executed by one or more processors of an electronic device, cause the one or more processors to perform operations of any of the methods described above.

Figure 12:
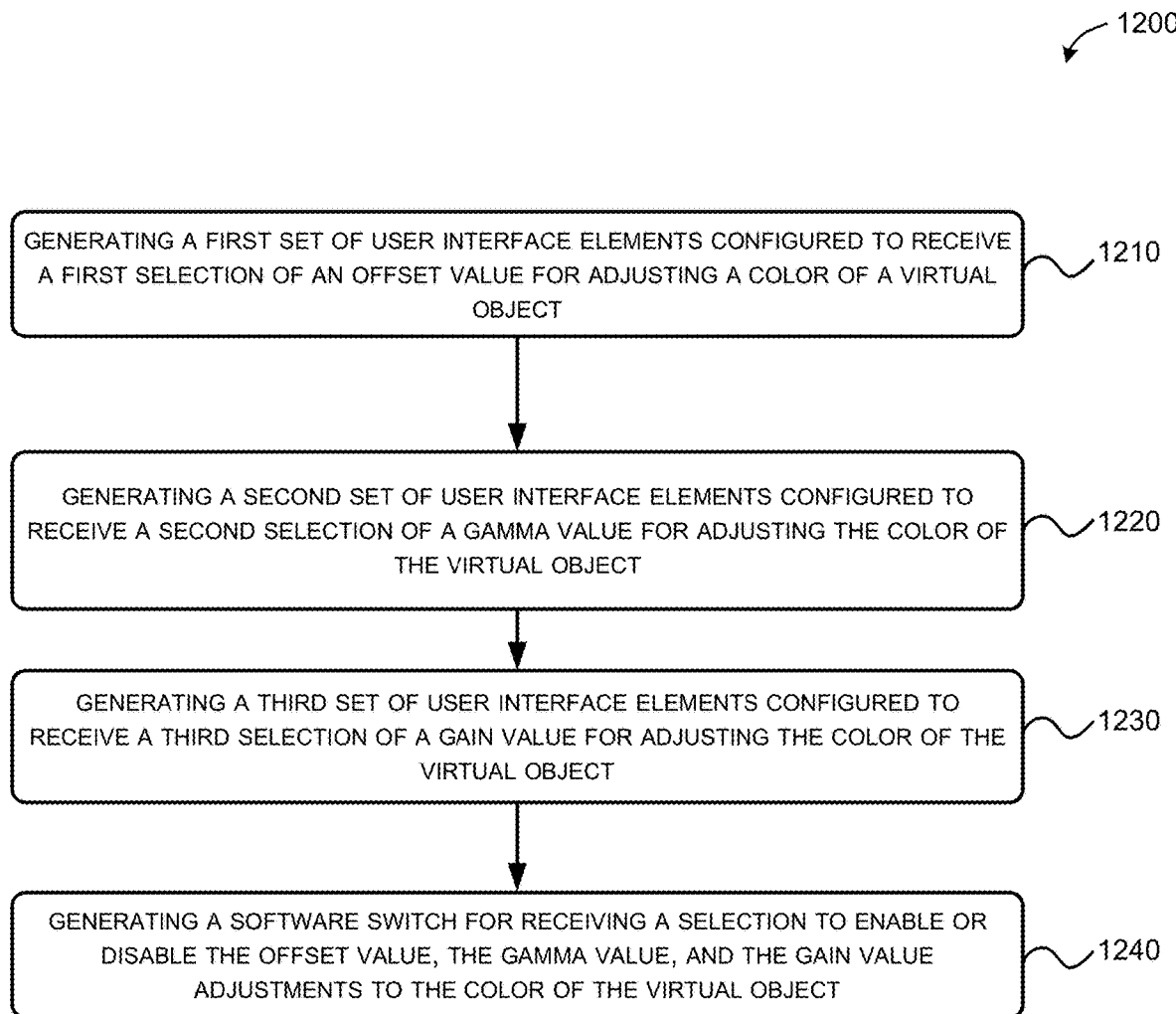
FIG. 12 is a flowchart of an example process associated with generation of a graphical user interface for color and lighting adjustment for immersive content production system.

FIG. 12 is a flowchart of an example process 1200 associated with generation of a graphical user interface for color and lighting adjustment for immersive content production system. In some implementations, one or more process blocks of FIG. 12 may be performed by a computing device (e.g., computing device 3100). In some implementations, one or more process blocks of FIG. 12 may be performed by another device or a group of devices separate from or including the computing device. Additionally, or alternatively, one or more process blocks of FIG. 10 may be performed by one or more components of device 3100, such as processing unit 3104, storage subsystem 3118, system memory 3110, cameras 3134, displays 3132, communications subsystems 3124, and bus 3102.

At block 1210, process 1200 may include generating a first set of user interface elements configured to receive a first selection of an offset value for adjusting a color of a virtual object. For example, the computing device may generate a first set of user interface elements configured to receive a first selection of an offset value for adjusting a color of a virtual object, as described above. The first selection can be received via a GUI on a tablet computing device as described below. The first selection can be received via a light capture device as described below. The first selection can be received via an input/output device on a computing device (e.g., a desktop or laptop computer). The first selection can be received via a virtual interface using augmented reality devices or virtual reality devices.

In a various implementations, at least one of the first, the second, or the third set of user interface elements comprise at least one of a color wheel, a plurality of Red Green Blue sliders, a plurality of Hue Saturation Value sliders, and a color temperature slider.

At block 1220, process 1200 may include generating a second set of user interface elements configured to receive a second selection of a gamma value for adjusting the color of the virtual object. For example, the computing device may generate a second set of user interface elements configured to receive a second selection of a gamma value for adjusting the color of the virtual object, as described above. The second selection can be received via a GUI on a tablet computing device as described below. The second selection can be received via a light capture device as described below. The second selection can be received via an input/output device on a computing device (e.g., a desktop or laptop computer). The second selection can be received via a virtual interface using augmented reality devices or virtual reality devices.

At block 1230, process 1200 may include generating a third set of user interface elements configured to receive a third selection of a gain value for adjusting the color of the virtual object. For example, the computing device may generate a third set of user interface elements configured to receive a third selection of a gain value for adjusting the color of the virtual object, as described above. The third selection can be received via a GUI on a tablet computing device as described below. The third selection can be received via a light capture device as described below. The third selection can be received via an input/output device on a computing device (e.g., a desktop or laptop computer). The third selection can be received via a virtual interface using augmented reality devices or virtual reality devices.

At block 1240, process 1200 may include generating a software switch for receiving a fourth selection to enable or disable the offset value, the gamma value, and the gain value adjustments to the color of the virtual object (block 1240). For example, the computing device may generate a software switch for receiving a selection to enable or disable the offset value, the gamma value, and the gain value adjustments to the color of the virtual object, as described above. The fourth selection can be received via a GUI on a tablet computing device as described below. The fourth selection can be received via a light capture device as described below. The fourth selection can be received via an input/output device on a computing device (e.g., a desktop or laptop computer). The fourth selection can be received via a virtual interface using augmented reality devices or virtual reality devices.

In various implementations, process 1200 includes generating a fourth set of user interface elements configured to receive a fourth selection of at least one of an exposure, a saturation, and a contrast of the virtual object.

In various implementations, process 1200 includes generating a fifth set of user interface elements configured to receive a fifth selection of at least one of a mix, a softness, and a roundness of the virtual object.

In various implementations, process 1200 includes generating a plurality of software switches, the plurality of software switches comprising at least one of a bounds switch, an all projectors switch, and an all cameras switch.

In various implementations, process 1200 includes generating a brightness slider for at least one of the first set of user interface elements, the second set of user interface elements, and the third set of user interface elements.

Process 1200 may include additional implementations, such as any single implementation or any combination of implementations described below and/or in connection with one or more other processes described elsewhere herein.

Although FIG. 12 shows example blocks of process 1200, in some implementations, process 1200 may include additional blocks, fewer blocks, different blocks, or differently arranged blocks than those depicted in FIG. 12. Additionally, or alternatively, two or more of the blocks of process 1200 may be performed in parallel.

In various embodiments, a computing device can include one or more memories; and one or more processors in communication with the one or more memories and configured to execute instructions stored in the one or more memories to performing operations of any of the methods described above.

In various embodiments, a computer-readable medium storing a plurality of instructions that, when executed by one or more processors of an electronic device, cause the one or more processors to perform operations of any of the methods described above.

Figure 13:
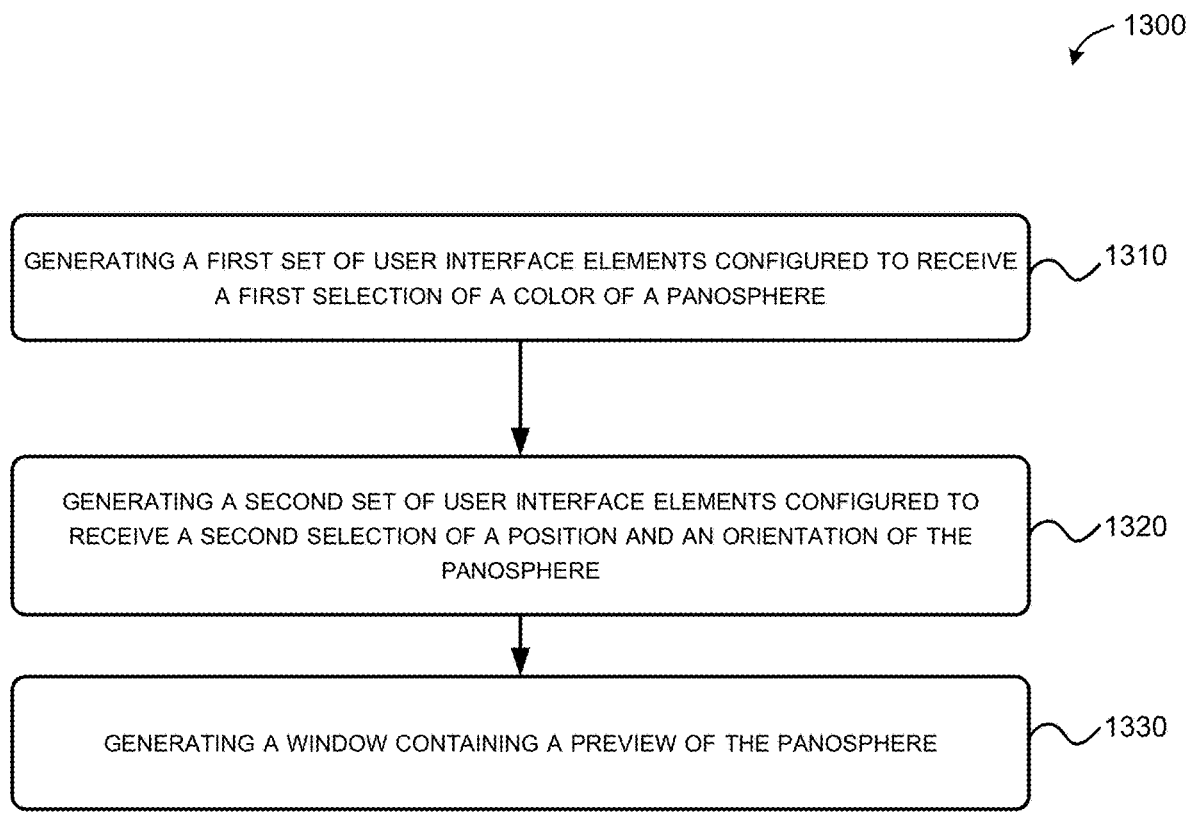
FIG. 13 is a flowchart of an example process associated with generation of a graphical user interface for color and lighting adjustment for immersive content production system.

FIG. 13 is a flowchart of an example process 1300 associated with generation of a graphical user interface for color and lighting adjustment for immersive content production system. In some implementations, one or more process blocks of FIG. 13 may be performed by a computing device (e.g., computing device 3100). In some implementations, one or more process blocks of FIG. 13 may be performed by another device or a group of devices separate from or including the computing device. Additionally, or alternatively, one or more process blocks of FIG. 10 may be performed by one or more components of device 3100, such as processing unit 3104, storage subsystem 3118, system memory 3110, cameras 3134, displays 3132, communications subsystems 3124, and bus 3102.

At block 1310, process 1300 may include generating a first set of user interface elements configured to receive a first selection of a color of a panosphere. For example, the computing device may generate a first set of user interface elements configured to receive a first selection of a color of a panosphere, as described above. The first selection can be received via a GUI on a tablet computing device as described below. The first selection can be received via a light capture device as described below. The first selection can be received via an input/output device on a computing device (e.g., a desktop or laptop computer). The first selection can be received via a virtual interface using augmented reality devices or virtual reality devices.

In various implementations, the first set of user interface elements configured to receive the first selection of the color for the panosphere comprise at least one of a color wheel, a plurality of Red Green Blue sliders, a plurality of Hue Saturation Value sliders, and a color temperature slider.

At block 1320, process 1300 may include generating a second set of user interface elements configured to receive a second selection of a position and an orientation of the panosphere. For example, the computing device may generate a second set of user interface elements configured to receive a second selection of a position and an orientation of the panosphere, as described above. The second selection can be received via a GUI on a tablet computing device as described below. The second selection can be received via a light capture device as described below. The second selection can be received via an input/output device on a computing device (e.g., a desktop or laptop computer). The second selection can be received via a virtual interface using augmented reality devices or virtual reality devices.

In various implementations, the second set of user interface elements configured to receive the second selection of the position and an orientation of the panosphere comprise at least one of a pan wheel, a tilt wheel, and a height slider.

At block 1330, process 1300 may include generating a window containing preview the panosphere. For example, the computing device may generate a window containing preview the panosphere, as described above.

In various implementations, process 1300 includes generating a third set of user interface elements configured to receive a third selection of at least one of an exposure, a saturation, and a contrast of the panosphere.

In various implementations, process 1300 includes generating a switch to receive a selection to invert movement of direction of at least one of second set of user interface elements for the panosphere.

In various implementations, process 1300 includes generating a switch to receive a selection for a fade to gray transition effect of the panosphere.

In various implementations, process 1300 includes generating a software switch for receiving a selection to enable or disable adjustments to the panosphere.

Process 1300 may include additional implementations, such as any single implementation or any combination of implementations described below and/or in connection with one or more other processes described elsewhere herein.

Although FIG. 13 shows example blocks of process 1300, in some implementations, process 1300 may include additional blocks, fewer blocks, different blocks, or differently arranged blocks than those depicted in FIG. 13. Additionally, or alternatively, two or more of the blocks of process 1300 may be performed in parallel.

In various embodiments, a computing device can include one or more memories; and one or more processors in communication with the one or more memories and configured to execute instructions stored in the one or more memories to performing operations of any of the methods described above.

In various embodiments, a computer-readable medium storing a plurality of instructions that, when executed by one or more processors of an electronic device, cause the one or more processors to perform operations of any of the methods described above.

VI. Color Correction Windows

Figure 14:
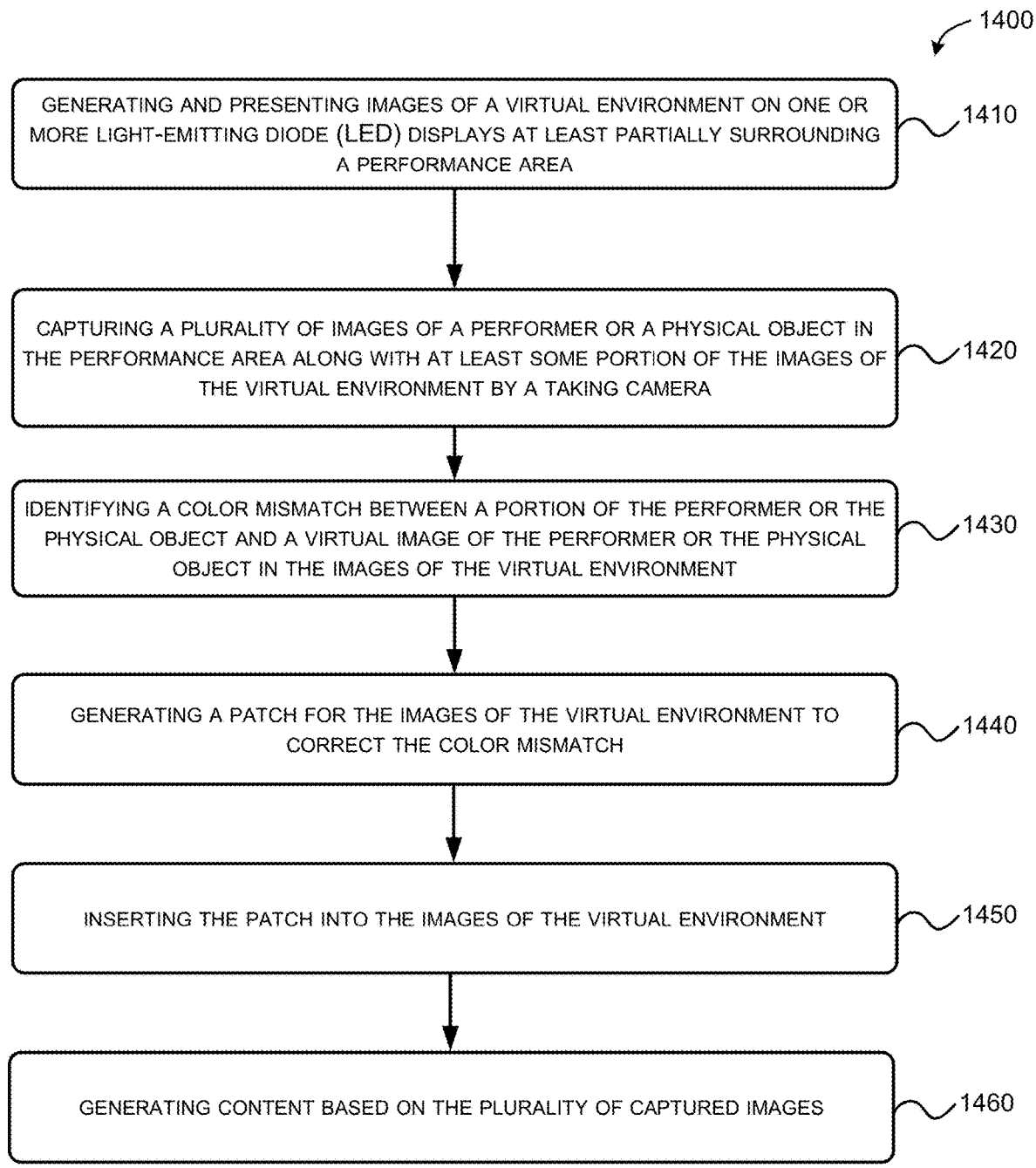
FIG. 14 is a flowchart of an example process associated with color adjustments for a panosphere for an immersive content production system.

FIG. 14 is a flowchart of an example process 1400 associated with color adjustments for immersive content production system. A color correction window can be used for a color correction edit (e.g., a gamma, gain, exposure) on a 2D region. In some implementations, one or more process blocks of FIG. 14 may be performed by a computing device (e.g., computing device 3100). In some implementations, one or more process blocks of FIG. 14 may be performed by another device or a group of devices separate from or including the computing device. Additionally, or alternatively, one or more process blocks of FIG. 10 may be performed by one or more components of device 3100, such as processing unit 3104, storage subsystem 3118, system memory 3110, cameras 3134, displays 3132, communications subsystems 3124, and bus 3102.

At block 1410, process 1400 may include identifying a color mismatch between a portion of the performer or the physical object and a virtual image of the performer or the physical object in the images of the virtual environment. For example, the computing device may identify a color mismatch between a portion of the performer or the physical object and a virtual image of the performer or the physical object in the images of the virtual environment, as described above.

At block 1420, process 1400 may include capturing a plurality of images of a performer or a physical object in the performance area along with at least some portion of the images of the virtual environment by a taking camera. For example, the computing device may identify a color mismatch between a portion of the performer or the physical object and a virtual image of the performer or the physical object in the images of the virtual environment, as described above.

At block 1430, process 1400 may include identifying a color mismatch between a portion of the performer or the physical object and a virtual image of the performer or the physical object in the images of the virtual environment. For example, the computing device may identify a color mismatch between a portion of the performer or the physical object and a virtual image of the performer or the physical object in the images of the virtual environment.

At block 1440, process 1400 may include generating a patch for the images of the virtual environment to correct the color mismatch. For example, the computing device may generate a patch for the images of the virtual environment to correct the color mismatch.

At block 1450, process 1400 may include inserting the patch into the images of the virtual environment. For example, the computing device may insert the patch into the images of the virtual environment.

At block 1460, process 1400 may include generating content based on the plurality of captured images. For example, the computing device may generate content based on the plurality of captured images.

In a first implementation, the patch is displayed flat with respect to the one or more LED displays.

In various implementations, process 1400 includes adjusting an intensity of the patch displayed on the one or more LED displays.

In various implementations, process 1400 includes adjusting a position of the patch displayed on the one or more LED displays.

In various implementations, process 1400 includes adjusting an orientation of the patch displayed on the one or more LED displays.

In various implementations, process 1400 includes adjusting an exposure of the patch displayed on the one or more LED displays.

In various implementations, process 1400 includes adjusting a size of the patch displayed on the one or more LED displays.

Process 1400 may include additional implementations, such as any single implementation or any combination of implementations described below and/or in connection with one or more other processes described elsewhere herein.

Although FIG. 14 shows example blocks of process 1400, in some implementations, process 1400 may include additional blocks, fewer blocks, different blocks, or differently arranged blocks than those depicted in FIG. 14. Additionally, or alternatively, two or more of the blocks of process 1400 may be performed in parallel.

In various embodiments, a computing device can include one or more memories; and one or more processors in communication with the one or more memories and configured to execute instructions stored in the one or more memories to performing operations of any of the methods described above.

In various embodiments, a computer-readable medium storing a plurality of instructions that, when executed by one or more processors of an electronic device, cause the one or more processors to perform operations of any of the methods described above.

FIG. 15 illustrates a track pad user interface 1500. The track pad user interface 1500 can be execute on a computing device (e.g., a tablet computer or a notebook computer). The track pad user interface 1500 connects with the immersive content production system 900 via a wireless protocol (e.g., Bluetooth, Bluetooth Low Energy, Wi-Fi, etc.).

The enabled switch 1502 can turn the functions of the user interface on and off. The enabled switch 1502 can turns on/off a reticle or pointer on the immersive content display screens. As shown in FIG. 15, the enabled switch 1502 has been selected to an "ON" position.

The point space button 1506 can reconfigure the drawing area 1504 depending on the pointer area. The pointer space button 1506 can allow for selection of wall mode using a wall button 1506 or ceiling mode using a ceiling button 1508. The wall mode refers to projection of the pointer on the semicircular LED wall area as described above. The ceiling mode refers to projection of the pointer on the LED displays mounted on the ceiling in the performance area of the immersive content production system. As shown in FIG. 15, the wall mode button 1506 has been selected. In various embodiments, a floor mode button 1508 can be selected.

The pointer mode buttons can allow an operator to select an absolute mode button 1512 or a relative mode button 1514 to select the coordinate system used by the pointer. By selecting the absolute mode button 1512, the coordinates of the drawing area 1504 represents the entire wall area in the performance area of the immersive content production system. In FIG. 15, the absolute mode button 1512 is selected. The relative mode button 1514 enable a relative mode for the pointer and can allow for zooming into a particular area of the displays to provide for greater detail. A reset mode button 1518 can reset the track pad user interface 1500 to a default setting upon selection.

The absolute coordinate system 1514 can be labelled from 0 degrees to 165 degrees to the right of a center of the display and 0 degrees to 195 degrees to the left of the center of the display. The left and right edges of the drawing area 1504 represent 180 degrees absolute.

The relative coordinate system 1516 can be labeled 12 o'clock to 5:30 o'clock (to the right of the center of the display) and 12 o'clock to 6:30 o'clock to the left of center of the display. The left and right edges of the drawing area 1504 represent 6 o'clock relative.

The point color button 1520 allows for changing the color of the pointer on the display. A pointer's enabled button 1522 allows for enabling or disabling of all pointers on the displays. The recent selection button 1524 allows preservation of one or more objects in the display that have been recently (e.g., within a predetermined time period) tapped on by the user. FIG. 15 indicates no recent selections 1526. The point at current selection button 1528 allows for moving the pointer to an area designated by one or more other controllers for the immersive content generation system (e.g., a central control table).

The selection mode buttons allows provide a set ("equals") mode button 1530 to select virtual objects within the 3D scene by tapping inside of the drawing area 1504. An addition ("union") button 1532 can allow for adding one or more additional object(s) from the 3D scene to the global list of selected scene elements/objects. A subtraction mode button 1534 allows the operator to remove scene elements from the globally-selected scene elements/objects. The highlight disabled button 1536 allows for disabling the highlighted areas in the drawings area 1504. The zoom factor button 1538 allows for selection of a zoom factors from a plurality of zoom factors for the drawing area 1504. In FIG. 15, the selected zoom factor is 1.0.

FIG. 16 illustrates a stage positioning panel 1600. The stage positioning panel 1600 can be used to designate a center point 1602 (e.g., an origin or motion capture stage origin point). The center point 1602 is a point in the performance area from the virtual scene is projected from. This can be a central location in the virtual scene. It may be desirable to relocate the center point 1602 due to filming requirements to another location in the performance area. For example, the starting position for characters in the virtual scene can be moved during filming. The stage positioning panel 1600 can be used for stage alignment to meet the director preferences.

The stage positioning panel 1600 can provide location information 1604 (e.g., in X, Y, Z coordinates) for the center point 1602. A reset-X button can reset the X position for the center point 1602 to a default X value. A reset-Y button 1608 can reset the Y position for the center point 1602 to a default Y value. The reset-Z button 1610 can reset the Z position for the center point 1602 to a default Z value. The reset all button 1612 can reset the X position, the Y position, and the Z position of the center point 1602 to a default X, Y, and Z values.

A rotation value 1614 allows for rotating the scene at the center point 1602 by a number of degrees by an operator entering a number (e.g., 0 to 360 degrees). A virtual rotation dial 1616 allows a user to turn the virtual rotation dial 1616 via a touchscreen interface to rotate the scene at the center point 1602. The sensitivity and scale of the virtual rotation dial 1616 can be adjusted to allow for fine or coarse adjustment.

A Move-Y selector 1618 can be a virtual slider switch that can allow a user to fine tune the Y value of the center point 1602 by moving the slider bar. A Move-XY selector 1618 can be a virtual controller to move and fine tune the position of the center point 1602 by moving the virtual controller via a touch interface.

The stop virtual button 1622 can cease the movement of the center point 1602. The movement scale can be adjusted using a movement scale virtual slider 1624. The movement scale value 1626 can be displayed on the stage positioning panel 1600.

A virtual slider bar 1628 can provide for adjustment of the position of the center point 1602. The fine-tuned Y slider 1630 can allow for fine-tuned adjustments of the Y-values for the center point 1602 by a using applying touch movements along the fine-tuned Y slider 1630. The fine-tuned X slider 1632 can allow for fine-tuned adjustments of the X-values for the center point 1602 by a using applying touch movements along the fine-tuned X slider 1632. The fine-tuned Z slider 1634 can allow for fine-tuned adjustments of the Z-values for the center point 1602 by a using applying touch movements along the fine-tuned Z slider 1634.

A set as origin button 1636 can allow for designating the current position of the center point 1602 as the new origin. This can overwrite the previously stored value for the origin. A reset to initial origin button 1638 can allow the origin point to be reset to the previously stored origin value. The Reset to World 1610 button can reset the current position of the center point 1602 to the 3D scene's world origin value, typically (0.0, 0.0, 0.0).

Figure 17:
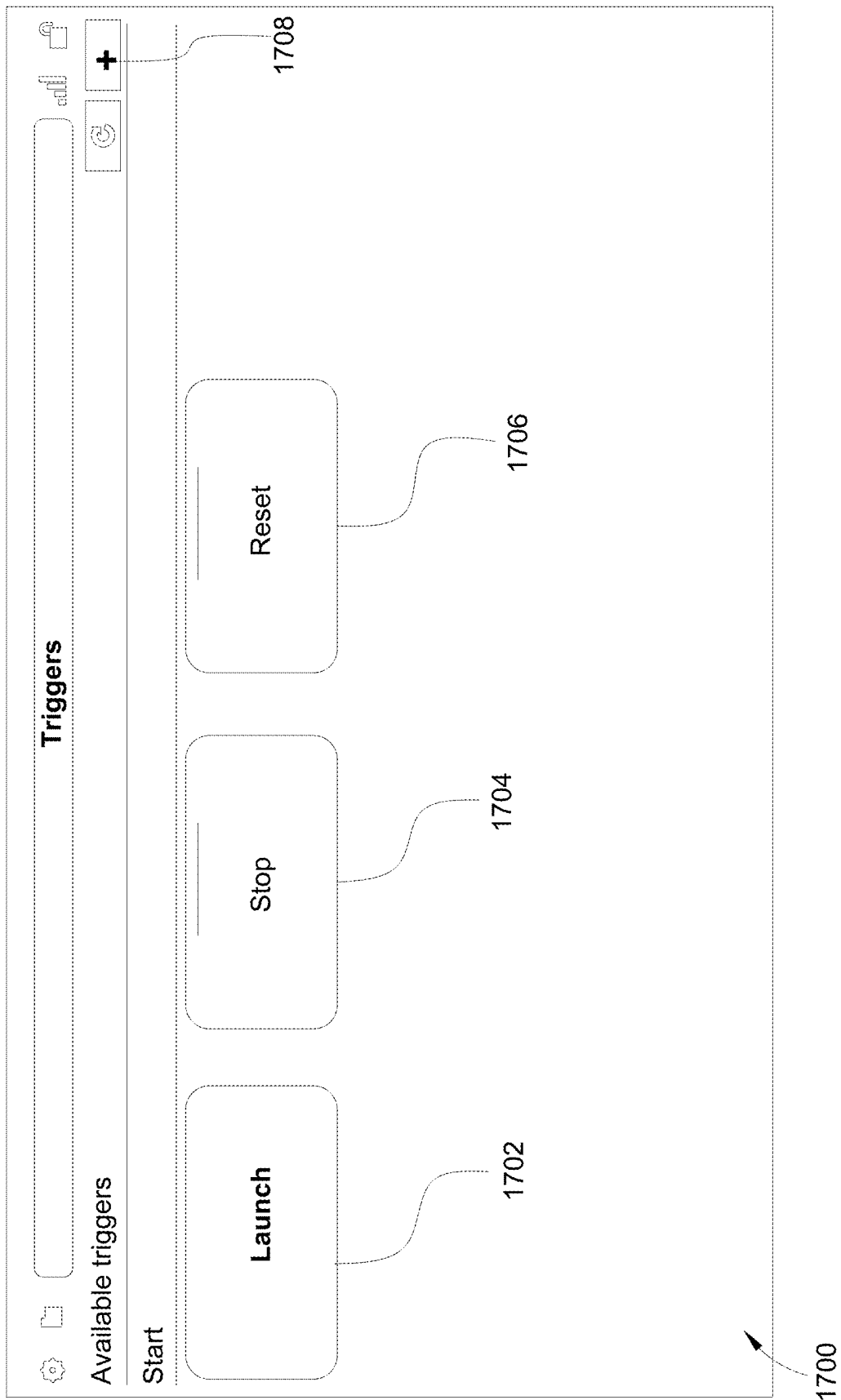
FIG. 17 illustrates an animation triggers panel according to various aspects of the disclosure.

FIG. 17 illustrates an animation triggers panel 1700. Operators can program a variety of animations for displaying on the immersive content display panels. The animations can include explosions, weather events (e.g., tornadoes, lightning), fireworks, a starship jumping to hyperspace, etc. The animations can be stored in the immersive content production system to be triggered at the right point in time which can be synchronized with the live actors in the performance area. The animations can allow for the effects to be more dynamic and meet the dynamic needs of a director's requests for the actors' performance. The triggering of the animations may not always occur at a fixed point in time because often the timing can depend on actions or cues from human actors.

The animation triggers can initiate changes in lighting effects and not just visual effects. The animation triggers panel 1700 can be used for re-timing animations.

The animation triggers panel 1700 can allow an operator to select one or more pre-programmed animations. The operator can depress a launch button 1702 at the right point in time to trigger the selected animation. The operator can depress a stop button 1704 to end the selected animation. A reset button 1706 can restore the animations to a start of the action.

The animations triggers panel 1700 can include many different animations that can be added using an addition button 1708 and selected by the operator. The animations triggers panel 1700 can be adjustable to list the animations in a sequence as desired by the operator.

Figure 18:
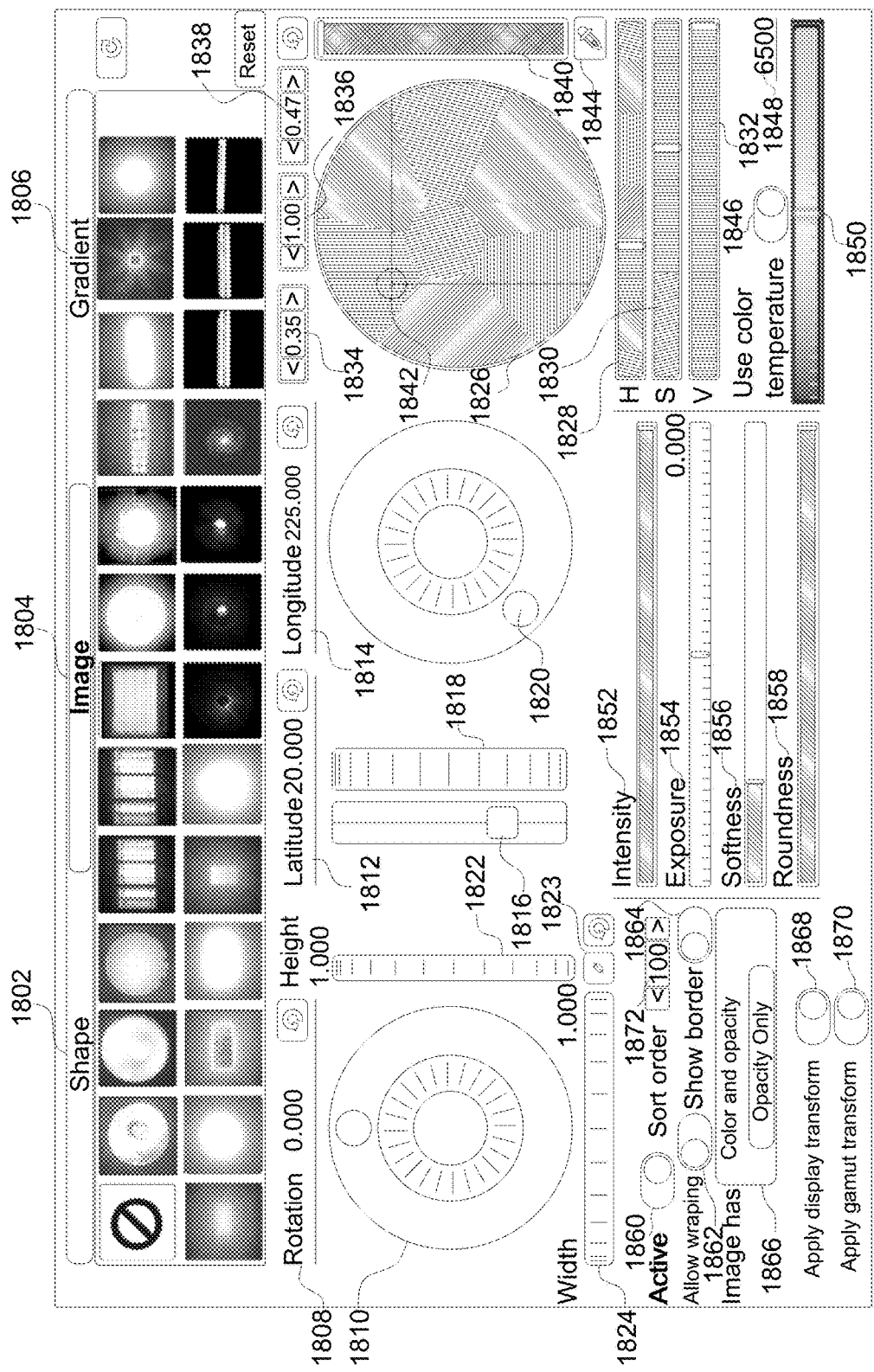
FIG. 18 illustrates a virtual stage lights panel according to various aspects of the disclosure.

FIG. 18 illustrates a virtual stage lights panel 1800. The operator can use the virtual stage lights panel 1800 to generate and adjust one or more virtual stage lights as discussed above. A virtual stage light can include at least three overarching features: a shape 1802, an image 1804, and a gradient 1806. In various embodiments, the shape 1802 of the virtual stage lights can be one of a square, a rectangle, a circle, a rounded square, or a triangle. Other shapes can be selected. The shape 1802 can define the outline of the virtual stage light.

The operator can select an image 1804 for the virtual stage light. The virtual stage lights can be drawn to simulate various different images (e.g., a round light, a group of lights, or the light from the moon). The operator can select one of a plurality of images 1804 of various lights to map onto the selected shape 1802. If the no image indicator 1806 is selected the virtual stage light can appear as the shape 1802 that has been selected (e.g., a rectangle, circle, triangle, etc.) For example, by mapping an image 1804 onto a shape 1802, the appearance of a virtual stage light can replicate the selected image. A street lamp virtual stage light can be mapped onto an image 1804 that replicates a street lamp. The virtual stage lights panel 1800 can provide gradient controls 1806 for defining an edge of the virtual stage light (e.g., the edge can be sharp or blurred).

The virtual stage lights panel 1800 can provide controls for varying the location and orientation of the virtual stage lights on the displays. A rotation value 1808 can indicate the current rotation value for the virtual stage lights. The rotation controller 1810 can allow an operator to adjust the rotation value through the virtual adjustment wheel. The latitude value 1812 value and the longitude value 1814 of a center of the virtual stage light can be displayed on the virtual stage lights panel 1800. The latitude position of the center of the virtual stage light can be modified using a coarse virtual latitude slider 1816. A latitude position fine-tune controller 1818 can be used to make minor adjustments to the latitude value 1812 for the location of the center of the virtual stage light. A longitude position controller 1820 can be used to adjust a position of the center of the virtual stage light. A fine-tuned controller can also be provided for minor adjustments in the longitude of the position of the center of the virtual stage light 1800.

Each virtual stage light can have various size properties defined by using the virtual stage lights panel 1800. A height indicator 1822 can define a height of a virtual stage light. A width indicator 1824 can define a width of the virtual stage light. An aspect ratio lock 1823 can be used to lock the aspect ratio of width to height. With the aspect ratio lock 1823 engaged adjusting either the height or width of the virtual stage light will adjust the other value to maintain the aspect ratio of the virtual stage light.

A color wheel 1826 can allow the operator to select a color value for the virtual stage light. The operator can select a particular color on the color wheel. Alternatively, the operator can select a Hue value 1828, a saturation value 1830, and a luminosity value 1832 (HSV) from the HSV Color Scale. The HSV scale provides a numerical readout of a selected color that corresponds to the color names contained therein. Hue can be measured in degrees from 0 to 360. For instance, cyan falls between 181-240 degrees, and magenta falls between 301-360 degrees. The luminosity value and saturation of a color are both analyzed on a scale of 0 to 100 percent. Most digital color selection interfaces can be based on the HSV scale, and HSV color models are particularly useful for selecting precise colors for virtual stage lights in the display.

Alternatively, the color for the virtual stage lights can be defined using a red, green, blue (RGB) color model. The RGB color model can be based on the color theory that all visible colors can be made using the additive primary colors of red, green, and blue. As the operator adjusts the amount these basic colors, you can create a variety of different colors. The red value 1834, green value 1836, and blue value 1838 can be presented on the virtual stage lights panel 1800 for the selected color.

An opacity slider 1840 can be used to adjust the alpha channel (e.g., how opaque versus transparent) that Lightcard itself is. A gradient scale 1840 illustrates a fine tuned color for a selected color value 1842. A color picker 1844 (e.g., eye dropper icon) allows an operator to match an existing color from other virtual objects for use for a virtual stage light.

A color temperature selector 1846 allows an operator to select a specific color temperature value of the base color (or white color). Color temperature can be described as warmer (orange) or cooler (blue). Color temperature is a way to describe the light appearance provided by a light bulb. It is measured in degrees of Kelvin (K) on a scale from 1,000 to 12,000. A color temperature value 1848 (e.g., 6500 Kelvin) can be entered by the operator. A color temperature slider 1850 can allow for fine tuning the specific color temperature value 1848. The color temperature slider 1850 can be move to the left for warmer values and to the right to colder values.

All of the different ways to change or select a color of the tint of the virtual stage light can be connected together. Therefore, if an operator selects a color from the color wheel 1826 based on the position of the color selector 1842, the red value 1834, green value 1836, and blue value 1838 can be changed based on the selection. In addition, the Hue value 1828, a saturation value 1830, and a luminosity value 1832 (HSV) from the HSV Color Scale will change for the selection. Similarly changing the HSV values can change the red value 1834, green value 1836, and blue value 1838 displayed and the position of the color selection 1842.

The virtual stage lights panel 1800 can allow the operator to select an intensity value 1852, an exposure value 1854, a softness value 1856, and a roundness value 1858 for virtual stage lights. The intensity value 1852 can be a luminous intensity that can be measured in lumens per steradian or candela. The exposure value 1854 defines an amount of light in a scene. The softness value 1856 is another property of light. Soft light is light that tends to "wrap" around objects, projecting diffused shadows with soft edges, whereas hard light is more focused and produces harsher shadows. The hardness or softness of light depends mostly on three features of the source: the size of its surface, its distance from the object, and the thickness of its diffusion material. A large, distant light source with thick diffusion material will produce softer lighting than one that is smaller and closer to the subject, with thinner diffusion material. Here, Softness and Roundness can be used to specify the edge of the Lightcard "shape"—softness larger means it is a more "feathered" edge.

The roundness value 1858 is another property of the virtual stage lights. The roundness value 1858 changes the shape of the light from a square at 0, to rounded corners, to a disk at 1.

The active switch 1860 allows an operator to turn on and off the virtual stage light. FIG. 18 illustrates the active switch 1860 in the "ON" position. The wrapping switch 1862 allows an operator to wrap the virtual stage light between different displays, modifying how the Lightcard is projected onto the display surfaces. The show border switch 1865 displays a border around the Lightcard on the displays. The color and opacity selector 1866 can allow the Lightcard to display an image using either RGB or full-RGBA properties. The transform switch 1868 can apply a display transform to the virtual stage light. The gamut transform switch 1870 applies a gamut transformation to the virtual stage light. Gamut mapping is the problem of transforming the colors of image or video content so as to fully exploit the color palette of the display device. Gamut and Display Transform can be related to whether the operator wants the Lightcard (or Sticker) to be affected by scene-level color correction or not, and if their values should change when the "Color Pipeline" changes. For example, if the camera operator puts a different lens on the taking/shooting camera, the color pipeline can change and the way that colors are interpreted needs to change to reflect the needs of the new lens. The question for Lightcards then becomes, "Should this lightcard change to reflect the change in lens? Or should it stay the same?"

A Lightcard, like a "real life light", does not change itself when the color pipeline changes. Imagine a real-life lightbulb on set—if a set crew changes what is happening inside of the stage, the costumes, the backgrounds the real-life light does not change and it just keeps shining at the same brightness and the same intensity and color etc. Lightcards are not affected by the color pipeline changes (lens changes, camera body changes, etc.)

A Sticker, on the other hand, can often be used to patch up the scene or something else, and therefore it is used to 'blend' elements in the 3D scene. When the lens changes and color interpretation changes as a result it can be desirable for stickers to have those "Color Transforms" applied.

So, Gamut and Display Transform can be used to be specifiable individually. In various embodiment, an operator may choose either a Sticker or a Lightcard and the Gamut/Display decision can be made internally depending on the selection. The selection at creation-time implies an expected workflow if something triggers a change in the color pipeline (e.g., a change in lens or camera body) during a shoot. The sort order selector 1872 can control the "Z-depth" of the various Lightcards so the operator can control which Lightcard drawings on top of other Lightcards that overlap.

Figure 19:
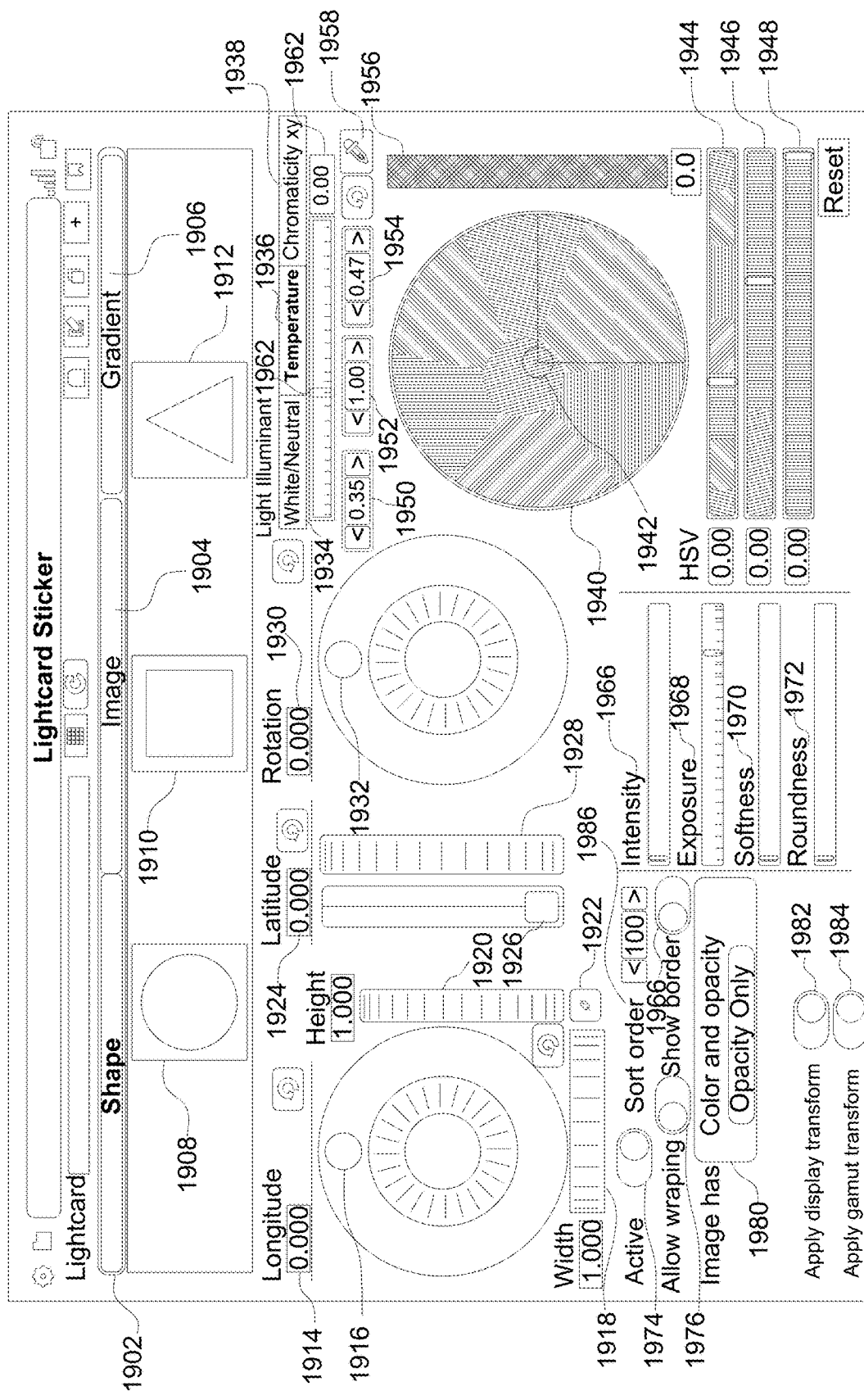
FIG. 19 illustrates a virtual stage light/stickers panel according to various aspects of the disclosure.

FIG. 19 illustrates a second virtual stage lights/sticker panel 1900. FIG. 19 has similar functions as virtual stage lights panel 1600, described for FIG. 16, but has the additional functionality for adjusting an appearance and location of 2-D virtual objects (e.g., stickers). The operator can use the virtual stage lights/sticker panel 1900 to generate and adjust one or more virtual stage lights and/or stickers. The virtual stage light/sticker panel 1900 can include tabs to select features of a selected virtual stage light and/or a selected sticker. The tabs can include a shape tab 1902, an image tab 1904, and a gradient tab 1906. As illustrated in FIG. 19, the shape tab 1902 is selected. In various embodiments, the shape of the virtual stage light and/or sticker can be one of a circle 1908, a square 1910, or a triangle 1912. Other shapes can be included. The shape tab 1902 can define the outline of the virtual stage light and/or sticker.

Using the image tab 1904, the operator can select one of a plurality of images 1904, as shown in FIG. 18, of various lights to map onto the shape. A gradient tab 1906 can allow the operator to adjust the edge of the virtual stage light and/or sticker (e.g., the edge can be sharp or blurred).

The virtual stage lights/sticker panel 1900 can provide controls for varying the location and orientation of the virtual stage light and/or sticker on the displays. A longitude positon indicator 1914 can present the current longitude position of a center of the virtual stage light and/or sticker on the display. The operator can adjust the longitude position of the virtual stage light and/or sticker using the virtual longitude controller dial 1916. A fine-tuned controller can also be provided for minor adjustments in the longitude of the position of the center of the virtual stage light and/or sticker.

Each virtual stage light and/or sticker can have various size properties defined by using the virtual stage lights/sticker panel 1900. A width slider 1918 can be used to adjust the width of the virtual stage light and/or sticker. A height slider 1920 can adjust the height of the virtual stage light and/or sticker. An aspect ratio lock 1922 can be used to lock the aspect ratio of width to height. With the aspect ratio lock 1922 engaged adjusting either the height or width of the virtual stage light and/or sticker will adjust the other value to maintain the aspect ratio of the virtual stage light and/or sticker.

The latitude position indicator 1924 can indicate a current latitude position of the center of the virtual stage light and/or sticker on the display. The latitude position of the virtual stage light and/or sticker can be modified using a coarse virtual latitude slider 1926. A latitude position fine-tune controller 1928 can be used to make minor adjustments to latitude for a position of the center of the virtual stage light and/or sticker.

A rotation value 1930 can indicate the current rotation value for the virtual stage light and/or sticker. The rotation controller 1932 can allow an operator to adjust the rotation value 1930 through the virtual adjustment wheel 1932.

A light illuminant portion of the virtual stage light/sticker panel 1900 can allow for adjustment of a color for the virtual stage light and/or sticker. A white/neutral button 1934, a temperature button 1936, and a chromaticity button 1938 can be presented on the virtual stage light panel 1900.

A color wheel 1940 can allow an operator to define a color value for the virtual stage light and/or sticker. The operator can select a particular color selection 1942 on the color wheel. Alternatively, the operator can select a Hue value 1944, a saturation value 1946, and a luminosity value 1948 from the HSV Color Scale. The HSV scale provides a numerical readout of a selected color that corresponds to the color names contained therein.

Alternatively, the color for the virtual stage light and/or sticker can be defined using a red, green, blue (RGB) color model. The RGB color model can be based on the color theory that all visible colors can be made using the additive primary colors of red, green, and blue. The red value 1950, green value 1952, and blue value 1954 can be presented on the display for the selected color 1942.

An opacity slider 1840 can be used to adjust the alpha channel (e.g., how opaque versus transparent) that Lightcard or Sticker is for a selected color value 1942. A color picker 1958 (represented by an eye dropper) allows an operator to match an existing color for use for a virtual stage light and/or sticker.

A color temperature selector 1942 allows an operator to select a specific color temperature value of the base color. A color temperature value 1962 can be entered by an operator. A color temperature slider 1964 can allow for fine tuning the specific color temperature value 1962.

All of the different ways to change the color or the tint of the virtual stage light are connected together. Therefore, if an operator selects a color from the color wheel, the red value 1950, green value 1952, and blue value 1954 will be represented for the selection. In addition, the Hue value 1944, a saturation value 1946, and a luminosity value 1948 (HSV) from the HSV Color Scale will change for the selection.

The virtual stage lights/sticker panel 1900 can allow the operator to select an intensity value 1966, an exposure value 1968, a softness value 1970, and a roundness value 1972 for virtual stage lights. The intensity value 1966 can be a luminous intensity that can be measured in lumens per steradian or candela. The exposure value 1968 defines an amount of light in a scene. The softness value 1970 is another property of light. Soft light is light that tends to "wrap" around objects, projecting diffused shadows with soft edges, whereas hard light is more focused and produces harsher shadows. The hardness or softness of light depends mostly on three features of the source: the size of its surface, its distance from the object, and the thickness of its diffusion material. A large, distant light source with thick diffusion material will produce softer lighting than one that is smaller and closer to the subject, with thinner diffusion material.

The roundness value 1972 is another property of the virtual stage lights. The roundness value 1972 changes the shape of the light from a square at 0, to rounded corners, to a disk at 1.

The active switch 1974 allows an operator to turn on and off the virtual stage light and/or sticker. The wrapping switch 1976 allows an operator to wrap the virtual stage light and/or sticker between different displays. The show border switch 1978 allows for showing the border. The color and opacity selector 1980 can allow the operator to select color and opacity or opacity only. The transform switch 1982 can apply a display transform to the virtual stage light and/or sticker. The gamut transform switch 1984 applies a gamut transformation to the virtual stage light and/or sticker. Gamut mapping is the problem of transforming the colors of image or video content so as to fully exploit the color palette of the display device. The sort order selector 1886 can control the "Z-depth" of the various Lightcards/Stickers so the operator can control which Lightcard/Stickers drawings on top of other Lightcards/Stickers that overlap.

Figure 20:
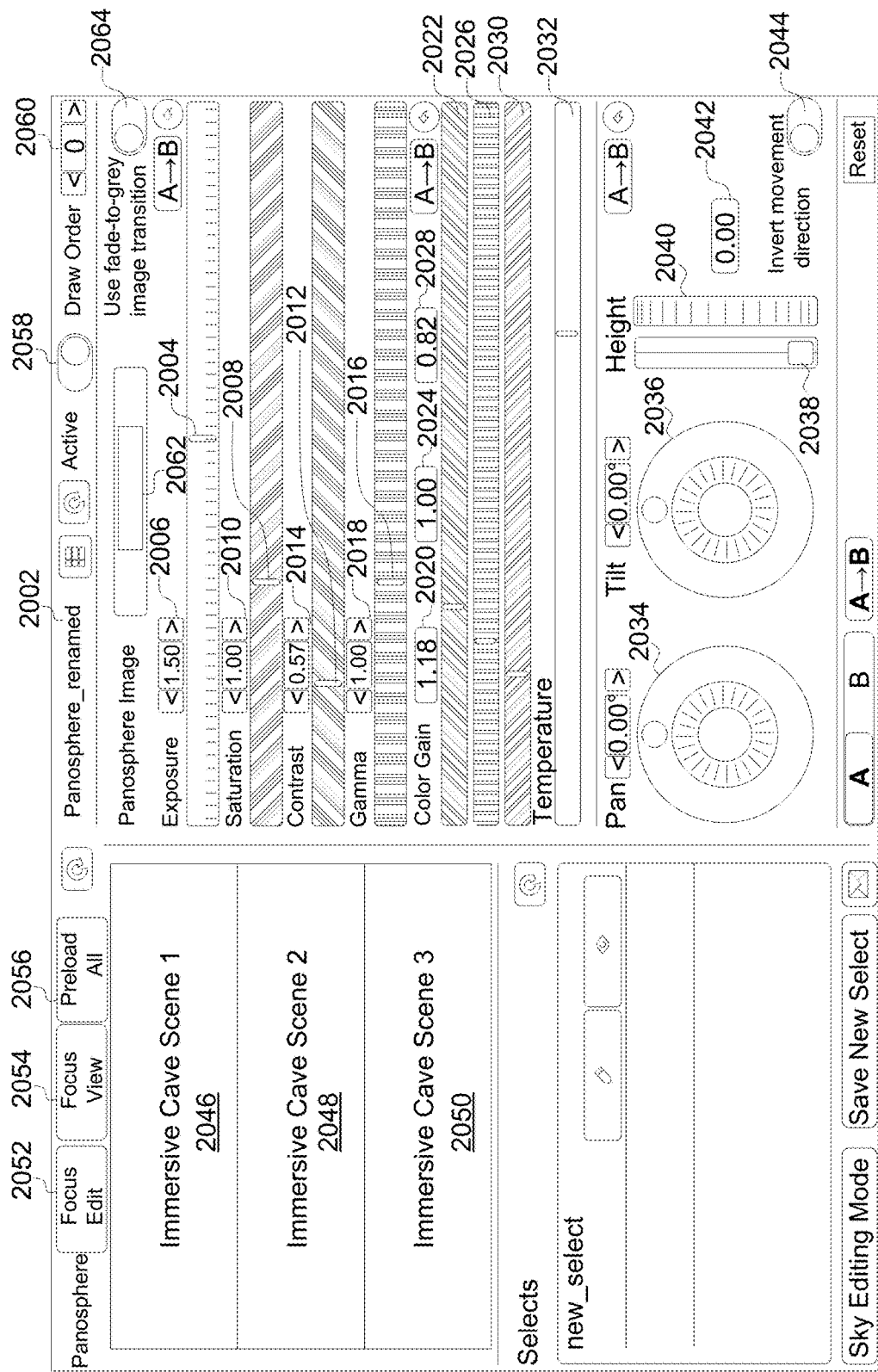
FIG. 20 illustrates a panosphere control panel according to various aspects of the disclosure.

FIG. 20 illustrates a first panosphere control panel 2000 for controlling the appearance of a sky portion of a three-dimension scene of the immersive content generation system. The panosphere can be a panoramic photo stitched together from a single point in every direction. The panosphere can be a portion of the sky that can be defined by latitude/longitude coordinates. As an example, a panosphere can be used for a virtual reality headset in looking at the sky the image is replicated for 360 degrees around. These images can be captured at various locations around the world using spherical cameras and connected together. In general, panospheres are used to depict elements that are a far distance away (e.g., infinite distance). In various embodiments the panosphere can include multiple panosphere layers put on top of each other (e.g., a haze pass, a background, clouds, other planets, stars). These other elements can be broken up into multiple panosphere layers and presented together in a certain order. In various embodiments, the different layers can move independent of each other (e.g., movement of planets across the sky).

The operator can adjust the color, position, and lightning characteristics of the panosphere in a scene using the controls on the panosphere control panel 2000. The panosphere control panel 2000 can include many of the same lighting controls as shown for FIGS. 18 and 19.

The operator can create a new panosphere image file or load a panosphere image file from memory. The name 2002 of the panosphere image file can be displayed.

The operator can adjust the exposure of the panosphere using the exposure slider 2004. The exposure value 2006 can be displayed.

The operator can adjust the saturation of the panosphere using the saturation slider 2008. The saturation value 2010 can be displayed.

The operator can adjust the contrast of the panosphere using the contrast slider 2012. The contrast value 2014 can be displayed.

The operator can adjust the gamma of the panosphere using the gamma slider 2016. The gamma value 2018 can be displayed.

The color gain can be adjusted via a plurality of sliders. The operator can adjust the red color value 2020 of the panosphere using the red color slider 2022. The operator can adjust the green color value 2024 of the panosphere using the green color slider 2026. The operator can adjust the blue color value 2028 of the panosphere using the blue color slider 2030. The operator can adjust the temperature of the panosphere using the temperature slider 2032.

The operator can rotate the panosphere around a center point using the pan wheel 2034. The operator can adjust the tilt of the panosphere using the tilt wheel 2036.

The operator can adjust the height of the panosphere using a coarse height adjustment slider 2038 and a fine height adjustment slider 2040. The height value 2042 can be presented on the display. The operator can invert the movement direction using the invert switch 2044.

A first preview box 2046 can display a preview of a first scene. A second preview box 2048 can display a preview of a second scene. A third preview box 2050 can display a preview of a third scene. The first preview box 2046, the second preview box 2048, and third preview box 2050 provide static and/or animated backgrounds that can be loaded into the immersive content generation system.

A focus edit button 2052 can allow for editing the focus point of the display. The focus view button can display the focus point on the display. These buttons scroll the "focus" of the scroll list on the left hand side (that contains all the possible Panosphere images that can be loaded). An operator can scroll the list to the currently-selected pano image—either the one that is currently being edited or the one that is currently being "viewed" (aka loaded on the walls). It is possible that the currently-being-edited and currently-being-viewed pano selection is the same image (shown in a row in the list of selectable images) or could be different ones. The preload all button 2056 allows various panosphere images to be preloaded. The active switch 2058 allows the panosphere images to activated or de-activated on the immersive content displays. The draw order selector 2060 allows for designation of the order for various images of the panosphere. The panosphere image 2062 displays the color of the panosphere. The fade-to-gray image transition switch 2064 allows for toggling the fading feature on and off.

Figure 21:
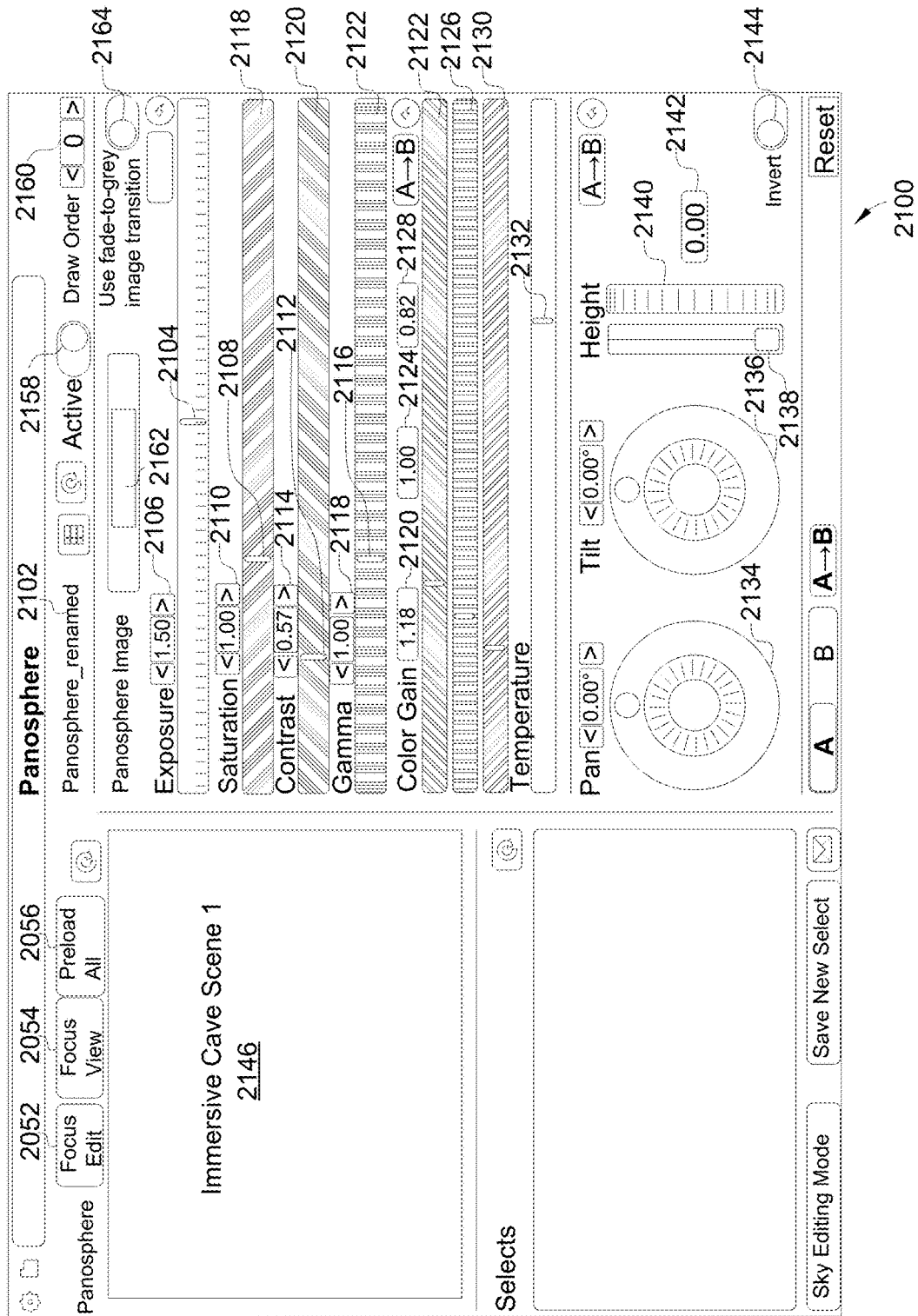
FIG. 21 illustrates an alternate panosphere control panel according to various aspects of the disclosure.

FIG. 21 illustrates a second panosphere control panel 2100 for controlling the appearance of a sky portion of a three-dimension scene of the immersive content generation system. The panosphere is just a panoramic photo stitched together from a single point in every direction. The panosphere can be a portion of the sky that is defined by latitude/longitude coordinates. As an example, a panosphere can be used for a virtual reality headset in looking at the sky the image is replicated for 360-degrees around. These images can be captured at various locations around the world using spherical cameras and connected together.

The operator can adjust the color, position, and lighting characteristics of the panosphere in a scene using the controls on the panosphere control panel 2100. The panosphere control panel 2100 can include many of the same lighting controls as shown for FIGS. 16 and 17.

The operator can create a new panosphere image file or load a panosphere image file from memory. The name 2102 of the panosphere image file can be displayed.

The operator can adjust the exposure of the panosphere using the exposure slider 2104. The exposure value 2106 can be displayed.

The operator can adjust the saturation of the panosphere using the saturation slider 2108. The saturation value 2110 can be displayed.

The operator can adjust the contrast of the panosphere using the contrast slider 2112. The contrast value 2114 can be displayed.

The operator can adjust the gamma of the panosphere using the gamma slider 2116. The gamma value 2118 can be displayed.

The color gain can be adjusted via a plurality of sliders. The operator can adjust the red color value 2120 of the panosphere using the red color slider 2122. The operator can adjust the green color value 2124 of the panosphere using the green color slider 2126. The operator can adjust the blue color value 2128 of the panosphere using the blue color slider 2130. The operator can adjust the temperature of the panosphere using the temperature slider 2132.

The operator can rotate the panosphere around a center point using the pan wheel 2134. The operator can adjust the tilt of the panosphere using the tilt wheel 2136.

The operator can adjust the height of the panosphere using a coarse height adjustment slider 2138 and a fine height adjustment slider 2140. The height value 2142 can be presented on the display. The operator can invert the movement direction using the invert switch 2144.

The A/B and A->B switches can be used for comparing a set of values the an operator has chosen to an alternate set of values. The same A/B switcher can be used on the Color Correction panel as well. The setup is that the operator will get some selection of settings in a way they like it—and then then want to experiment with changing some subset of the edited values, whilst leaving some others the same. They then want to visually compare the two buckets of settings. In effect "they want to 'A/B' it".

For example, an operator can dial in a few values and then the operator can think perhaps both exposure should go up 2 stops and saturation should maybe also go down but a couple of units. The current switch A or B is auto-set to the existing values. The operator can then use A->B to PUSH those current values of all sliders/dials to the "B" set. This would make switching between A and B have no effect since the two contain identical settings. Then while on "B", they will 'stop up' exposure a bit and dial down saturation, say. The operator can then, with a single button, swap all the controls back to the previously saved "A" state, and then back to B, back to A, etc. To flick the settings all together back and forth, usually while looking up at the walls to judge the result of the settings changes. Finally, the operator may decide they prefer A or B, and will stick with that and move onto a new task, or they will adjust some more settings and continue to run comparisons of A (or B) vs their 'baseline' (the opposite one, B, or A).

A first preview box 2146 can display a preview of a first scene. A focus edit button 2052 can allow for editing the focus point of the display. The focus view button 2054 can display the focus point on the display. The preload all button 2056 allows various panosphere images to be preloaded. The active switch 2158 allows the panosphere images to activated or de-activated on the immersive content displays. The draw order selector 2160 allows for designation of the order for various images of the panosphere. The panosphere image 2162 displays the color of the panosphere. The use fade to gray image transition 2164 allows for toggling the fading feature on and off.

Figure 22:
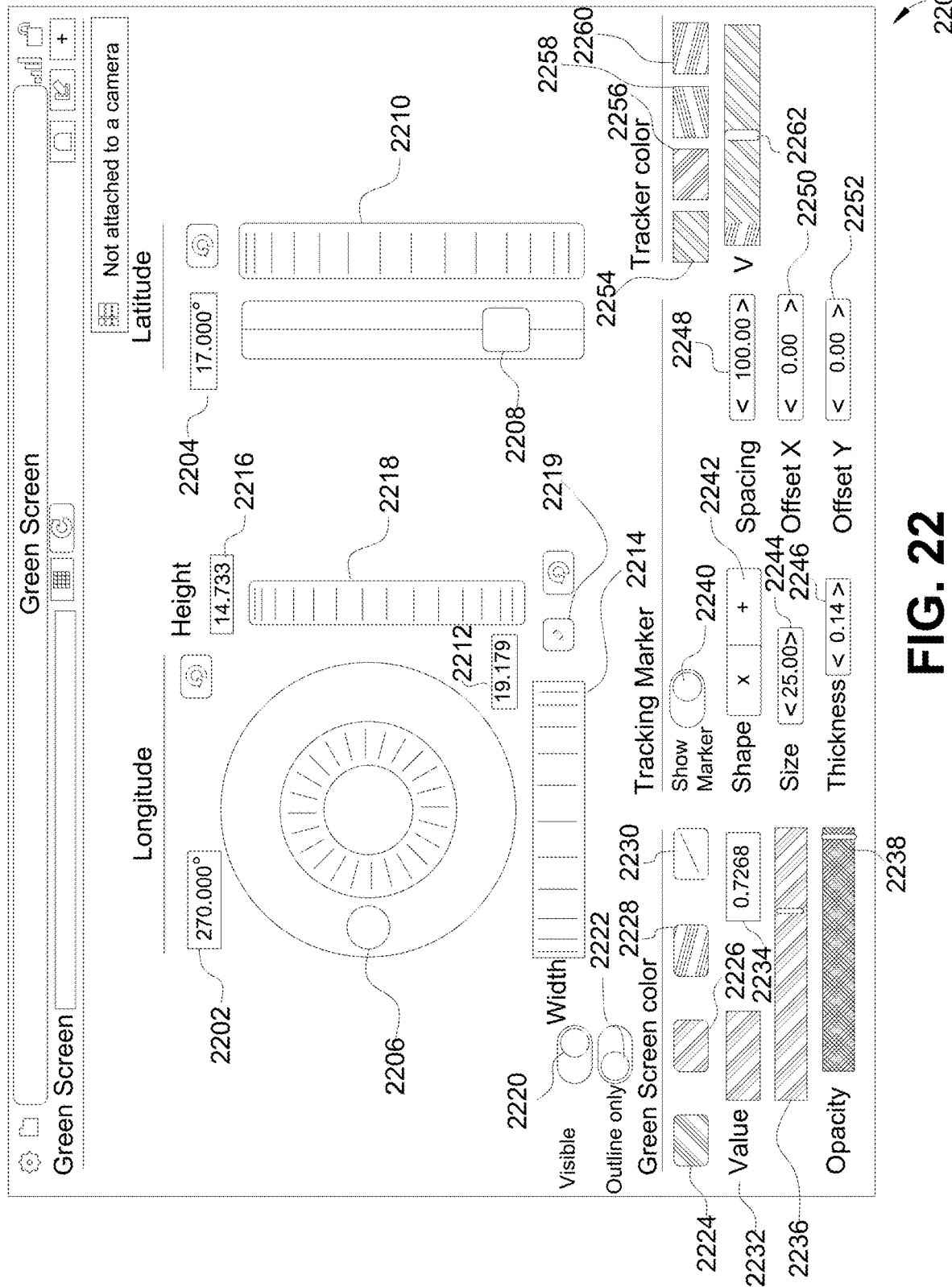
FIG. 22 illustrates a detached virtual green screen panel according to various aspects of the disclosure.

FIG. 22 illustrates a detached virtual green screen panel 2200. The virtual green screen can be attached or detached to a driving motion-capture camera. The virtual green screen panel 2200 is an example of virtual green screen controls for a detached virtual green screen. The detached virtual green screen panel 2200 is similar to virtual stage light controls in terms of placements. For certain captured images it may not be possible to capture an in-camera final set of images using the taking camera. In these cases a virtual green screen can be used to block images behind the actor(s) that can be replaced by computer graphics during the post-production visual effects stage of the production pipeline. This allows the benefits of using the benefits of lighting effects that the immersive content system provides for the rest of the volume in the performance area. As a detached green screen it can be placed somewhere in the volume similar to virtual stage lights (e.g., moving around the space, change the height and width, turn it on or off, change the color (e.g., a green screen or blue screen)).

The detached virtual green screen panel 2200 can display the longitude value 2202 and latitude value 2204 of the virtual green screen. The operator can adjust the latitude value 2202 using the longitude adjustment wheel 2206 and the latitude value 2204 using the latitude coarse adjustment slider 2208 and/or the latitude fine adjustment slider 2210.

The operator can adjust a width value 2212 of the green screen using a width adjustment slider 2214. The operator can adjust a height value 2216 using a height adjustment slider 2218. An aspect ratio lock 2219, if selected, the aspect ratio lock 2219 maintains an aspect ratio of the virtual green screen. If the aspect ratio lock 2219 is selected, a change in width will result in a corresponding change in height and vice versa.

A visible switch 2220 makes the virtual visible on the displays if the visible switch 2220 is activated. The immersive content generation system can generate an outline around the virtual green screen if the outline only switch 2222 is selected. The detached virtual green screen panel 2200 can allow an operator to select the green screen color. In various embodiments, a green screen button 2224, a blue screen button 2226, a black screen button 2228, and a colorless or transparent "green" screen button 2230 can be selected. The detached virtual green screen panel 2200 can present the selected color value image 2232 and a numerical color value 2234. A color value slider 2236 allows for adjustment of the color of the virtual green screen. This can be simply a 0->1 slider that controls the same value from the numerical color value entry box (2234). The operator may want to enter an exact floating point number for the Value of the color, (this is the "V" value from the "HSV" system, by the way), or the operator may just want to slide it.

Pressing color value slider 2232, it pops up a color wheel similar to what you see on the Lightcard panel for setting the RGB/HSV with a circular color wheel type control. This affects the value as well of course. The color wheel and additional "V" can be used by the operator to dial back the intensity of the green or blue color if it is too intense of a green, for instance, and is resulting in too much bright green 'light spill' from the walls onto the actors. This can result in more post-production visual effects work needing to happen to remove that effect.

The operator can adjust the opacity of the detached virtual green screen 2200 using an opacity slider 2238.

The detached virtual green screen panel 2200 can also provide various tools for adjusting tracking markers. Tracking markers can be "Xs" or pluses ("+") that can be displayed on the screen. A show marker switch 2240 allows the markers to be toggled on and off on the display. The operator can adjust the shape of the markers using the shape switch 2242 to switch between an x or a plus markers. The operator can adjust the size of the marker using the size selector 2244. The operator can adjust the thickness of the marker using the thickness selector 2246. The operator can adjust a spacing of the tracking markers using the spacing adjustment 2248. The operator can adjust an offset of the various markers from the virtual green screen by entering an X-offset using the offset-X selector 2250. The operator can enter a Y-offset using the offset-Y selector 2252.

The operator can select at least one of a green color 2254, a blue color 2256, a white color 2258, and a black color 2260 for the tracker. The operator can adjust a value for the tracker using the value slider 2262. The detached virtual green screen panel 2200 can have preset colors for commonly used tracker colors like black or white or green. But an operator may want a 'less intense green'—so rather than offering full HSV control, which may be done in some embodiments— the detached virtual green screen panel 2200 can display some preset buttons here and add a "Value" only slider to reduce the V of the HSV system. This allows the operator to dial-back the intensity as needed on the tracking markers for the same reasons as described above for the green screen color itself.

Figure 23:
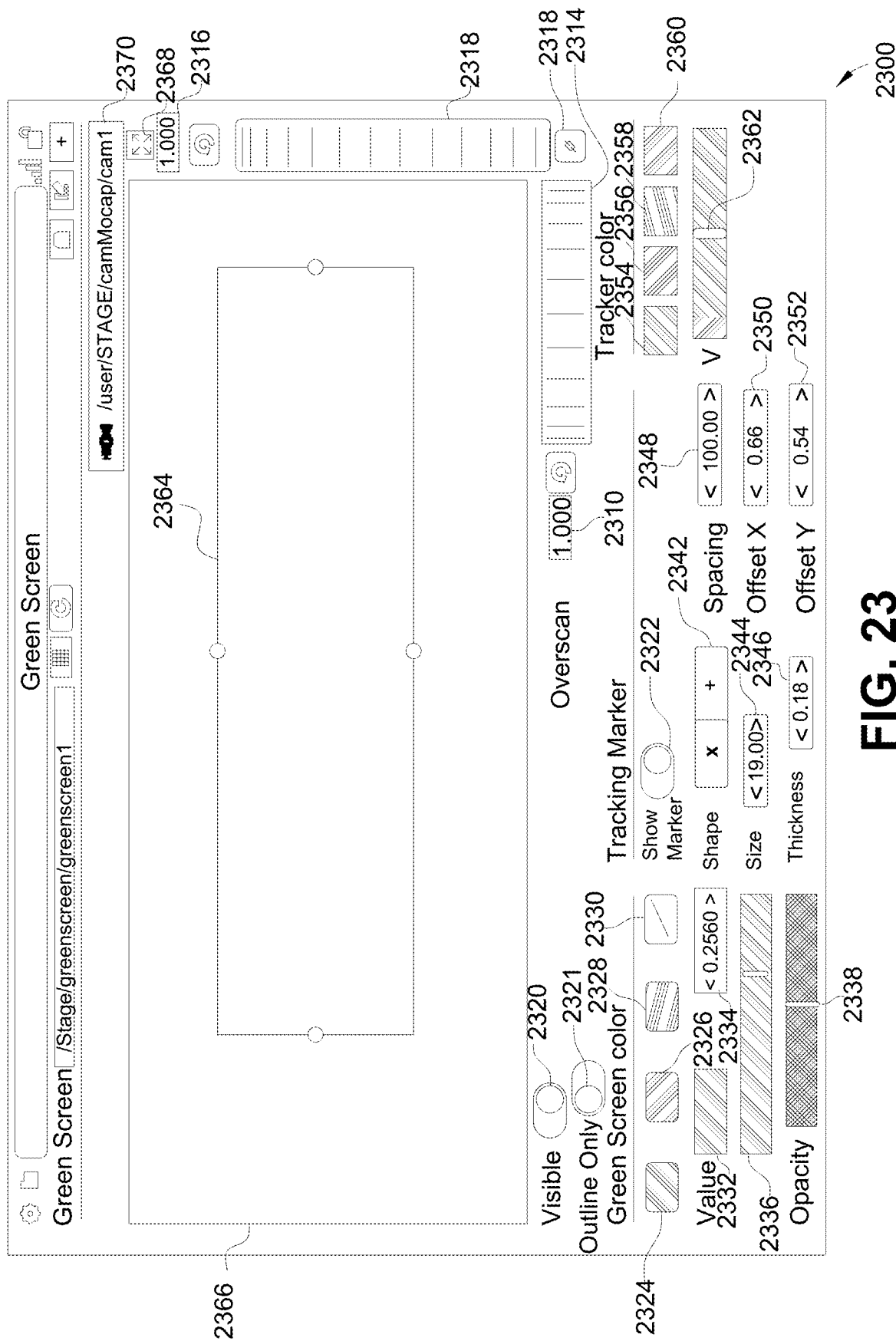
FIG. 23 illustrates an attached virtual green screen panel according to various aspects of the disclosure.

FIG. 23 illustrates an attached virtual green screen panel 2300. The attached virtual green screen panel 2300 can be attached to one of the motion capture tracking cameras. The attached virtual green screen panel 2300 allows the operator to change the shape of the virtual green screen within the frustum of the camera (so the virtual green screen may not take up the entire viewing area). For example, box 2364 defines an area for the virtual green screen which can be a portion of the entire frustum 2366. The fit one-to-one button 2368 expands the box 2364 until it matches the size of the entire frustum 2366. The attached virtual green screen can be attached to various cameras. For example, the camera identifier 2370 indicated that this attached virtual green screen is attached to camera 1. In various embodiments, there can be multiple taking cameras and there can be different attached virtual green screens attached to different taking cameras. Alternatively or additionally, the attached virtual green screens can be detached and moved around (thereby becoming a detached virtual green screen 2200 as discussed for FIG. 22).

The operator can adjust a width value 2310 of the green screen using a width adjustment slider 2314. The operator can adjust a height value 2316 using a height adjustment slider 2318. An aspect ratio lock 2318, if selected, maintains an aspect ratio of the virtual green screen. If the aspect ratio lock 2318 is selected, a change in width will result in a corresponding change in height and vice versa.

A visible switch 2320 makes the virtual green screen visible on the displays if the visible switch 2320 is activated. The immersive content generation system can generate an outline around the virtual green screen if the outline only switch 2321 is selected. The virtual green screen panel 2300 can allow an operator to select the green screen color. In various embodiment, a green screen 2324, a blue screen 2326, a black screen 2328, and a colorless or transparent "green" screen 2330. The virtual green screen panel 2300 can present the selected color value 2332 and a numerical value 2334. A color value slider 2336 allows for adjustment of the color of the virtual green screen.

The operator can adjust the opacity of the virtual green screen using an opacity slider 2338.

The virtual green screen panel 2300 can also provide various tools for adjusting tracking markers. A show marker switch 2322 allows the markers to be toggled on and off on the display. The operator can adjust the shape (e.g., a plus sign (+) or an (x)) of the markers using the shape switch 2342. The operator can adjust the size of the marker using the size selector 2344. The operator can adjust the thickness of the marker using the thickness selector 2346. The operator can adjust a spacing of the tracking markers using the spacing adjustment selector 2348. The operator can adjust an X-offset using the offset-X selector 2350. The operator can adjust a Y-offset using the offset-Y selector 2352.

The operator can select at least one of a green color 2354, a blue color 2356, a white color 2358, and a black color 2360 for the tracker. The operator can adjust a value for the tracker using the value slider 2362. The detached virtual green screen panel 2200 can have preset colors for commonly used tracker colors like black or white or green. But an operator may want a 'less intense green'—so rather than offering full HSV control, which may be done in some embodiments—the detached virtual green screen panel 2200 can display some preset buttons here and add a "Value" only slider to reduce the V of the HSV system. This allows the operator to dial-back the intensity as needed on the tracking markers for the same reasons as described above for the green screen color itself.

Figure 24:
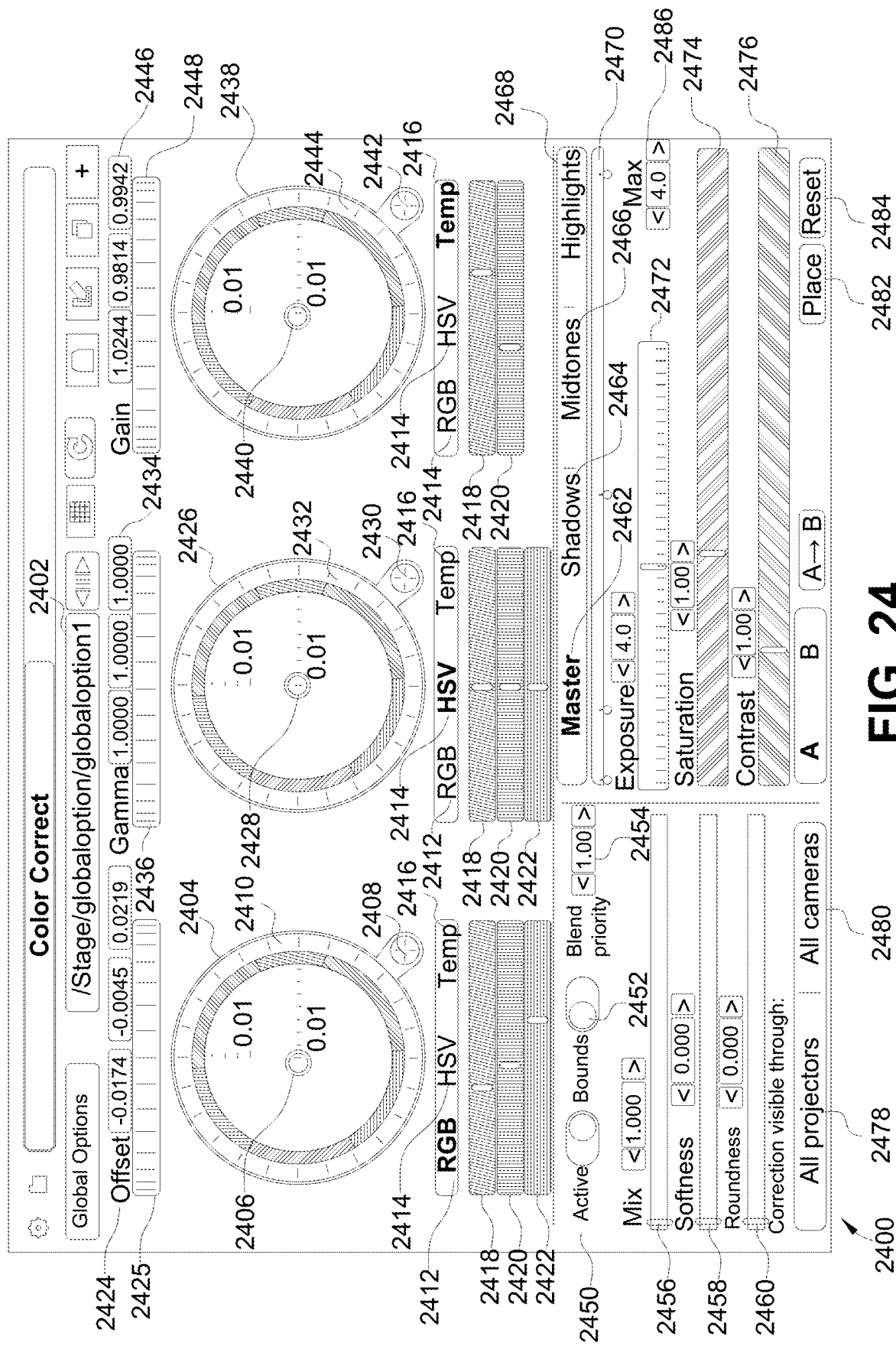
FIG. 24 illustrates a color correction panel according to various aspects of the disclosure.

FIG. 24 illustrates a color correction panel 2400. The color correction panel 2400 can allow for adjustment or correction of colors for virtual objects displayed on the LED displays. This color correction can be done to seamlessly blend the physical world (e.g., actors and props in the performance area) and the virtual world depicted on the LED displays. The color correction allows an operator to match the colors of objects and/or actors in the real world with depictions in the virtual world in such a way to reduce the amount of post-production work. In this way the film crew can achieve as many in-camera finals as possible, thereby minimizing the costs and associated time with producing realistic visual effects.

Color wheels are one of the most basic color correction controls. The color wheels represent the color spectrum on a circle and let the operator adjust color in the 2D space of the wheel. The color wheels start out with a movable dot or circle in the center of the wheel. Dragging the dot toward a color area adjusts the color of the image in that direction. The angle at which the operator drags the moveable dot determines the color(s) the operator adjusts, so dragging the dot into the red-orange area makes the overall color more red-orange. The further away from the center of the wheel that the operator drags, the more the operator increases the saturation of the color that the operator is dragging toward.

A color correction can be described as moving a dot or circle away from the opposite color on the wheel. So, if the selected object has an image that is predominately blue, dragging the dot away from the blue area reduces the amount of blue in the image. Color wheels often include a slider to control the brightness, either as a dial around the edge of the wheel or as a straight slider underneath it.

When using the color correction panel 2400, the operator can select a volume, a section, a patch, an object, a window, a sticker, or a portion of the display for correction. For example, the item identifier 2402 lists a volume, a section, a patch, an object, a window, a sticker, or a portion of the display for correction.

In various embodiments, the color correction panel 2400 can present three dials to adjust the color values.

The operator can adjust the offset using the offset dial 2404. The offset dial 2404 can be used to controls shadows/blacks of an image. The offset dial 2404 can achieve this changing the brightness/color levels while leaving mid tones and highlight areas unaffected. The offset selector 2406 can allow the operator to change the value of the offset by sliding the offset selector 2406 within the offset dial 2404. An offset reset button 2408 sets the offset values to be reset to zero. The offset adjustment ring 2410 allows the operator to change the scale for the offset values by rotating the offset adjustment ring 2410. By rotating the offset adjustment ring 2410 the scale inside the offset dial 2404 can change. For example, the scale can be in ones, tens, thousandths, hundredths, or hundred thousandths. The variable scale allows for fine tuning the offset value.

Color sliders let the operator manipulate the red, green, blue, and brightness values directly. The operator can control exactly how much of each color is desired. The operator can change the values of the sliders between using the RGB button 2412, the HSV button 2414, and the Temp button 2416 to allow the operator to change the slider scales. If the RGB button 2412 is selected, as shown in FIG. 24, the first slider 2418 illustrates a red value, the second slider 2420 illustrates a green value, and the third slider 2422 illustrates a blue value. The offset dial 2404 and the first slider 2418, the second slider 2420, and the third slider 2422 are linked together so as the operator moves the offset selector 2406 position, the first slider 2418, the second slider 2420, and the third slider 2422 indicators change corresponding to the selected color adjustment.

The offset values 2424 can be shown numerically on the display. An offset brightness slider 2425 can be used to adjust the brightness value for the offset correction.

The operator can adjust the gamma using the gamma dial 2426. The gamma dial 2426 can be used to control the mid tones (middle gray levels) of an image. The color correction panel 2400 can have offset, gamma, and gain wheels affect the shadows OR the mid tones OR the highlights of the image (OR all at once). In various embodiments, it is not the case that offset is only for shadows, gamma is only for midtones, and gain is only for highlights. The "switcher" to choose (2468) controls which range is currently being edited by ALL of the controls—so if the operator choose shadows there on the switcher, then all three of offset, gamma, and gain wheels can be used, and are frequently used, to edit the shadow 'range' of colors in the scene. The gamma dial 2426 can achieve this by changing the brightness/color levels of the mid tones while leaving the darks and highlighted areas unaffected. The gamma selector 2428 can allow the operator to change the value of the gamma by sliding the gamma selector 2428 within the gamma dial 2426. A gamma reset button 2430 can reset the gamma value to zero. The gamma adjustment ring 2432 allows the operator to change the scale for the gamma value by rotating the gamma adjustment ring 2432. By rotating the gamma adjustment ring 2432 the scale inside the gamma dial 2426 can change. For example, the scale can be in ones, tens, thousandths, hundredths, or hundred thousandths. The variable scale allows for fine tuning the gamma value.

Color sliders let the operator manipulate the red, green, blue, and brightness values directly. The operator can control exactly how much of each color is desired. The operator can change the values of the sliders between using the RGB button 2412, the HSV button 2414, and the Temp button 2416 to allow the operator to change the slider scales. If the RGB button 2412 is selected, as shown in FIG. 24, the first slider 2418 illustrates a red value, the second slider 2420 illustrates a green value, and the third slider 2422 illustrates a blue value. If the HSV value button 2414 is selected (as shown for gamma dial 2426), the first slider 2418 illustrates Hue value, the second slider 2420 illustrates saturation value, and the third slider 2422 illustrates luminance value.

The gamma values 2434 can be shown on the display. A gamma brightness slider 2436 can be used to adjust the brightness value for the gamma correction.

The operator can adjust the gain using the gain dial 2438. The gain dial 2438 can be used to control the highlights or white levels of an image. In various embodiments, the gain dial 2438 can achieve this by changing the brightness/color levels of the highlights or white levels while leaving the darks and mid tone areas unaffected. The color correction panel 2400 can have offset, gamma, and gain wheels affect the shadows OR the mid tones OR the highlights of the image (OR all at once). In various embodiments, it is not the case that offset is only for shadows, gamma is only for midtones, and gain is only for highlights. The "switcher" to choose (2468) controls which range is currently being edited by ALL of the controls—so if the operator choose shadows there on the switcher, then all three of offset, gamma, and gain wheels can be used, and are frequently used, to edit the shadow 'range' of colors in the scene. The gain selector 2440 can allow the operator to change the value of the gain by sliding the gain selector 2440 within the gain dial 2438. A gain reset button 2442 can reset the gain values to zero. The gain adjustment ring 2444 allows the operator to change the scale for the gain by rotating the gain adjustment ring 2444. By rotating the gain adjustment ring 2444 the scale inside the gain dial 2426 can change. For example, the scale can be in ones, tens, thousandths, hundredths, or hundred thousandths. The variable scale allows for fine tuning the gain value.

Color sliders let the operator manipulate the red, green, blue, and brightness values directly. The operator can control exactly how much of each color is desired. The operator can change the values of the sliders between using the RGB button 2412, the HSV button 2414, and the Temp button 2416 to allow the operator to change the slider scales. If the RGB button 2412 is selected, as shown in FIG. 24, the first slider 2418 illustrates Red value, the second slider 2420 illustrates Green value, and the third slider 2422 illustrates Blue value. If the HSV value button 2414 is selected (as shown for gamma dial 2426), the first slider 2418 illustrates Hue value, the second slider 2420 illustrates saturation value, and the third slider 2422 illustrates luminance value. If the Temp button 2416 is selected (as shown for the gain dial 2438), the first slider 2418 can control a temperature value and the second slider 2420 can control a magenta slider.

The gain values 2446 can be shown on the display. A gain brightness slider 2448 can be used to adjust the brightness value for the gain correction.

The color correction active switch 2450 enables or disables the color correction for the selected object. The color correction active switch 2450 can be akin to visibility control so the operator can turn on or off the state of the color correction. For example, if the operators has a color correction value for warming up a region on the display (e.g., making it a little bit more orange or yellow) for an exhaust pipe from a motorbike or automobile. The operator can turn it off using the color correction active switch 2450 and see the scene without the results of the color correction enabled.

The color correction bounds switch 2452 allows the display to show the bounds of the region/object/volume in which the color correction is applied on the display. The blend priority value 2454 allows for controlling the rendering priority of one color correction node over another one (e.g., sort order button as described above).

The mix slider 2456 allows the operator to apply a global multiplier to the color correction. A mix value of zero is essentially off value. A mix value of one means the global multiplier is fully applied. The mix slider 2456 provides a scale on the amount of how much the color correction actually contributes to the total color of the selected region/object/volume. In effect, the mix slider 2456 provides a way to turn down the effect of this particular color correction.

The softness slider 2458 allows the operator to adjust the softness of the color correction.

The roundness slider 2460 allows the operator to adjust the roundness of the color correction.

The operator can select the region for the color correction using a Master tab 2462, a Shadows tab 2464, a mid-tones tab 2464 and a Highlights tab 2468 and corresponding region slider 2470. By selecting the Master tab 2462, the color correction is acting upon everything. The shadows, mid tones, and highlights are defined by that region slider 2470. On the region slider 2470, between the first dot and the second dot is considered shadows. Between the second dot and the third is considered mid tones. Between the third dot and the end dot is considered highlights. The operator can change the position of each of these dots. For example, if the scene is very bright the region slider 2470 can adjust the position of the dots to reduce the brightness. The operator may cut highlights and may slide the third dot and move it higher up so that the color correction is only receiving the highest brightness.

The ranges can be edited so that the operator can edit, only extremely bright highlights on a scene with a lot of very bright flares, that may only occur in the 95-100% range of all brightnesses in the scene. To achieve this the operator can select the "Highlights" mode, and then dial the third slider to 0.95 and leave the final slider at 1.0, so as creating a range from 95%-100% for the final "highlights" section to act upon. Then, when editing Offset, Gamma, Gain, and other controls on the panel, with Highlights buttons selected on 2468, those controls will only edit the 'top 5% bright colors' in the scene.

The region slider 2470 allows the operator to target a specific section of the scene as opposed to the whole scene as a whole. For example, the operator wants to edit only the brightness or darkness of scene. The operator may want to turn the gain down for the scene or just reduce the highlights in the scenes. Therefore, the region slider 2470 acts like a filter on all of the color correction tools. It can affect all the color wheels as well as that saturation and contrast controls that are below it.

The operator can adjust the exposure slider 2472 to adjust the exposure of the selected region.

The operator can adjust the saturation slider 2474 to adjust the saturation of the selected region.

The operator can adjust the contrast slider 2476 to adjust the contrast of the selected region.

The all projectors button 2478 applies the color correction to all projectors. The all cameras button 2480 applies the correction to all camera. The place button switches the user interface to the placement tab. The reset button 2484 removes all color corrections for the selected object. The max value 2486 sets a maximum value for the range of the exposure slider, should the operators want to push the output values over the standard range.

Figure 25:
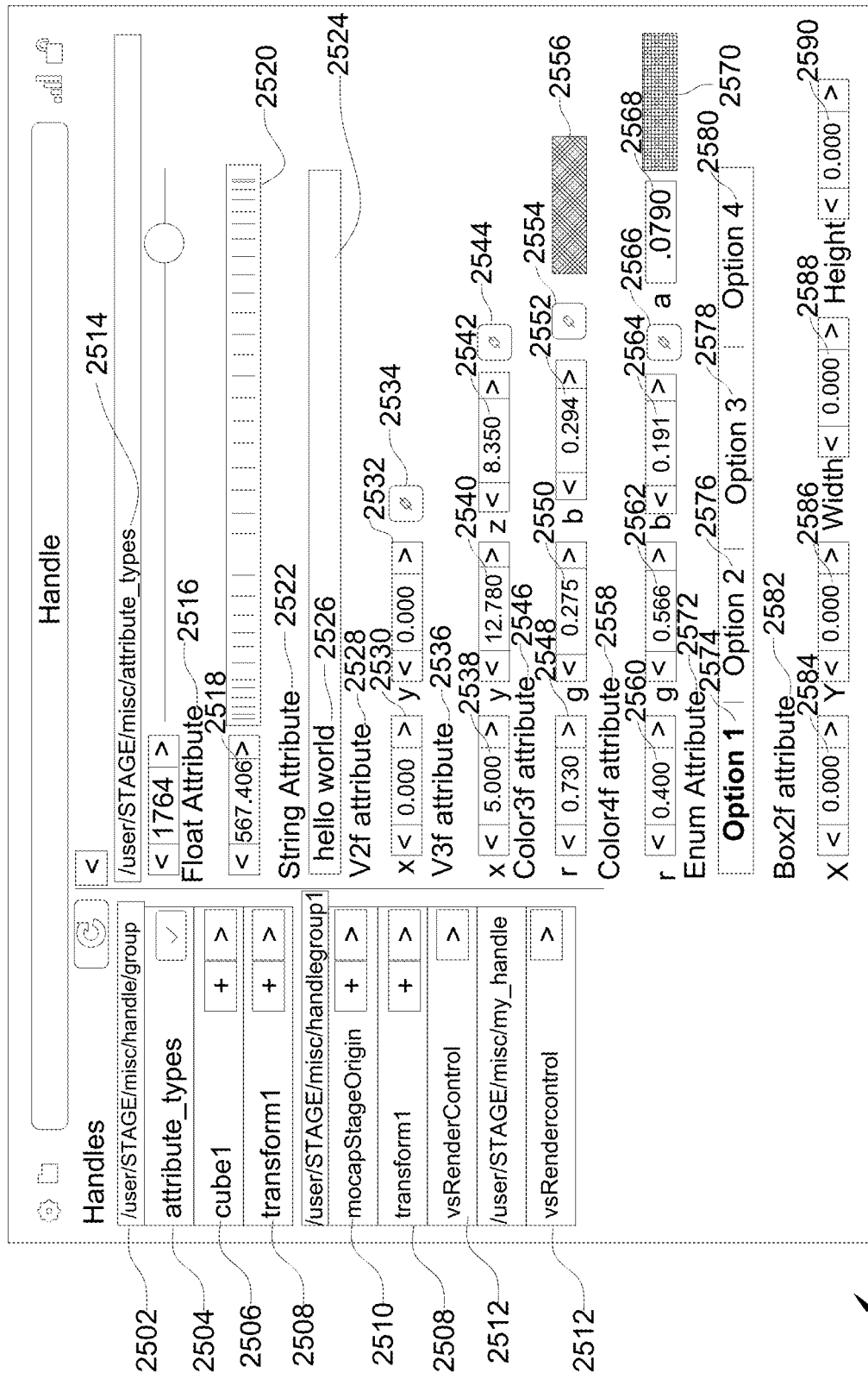
FIG. 25 illustrates a first exemplary handles panel according to various aspects of the disclosure.

FIG. 25 illustrates a first exemplary handles panel 2500. The handles panel 2500 allows an operator to expose various attributes of virtual objects on any node in the entire virtual scene. By exposing the various attributes the operator is able to modify the attributes of the virtual objects. For example, the virtual object can be a spaceship or a light post that will be illustrated in the virtual environment. The attributes can include a color, a position, an orientation, etc. This allows an operator to select an object from a scene and dynamically adjust various attributes for the object.

The handles panel 2500 allows the operator to store the attributes of a virtual object under a file name 2502. The operator can add or remove various attribute types to the handles panel 2500 that can be adjusted. For example, the cube1 attribute 2506 and the transform1 attribute 2508 are available to be added to the attribute editor under the handles panel 2500.

The attributes can also be assigned to various groups (e.g., handlegroup1). For example, motion capture stage origin (mocapStageOrigin) attribute 2510 and the transform1 attribute 2508, and vsRenderControl attribute 2512 can be assigned to the handlegroup 1. Certain attributes can be assigned to specifically to an operator (e.g., my_handle) or a specific electronic device executing the handles panel 2500. For example, the vsRendercontrol attribute 2512 can also be assigned to the my_handle group.

The selected attributes can be stored using a select filename 2514. The attributes selected and listed in FIG. 25 are merely exemplary and different configurations using different combinations of attributes can be selected.

The float attribute 2516 can be used to control a positioning and formatting of content on a display. The operator can adjust the float attribute 2516 by changing the float value 2518 or using a float slider 2520.

The string attribute 2522 can assign a text value to a virtual object. The operator can adjust the string attribute 2522 using a text box 2524 to enter a text string 2526.

A two-dimensional float vector (V2f) attribute 2528 (e.g., (w, h) or (x, y)) can control adjustment of a two dimensional (2D) positioning of a virtual object. The V2f attribute 2528 can include a V2f x-value 2530 and a V2F y-value 2532. The V2f attribute can include a 2D aspect ratio lock 2534.

A three-dimensional float vector (V3f) attribute 2536 (e.g., x, y, and z) can control adjustment of a three dimensional (3D) positioning of a virtual object. The V3f attribute 2536 can include a V3f x-value 2538, a V3f y-value, a V3f z-value 2542. The V3f attribute can include a 3D aspect ratio lock 2544.

The Color3f attribute 2546 can control adjustment of a color of a virtual object. The Color3f attribute 2546 can include a Color3f red value 2548, a Color3f green value 2550, and a Color3f blue value 2552. The Color3f attribute can include a Color3f lock 2554. The Color3f attribute 2546 can include a color preview pane 2556.

The Color4f attribute 2558 can control adjustment of a color of a virtual object. The Color4f attribute 2558 can include a Color4f red value 2560, a Color4f green value 2562, a Color4f blue value 2564. The Color3f attribute can include a Color4f lock 2566. The Color4f attribute 2558 can include an alpha α-value 2568. The α-value 2568 can refer to an opacity. The Color4f attribute 2558 can include a color preview pane 2570.

The enum attribute 2564 can be selected using the handles panel 2500. An enum type can a distinct value type that declares a set of named constants. The operator can select option-1 2566, option-2 2568, option-3 2570, and option-4 2572 for the enum attribute 2564.

The Box2f attribute 2574 can be selected using the handles panel 2500. The Box2f attribute 2574 can include a Box2f x-value 2576, a Box2f y-value 2578, a Box2f width value 2580, and a Box2f height value 2582.

Figure 26:
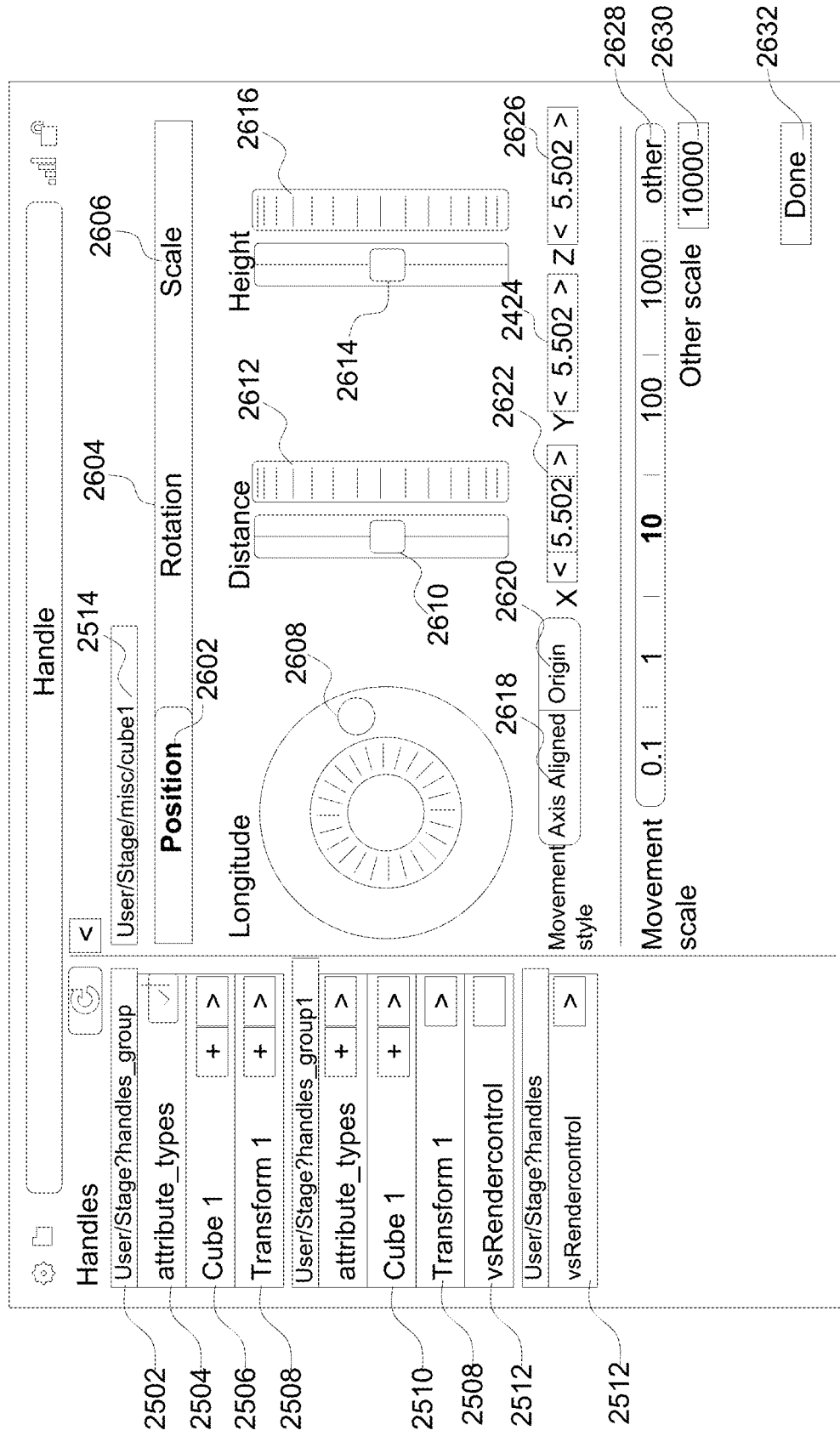
FIG. 26 illustrates a second exemplary handles panel according to various aspects of the disclosure.

FIG. 26 illustrates a second exemplary handles panel 2600.

The handles panel 2600 allows the operator to store the attributes of a virtual object under a file name 2302. The operator can add or remove various attribute types to the handles panel 2300 that can be adjusted. For example, the cube1 attribute 2306 and the transform1 attribute 2308 are available to be added to the attribute editor on the handles panel 2300.

The attributes can also be assigned to various groups (e.g., handlegroup1). For example, motion capture stage origin (mocapStageOrigin) attribute 2310 and the transform) attribute 2308, and vsRenderControl attribute 2312 can be assigned to the handlegroup 1. Certain attributes can be assigned to specifically to an operator (e.g., my_handle) or a specific electronic device executing the handles panel 2300. For example, the vsRendercontrol attribute 2312 can also be assigned to the my_handle group.

The selected attributes can be stored using a select filename 2314. The attributes selected and listed in FIG. 26 are merely exemplary and different configurations using different combinations of attributes can be selected.

The operator can adjust a position 2602, a rotation 2604 and a scale 2606 of the selected virtual object using the second exemplary handles page 2600.

The operator can adjust the position 2602 of the virtual object using the longitude virtual wheel 2608, a distance coarse slider 2610, and a distance fine slider 2612. The operator can adjust the height of the virtual object using the coarse height slider 2614 and the fine height slider 2616.

The operator can select the axis aligned button 2618 to have the movement style of the virtual aligned with the axis. Alternatively, the operator can select the origin button 2620 to have the movement style of the virtual object to be aligned with the origin. The operator can also adjust an x-value 2622, ay-value 2624, and a z-value 2626 for the virtual object.

The operator can select a movement scale 2628 used for the longitude virtual wheel 2608, a distance coarse slider 2610, and a distance fine slider 2612. In various embodiments, the movement scale can be varied from 0.1, 1, 10, 100, 1000 or an operator entered scale value 2630. The operator can select the done button 2632 to apply the changes to the virtual object.

VII. Light Capture Device

In some instances, the mechanism may be a handheld pointing device. The pointing device's orientation and position may be tracked using tracking cameras and/or sensors as it moves. The handheld pointing device may include markers to facilitate said tracking. In some instances, the handheld pointing device may have an activation button or trigger. Upon a user activating the activation button or trigger, the content production system may trigger a specific action in the immersive content production system. The light capture device is more of a positional/remote control-type device, rather than a light measure/light capture device. The light capture device can capture light from the Infrared Mocap System Cameras, but the purpose of that is so that the motion capture system can accurately track the 6DOF (position and rotation) of the light capture device in the real world, and so that the operator can then use that data to perform remote-control/pointer-type actions with the device. In doing so, the content production system can determine a point or region of the immersive cave/wall at which the handheld point device is being aimed or directed. The content production system may, based on this determination, select the point or region of the immersive cave/wall. In other embodiments, the selection procedure may include the immersive cave/wall displaying a reticle (e.g., a crosshair) corresponding to a region and/or point at which the aforementioned mechanisms are currently being directed. In doing so, selection of the region and/or point can be facilitated.

Figure 27:
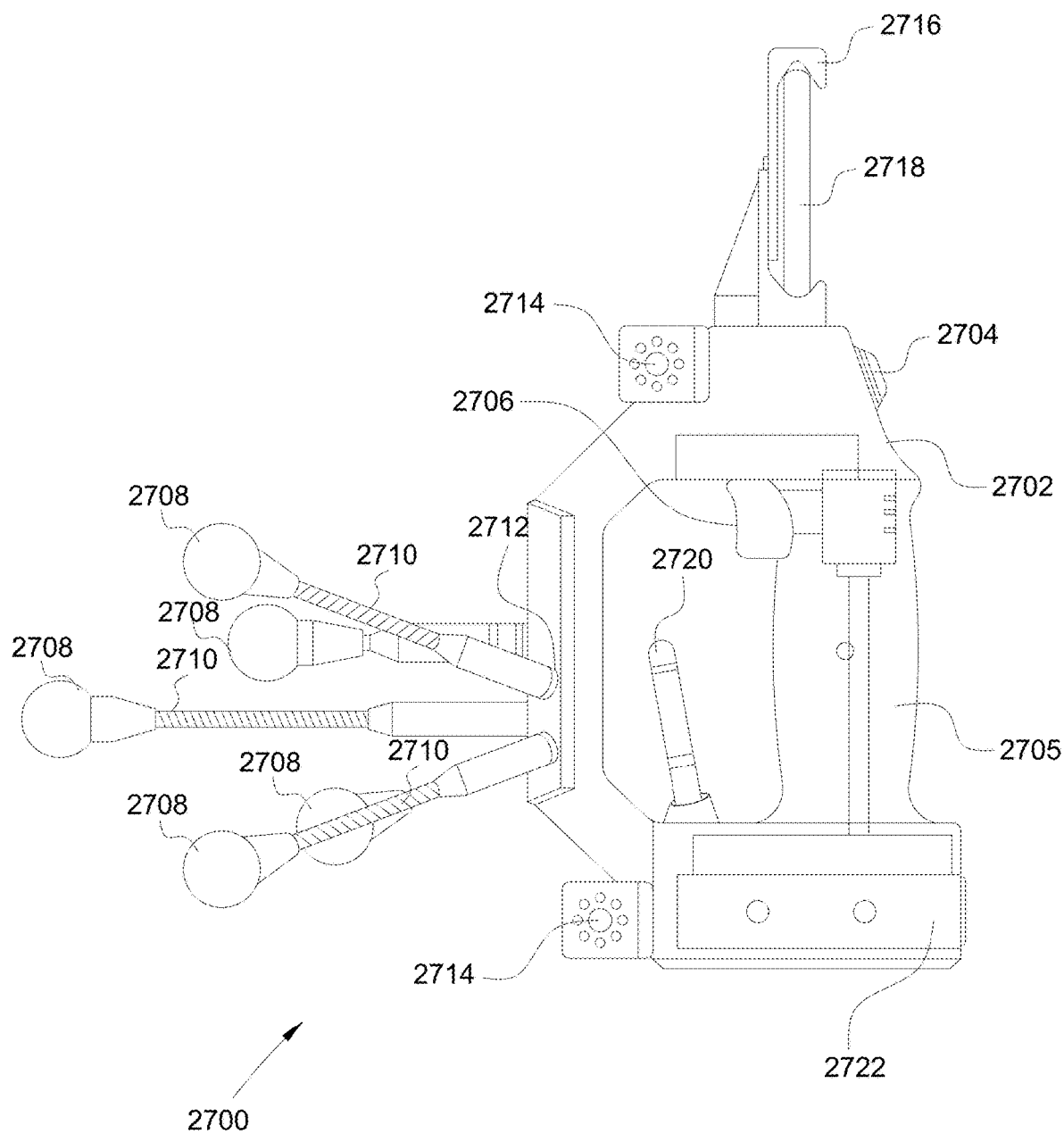
FIG. 27 illustrates a profile view of a light capture device according to various aspects of the disclosure.

FIG. 27 illustrates a profile view of a light capture device 2700. In certain embodiments, a user may use a light measuring device 2700 to determine lighting and color values generated by the displays of the immersive cave/wall. The light measuring device 2500 may provide information regarding the measured light and color values to the content production system. The content production system may thereafter compare the measured values with desired color and light values. The desired values may have been measured at a physical location (i.e., on location) to be represented by the images displayed by the immersive cave/wall. In other embodiments, the desired values may have been input by a user of the content production system. In some embodiments, the content production system may iteratively adjust the lighting and color of the immersive cave/wall in real time or substantially real-time (e.g., at interactive frame rates) until (a) the measured light and color values and (b) the desired color and light values are within a threshold error range. The light capturing device 2700 can include a power source. The power source can be a battery. The battery can be a rechargeable battery. The light capturing device 2700 can include a power connection for receiving power.

The light capturing device 2700 can include a body 2702 that can encase various electronics, sensors, and internal wiring. The body 2702 (e.g., a housing) can include a portion shaped in the form of a grip 2704. The grip 2704 can allow the body 2702 to be held in the hand of a user. The grip 2704 allows for steady control of the light measuring device 2700 and convenient one-handed access of various controls 2704 or a trigger 2706. The controls 2704 can be multi-function buttons mapped to various programmable functions for the immersive content production system. For example, the controls 2704 can be mapped to an on/off switch for a virtual green screen to turn the feature on and off. In various embodiments, the controls can be used to resize a virtual green screen. In various embodiments, animations can be mapped to the controls 2704 and can be triggered by activation. In various embodiments, the trigger 2706 can be programmed for an action (e.g., an animation) to be displayed upon pressing the trigger 2706. In various embodiments, there can be a jog wheel for making adjustments.

The light capturing device 2700 can include a plurality of light sensors 2708 connected to various light sensor arms 2710 that can be affixed to the body 2702 via a plurality of mounts 2712. The light sensors 2708 can be active or passive sensors. The light sensors 2708 can be motion tracker markers. In various embodiments, the light sensors 2708 can be active markers. The light sensors 2708 can be used by the immersive content production system to find the light capturing device 2700 in a given space. The light sensor arms 2710 can extend at various angle and elevations from the body 2702 to enable the light sensors 2708 to capture light at various points around the light capturing device 2700. In various embodiments, the light sensor arms 2710 can include various lengths. In various embodiments, the light sensor arms 2710 can be flexible to enable the light sensor 2708 to be precisely positioned. The configuration of the plurality of light sensors 2708 on the light capturing device 2700 can be known as a crown.

In various embodiments, multiple light capture devices 2700 can be used on the same immersive content production set. In order for the motion tracking system to distinguish between the each of the multiple light capture devices 2700, a distinguishable or unique crown can be used for each of the multiple light capture devices 2700. In various embodiments, the predetermined configuration can include a first light marker mounted to a first sensor arm that is mounted perpendicular to the handgrip on an opposite side of the housing. The predetermined configuration can include a plurality of additional markers arms with additional markers mounted thereon. The additional sensor arms can be mounted to the opposite side of the housing of the handgrip. The additional markers can be mounted at distinct angles above and below the first sensor arm. The additional markers can be distributed in a distinct pattern.

The light capture device 2700 can include various universal mounts 2714. The universal mounts 2714 can enable various modules to be coupled with the light capturing device 2700. In additional, the universal mounts 2714 allow for different placement for mounting the plurality of light sensors 2708.

The light capture device 2700 can include an electronic device mount 2716 for removably coupling an electronic device 2718 (e.g., a smartphone). The electronic device 2718 can execute one or more applications for positioning the light measurement device 2700.

The light capture device 2700 can include one or more antenna 2720. The antenna 2720 can wirelessly communicate data back to a control system (e.g., StageCraft) using any wireless protocol (e.g., Bluetooth, Wi-Fi, etc.). The data can be sent to a portion of the immersive content system that tracks the one or more cameras in the immersive content production system (e.g., WVCAM). The data can include the position of the light capture device 2700. The antenna 2720 can be connected with a transmitter (not shown). In some embodiments, the antenna 2720 can be connected with a transceiver. In various embodiments, the light capture device 2700 can include a controller 2722. The controller 2722 can include a circuit enclosed by the body (or housing). The circuit can include one or more processors, one or more memories, a transmitter, and a bus. In various embodiments, the controller 2722 can be an Arduino microcontroller based platform. The controller 2722 can receive inputs from the controls 2704 or the trigger 2706.

The light capture device 2700 has multiple use cases. In one use case, the light capture device 2700 can be used to draw the frustum of the taking camera. The light capture device 2700 can simulate a position of a camera and the MOCAP system can draw a position of the frustum for that camera. This can be called "painting the frustum."

Other use cases of the light capture device 2700 can include use for virtual green screens. Actors can be performing on screen and the device can ensure that there is a green screen around certain features of actors or costumes. The light capture device 2700 can be used to draw the green screen behind the actors to help replace part of the background.

Other use cases for the light capture device 2700 can include placement of virtual stage lights. The light capture device can point in a direction where virtual stage lights are desired and the position and orientation can be sent from the light capture device 2700 to the immersive content production system.

The light capture device 2700 cane be used as a virtual pointer to highlight 3D points or 3D geometries (characters, set pieces) in a scene. The virtual pointer to can be triggered on certain objects in the scene. The orientation for the light capture device 2700 can be determined using the motion capture system.

The light capture device 2700 can be battery powered (e.g., one or more rechargeable batteries). The light capture device 2700 can include a direct current input as well.

Figure 28:
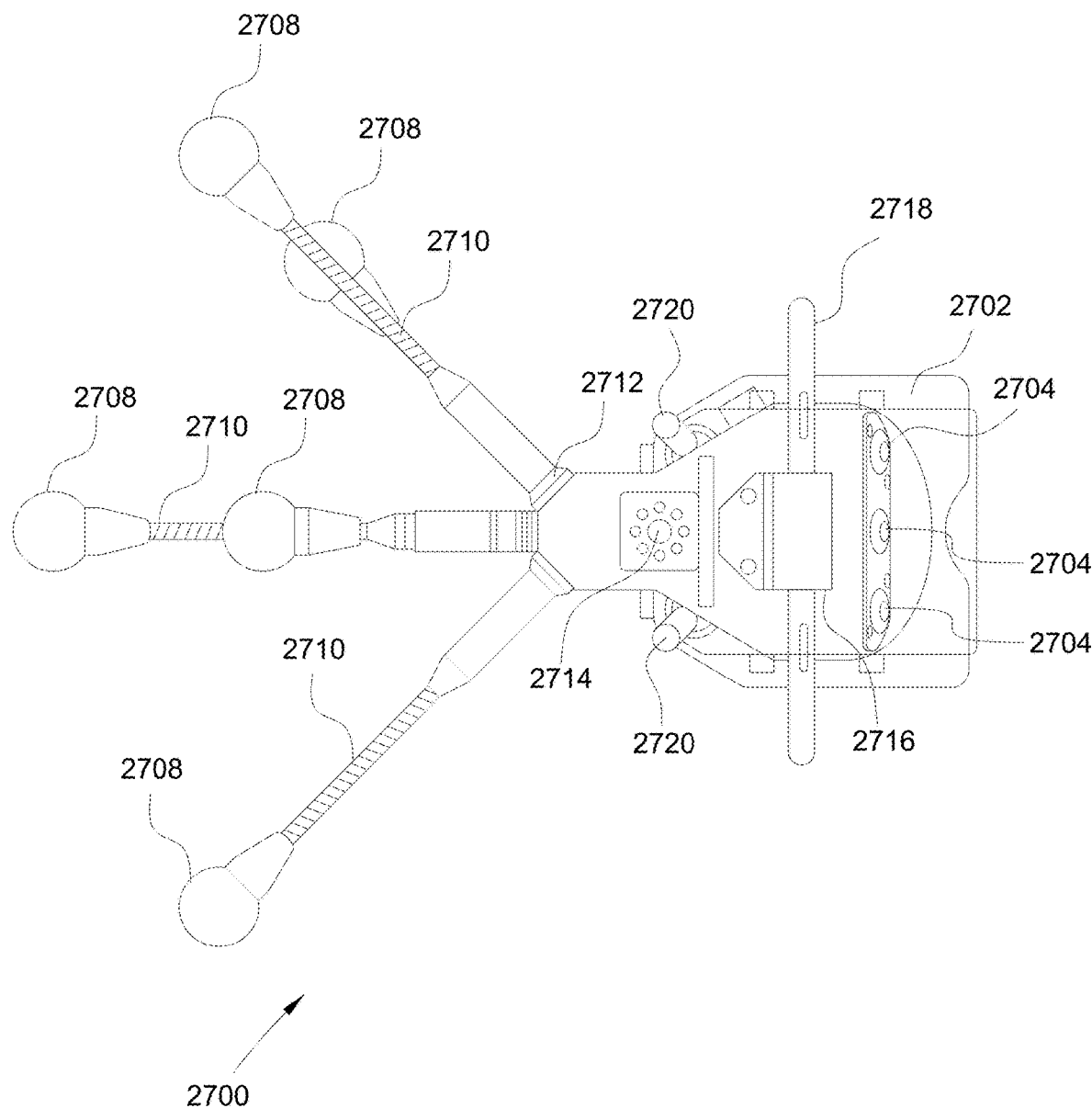
FIG. 28 illustrates a top view of the light capture device according to various aspects of the disclosure.

FIG. 28 illustrates a top view of the light capture device 2700 that illustrates a body 2702, the controls 2704, the plurality of light sensors 2708 connected to various light sensor arms 2710 that can be affixed to the body 2702 via the plurality of mounts 2712. FIG. 28 also illustrates the universal mount 2714, the electronic device mount 2716 and the electronic device 2718. FIG. 28 also illustrates various antenna 2720.

Figure 29:
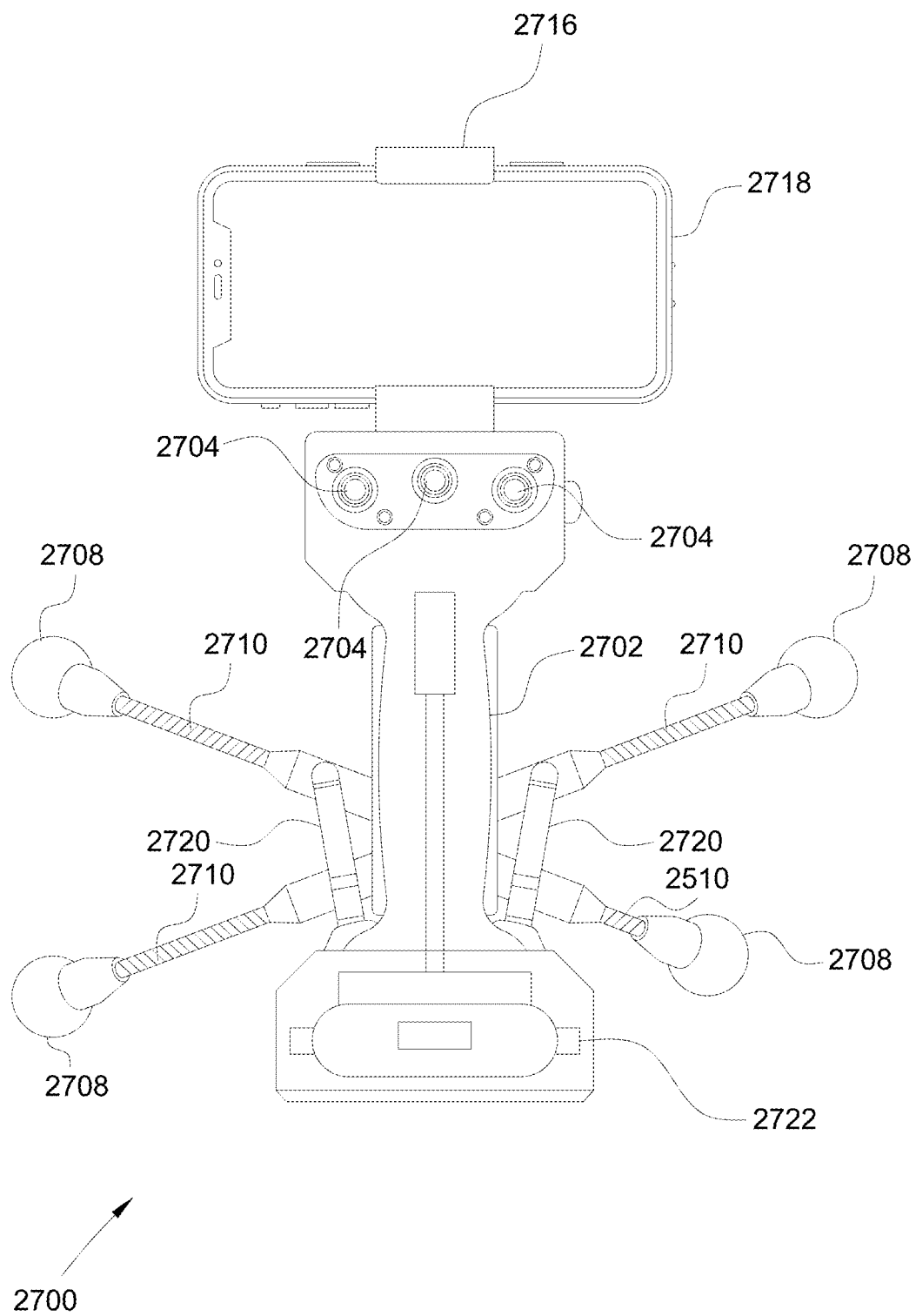
FIG. 29 illustrates a front view of the light capture device according to various aspects of the disclosure.

FIG. 29 illustrates a front view of the light capture device 2700 that illustrates a body 2702, the controls 2704, the plurality of light sensors 2708 connected to various light sensor arms 2710 that can be affixed to the body 2702. FIG. 29 also illustrates the electronic device mount 2716 and the display of the electronic device 2718. FIG. 29 also illustrates various antenna 2720 and the controller 2722.

Figure 30:
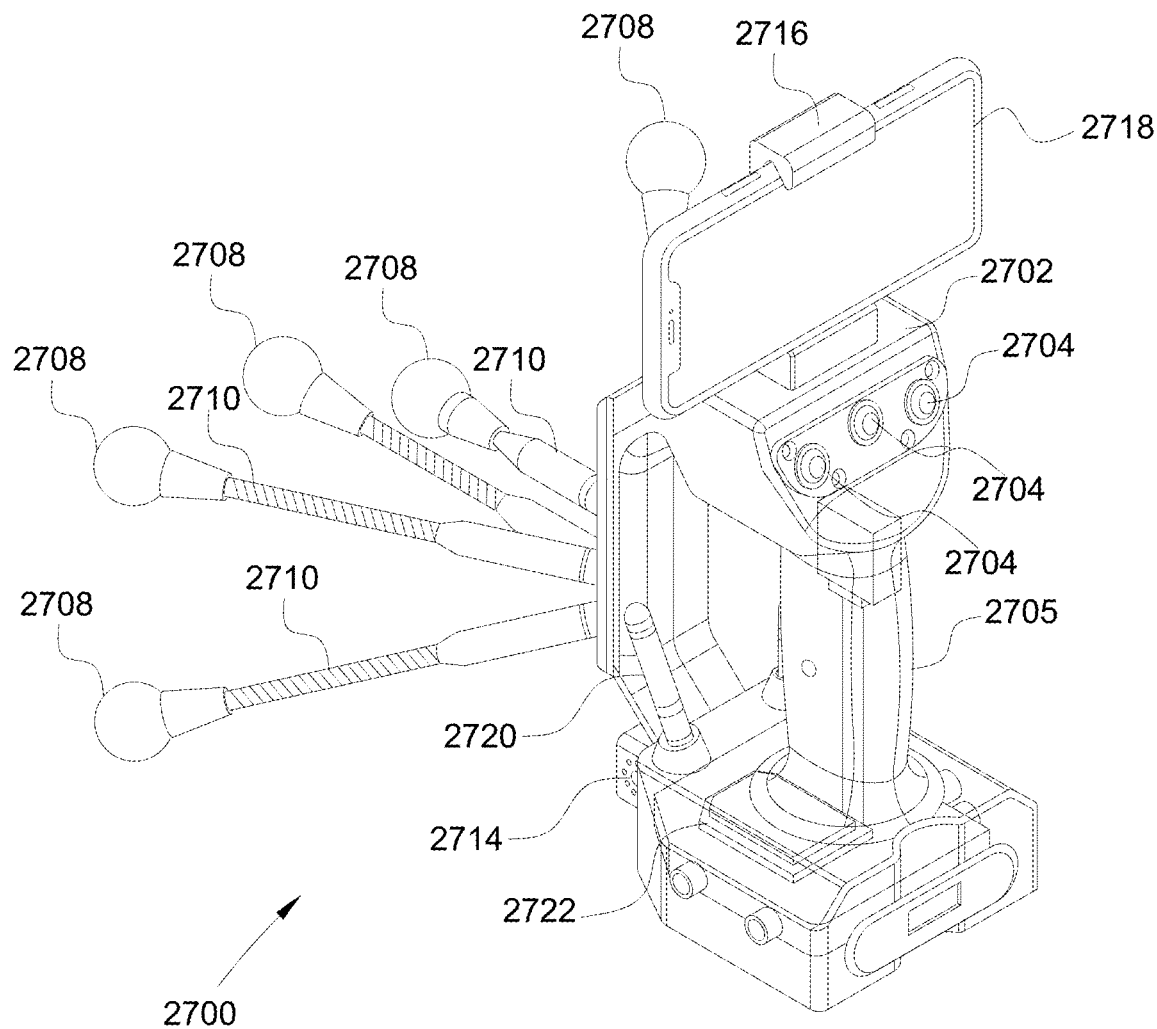
FIG. 30 illustrates a profile view of the light capture device according to various aspects of the disclosure.

FIG. 30 illustrates a profile view of the light capture device 2700 that illustrates a body 2702, the controls 2704, the handle 2705, the plurality of light sensors 2708 connected to various light sensor arms 2710 that can be affixed to the body 2702. FIG. 30 also illustrates the universal mount 2714, the electronic device mount 2716 and the display of the electronic device 2718. FIG. 28 also illustrates various antenna 2720 and the controller 2722.

VIII. Computing Device

Figure 31:
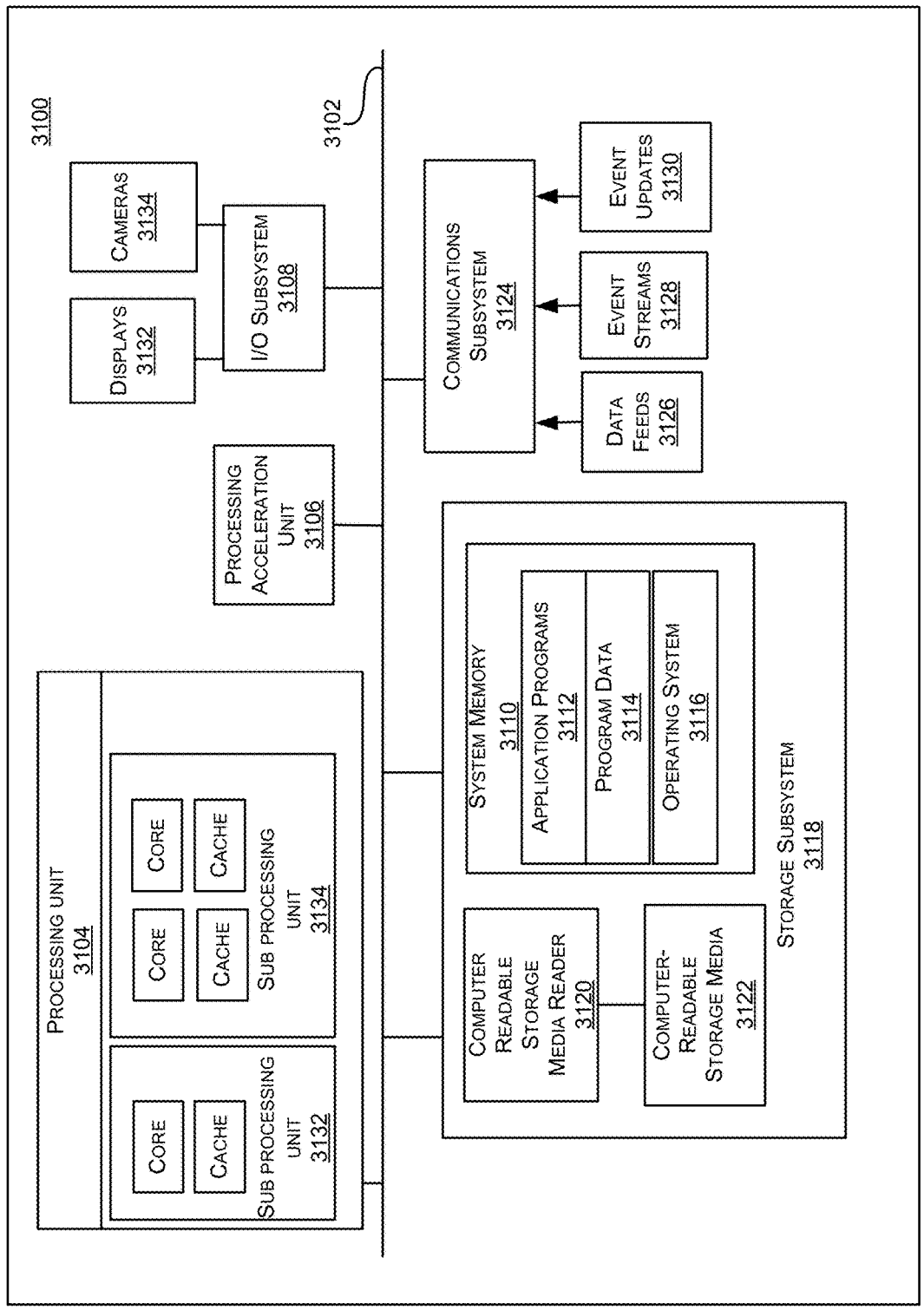
FIG. 31 illustrates a simplified block diagram of an immersive content production system according to some embodiments.

Each of the embodiments disclosed herein can be implemented in a special-purpose computer system. FIG. 31 illustrates a computer system 3100, in which various embodiments described herein can be implemented. The system 3100 can be used to implement any of the computer systems described above. As shown in the figure, computer system 3100 includes a processing unit 2904 that communicates with a number of peripheral subsystems via a bus subsystem 3102. These peripheral subsystems can include a processing acceleration unit 3106, an I/O subsystem 3108, a storage subsystem 3118, and a communications subsystem 3124. Storage subsystem 3118 includes tangible computer-readable storage media 3122 and a system memory 3110.

Bus subsystem 3102 provides a mechanism for letting the various components and subsystems of computer system 3100 communicate with each other as intended. Although bus subsystem 3102 is shown schematically as a single bus, alternative embodiments of the bus subsystem can utilize multiple buses. Bus subsystem 3102 can be any of several types of bus structures including a memory bus or memory controller, a peripheral bus, and a local bus using any of a variety of bus architectures. For example, such architectures can include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 3104, which can be implemented as one or more integrated circuits (e.g., a conventional microprocessor or microcontroller), controls the operation of computer system 3100. One or more processors can be included in processing unit 3104. These processors can include single core or multicore processors. In certain embodiments, processing unit 3104 can be implemented as one or more independent processing units 3132 and/or sub processing unit 3134 with single or multicore processors included in each processing unit. In other embodiments, processing unit 3104 can also be implemented as a quad-core processing unit formed by integrating two dual-core processors into a single chip.

In various embodiments, processing unit 3104 can execute a variety of programs in response to program code and can maintain multiple concurrently executing programs or processes. At any given time, some or all of the program code to be executed can be resident in processor(s) 3104 and/or in storage subsystem 3118. Through suitable programming, processor(s) 3104 can provide various functionalities described above. Computer system 3100 can additionally include a processing acceleration unit 3106, which can include a digital signal processor (DSP), a special-purpose processor, and/or the like. And, in some embodiments, the processing unit or another component of system 3100 can include and/or operate a real-time gaming engine or other similar real-time rendering engine. Such an engine can render two-dimensional (2D) images from 3D data at interactive frame rates (e.g., 24, 48, 72, 96, or more frames per second). In one aspect, the real-time gaming engine can load the virtual environment for display on the displays surrounding the performance area. In some embodiments, the real-time gaming engine can load virtual assets into the virtual environment. The real-time gaming engine can then permit the virtual assets to interact or move according to simulated physics information stored by the real-time gaming engine. The real-time gaming engine can also update the virtual environment based on the movement and orientation of the taking camera(s).

I/O subsystem 3108 can include user interface input devices and user interface output devices. User interface input devices can include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices can include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices can also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices can include voice recognition sensing devices that enable users to interact with voice recognition systems (e.g., Siri® navigator), through voice commands. In some embodiments, the user interface devices enable an operator to provide input indicating the types of virtual assets and/or effects to be integrated into the virtual environment displayed during the performance. The operator can also indicate the particular configurations or trigger movements of the performer and/or physical objects in the performance area that are to be used to begin the loading and presentation of certain virtual assets. In some embodiments, the input received from the operator can occur in real-time and/or concurrently with a performance The system 3100 can include one or more displays 3132. The displays 3132 can be the displays 104 depicted in FIG. 1. The displays 3132 can form an enclosed performance area. In some embodiments, the displays 3132 can be formed from multiple light emitting diode (LED) panels. In some embodiments, the displays 3132 can be formed via multiple liquid crystal display (LCD) panels or thin-film transistor liquid-crystal display (TFT LCD) panels.

The system 3100 can include one or more cameras 3134. The one or more cameras can be digital cameras. Digital cinematography captures motion pictures digitally in a process analogous to digital photography. Professional cameras can include the Sony CineAlta(F) Series, Blackmagic Cinema Camera, RED ONE, Arriflex D-20, D-21 and Alexa, Panavisions Genesis, Silicon Imaging SI-2K, Thomson Viper, Vision Research Phantom, IMAX 3D camera based on two Vision Research Phantom cores, Weisscam HS-1 and HS-2, GS Vitec noX, and the Fusion Camera System. Digital cinematography cameras can capture images using complementary metal-oxide semiconductor (CMOS) or charge coupled device (CCD) sensors, usually in one of two arrangements. Single chip cameras that are designed specifically for the digital cinematography market often use a single sensor (much like digital photo cameras), with dimensions similar in size to a 16 or 35 mm film frame or even (as with the Vision 65) a 65 mm film frame. An image can be projected onto a single large sensor exactly the same way it can be projected onto a film frame, so cameras with this design can be made with positive lock (PL), Panavision (PV) and similar mounts, in order to use the wide range of existing high-end cinematography lenses available. Their large sensors also let these cameras achieve the same shallow depth of field as 35 or 65 mm motion picture film cameras, which many cinematographers consider an essential visual tool.

Unlike other video formats, which are specified in terms of vertical resolution (for example, 1080p, which is 1920×1080 pixels), digital cinema formats are usually specified in terms of horizontal resolution. As a shorthand, these resolutions are often given in "nK" notation, where n is the multiplier of 3124 such that the horizontal resolution of a corresponding full-aperture, digitized film frame is exactly 1024n pixels.

For instance, a 2K image is 2048 pixels wide, and a 4K image is 4096 pixels wide. Vertical resolutions vary with aspect ratios though; so a 2K image with an HDTV (16:9) aspect ratio is 2048×1152 pixels, while a 2K image with a standard definition television (SDTV) or Academy ratio (4:3) is 2048×1536 pixels, and one with a Panavision ratio (2.39:1) would be 2048×856 pixels, and so on. Due to the "nK" notation not corresponding to specific horizontal resolutions per format a 2K image lacking, for example, the typical 35 mm film soundtrack space, is only 1828 pixels wide, with vertical resolutions rescaling accordingly.

All formats designed for digital cinematography are progressive scan, and capture usually occurs at the same 24 frame per second rate established as the standard for 35 mm film. Some films have a High Frame Rate of 48 fps, although most traditional theaters use 24 fps. The DCI standard for cinema usually relies on a 1.89:1 aspect ratio, thus defining the maximum container size for 4K as 4096×2160 pixels and for 2K as 2048×1080 pixels.

Broadly, several workflow paradigms can be used for data acquisition and storage in digital cinematography. With video-tape-based workflow, video is recorded to tape on set. This video is then ingested into a computer running non-linear editing software, using a deck. Upon ingestion, a digital video stream from tape is converted to computer files. These files can be edited directly or converted to an intermediate format for editing. Then video is output in its final format, possibly to a film recorder for theatrical exhibition, or back to video tape for broadcast use. Original video tapes are kept as an archival medium. The files generated by the non-linear editing application contain the information necessary to retrieve footage from the proper tapes, should the footage stored on the computer's hard disk be lost. With increasing convenience of file-based workflows, the tape-based workflows have become marginal in recent years.

Digital cinematography can use tapeless or file-based workflows. This trend has accelerated with increased capacity and reduced cost of non-linear storage solutions such as hard disk drives, optical discs, and solid-state memory. With tapeless workflows digital video is recorded as digital files onto random-access media like optical discs, hard disk drives or flash memory-based digital magazines. These files can be easily copied to another storage device, typically to a large RAID (array of computer disks) connected to an editing system. Once data is copied from the on-set media to the storage array, they are erased and returned to the set for more shooting.

Such RAID arrays, both of managed (for example, storage area networks (SANs) and networked attached storage (NASs) and unmanaged (for example, just a bunch of disks (JBoDs) on a single computer workstation), are necessary due to the throughput required for real-time (320 Megabits per second for 2K @ 24 frames per second) or near-real-time playback in post-production, compared to throughput available from a single, yet fast, hard disk drive. Such requirements are often termed as on-line or cloud storage. Post-production not requiring real-time playback performances (typically for lettering, subtitling, versioning and other similar visual effects) can be migrated to slightly slower RAID stores.

Short-term archiving, if ever, is accomplished by moving the digital files into slower redundant array of independent disks (RAID) arrays (still of either managed or unmanaged type, but with lower performances), where playback capability is poor to non-existent (unless via proxy images), but minimal editing and metadata harvesting still feasible. Such intermediate requirements easily fall into the mid-line storage category.

Long-term archiving is accomplished by backing up the digital files from the RAID, using standard practices and equipment for data backup from the information technology industry, often to data tapes (like linear tape open (LTOs)).

The system can include one or more spherical cameras. A spherical camera can be called an omnidirectional camera, also known as 360-degree camera, is a camera having a field of view that covers approximately the entire sphere or at least a full circle in the horizontal plane. 360-degree videos, also known as immersive videos, or spherical videos, are video recordings where a view in every direction is recorded at the same time, shot using an omnidirectional camera or a collection of cameras. During playback on normal flat display the viewer has control of the viewing direction like a panorama. It can also be played on a displays or projectors arranged in a sphere or some part of a sphere.

360-degree video is typically recorded using either a special rig of multiple cameras, or using a dedicated camera that contains multiple camera lenses embedded into the device, and filming overlapping angles simultaneously. Through a method known as video stitching, this separate footage is merged into one spherical video piece, and the color and contrast of each shot is calibrated to be consistent with the others. This process is done either by the camera itself, or using specialized software that can analyze common visuals and audio to synchronize and link the different camera feeds together. Generally, the only area that cannot be viewed is the view toward the camera support.

360-degree video is typically formatted in an equi-rectangular projection and is either monoscopic, with one image directed to both eyes, or stereoscopic, viewed as two distinct images directed individually to each eye for a 3D effect. Due to this projection and stitching, equi-rectangular video exhibits a lower quality in the middle of the image than at the top and bottom.

Specialized omnidirectional cameras and rigs have been developed for the purpose of filming 360-degree video, including rigs such as GoPro's Omni and Odyssey (which consist of multiple action cameras installed within a frame), and contained cameras like the HumanEyes Vuze and Nokia OZO, There have also been handheld dual-lens cameras such as the Ricoh Theta S, Samsung Gear 360, Garmin VIRB 360, and the Kogeto Dot 360—a panoramic camera lens accessory developed for the iPhone 4, 4S, and Samsung Galaxy Nexus.

User interface input devices can also include, without limitation, three dimensional (3-D) mice, joysticks or pointing sticks, gamepads and graphic tablets, and audio/visual devices such as speakers, digital cameras, digital camcorders, portable media players, webcams, image scanners, fingerprint scanners, barcode reader 3-D scanners, 3-D printers, laser rangefinders, and eye gaze monitoring devices. Additionally, user interface input devices can include, for example, medical imaging input devices such as computed tomography, magnetic resonance imaging, position emission tomography, medical ultrasonography devices. User interface input devices can also include, for example, audio input devices such as MIDI keyboards, digital musical instruments and the like.

User interface output devices can include a display subsystem, indicator lights, or non-visual displays such as audio output devices, etc. The display subsystem can be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 3100 to a user or other computer. For example, user interface output devices can include, without limitation, a variety of display devices that visually convey text, graphics and audio/video information such as monitors, printers, speakers, headphones, automotive navigation systems, plotters, voice output devices, and modems.

Computer system 3100 can comprise a storage subsystem 3118 that comprises software elements, shown as being currently located within a system memory 3110. System memory 3110 can store program instructions that are loadable and executable on processing unit 3104, as well as data generated during the execution of these programs.

Depending on the configuration and type of computer system 3100, system memory 3110 can be volatile (such as random access memory (RAM)) and/or non-volatile (such as read-only memory (ROM), flash memory, etc.) The RAM typically contains data and/or program modules that are immediately accessible to and/or presently being operated and executed by processing unit 3104. In some implementations, system memory 3110 can include multiple different types of memory, such as static random access memory (SRAM) or dynamic random access memory (DRAM). In some implementations, a basic input/output system (BIOS), containing the basic routines that help to transfer information between elements within computer system 3100, such as during start-up, can typically be stored in the ROM. By way of example, and not limitation, system memory 3110 also illustrates application programs 3112, which can include client applications, web browsers, mid-tier applications, relational database management systems (RDBMS), etc., program data 3114, and an operating system 3116. By way of example, operating system 3116 can include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 3118 can also provide a tangible computer-readable storage medium for storing the basic programming and data constructs that provide the functionality of some embodiments. Software (programs, code modules, instructions) that when executed by a processor provide the functionality described above can be stored in storage subsystem 3118. These software modules or instructions can be executed by processing unit 3104. Storage subsystem 3118 can also provide a repository for storing data used in accordance with the present invention.

Storage subsystem 3100 can also include a computer-readable storage media reader 3120 that can further be connected to computer-readable storage media 3122. Together and, optionally, in combination with system memory 3110, computer-readable storage media 3122 can comprehensively represent remote, local, fixed, and/or removable storage devices plus storage media for temporarily and/or more permanently containing, storing, transmitting, and retrieving computer-readable information.

Computer-readable storage media 3122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 3100.

By way of example, computer-readable storage media 3122 can include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 3122 can include, but is not limited to, Zip® drives, flash memory cards, universal serial bus (USB) flash drives, secure digital (SD) cards, DVD disks, digital video tape, and the like. Computer-readable storage media 3122 can also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media can provide non-volatile storage of computer-readable instructions, data structures, program modules, and other data for computer system 3100.

Communications subsystem 3124 provides an interface to other computer systems and networks. Communications subsystem 3124 serves as an interface for receiving data from and transmitting data to other systems from computer system 3100. For example, communications subsystem 3124 can enable computer system 3100 to connect to one or more devices via the Internet. In some embodiments communications subsystem 3124 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components. In some embodiments communications subsystem 3124 can provide wired network connectivity (e.g., Ethernet) in addition to or instead of a wireless interface.

In some embodiments, communications subsystem 3124 can also receive input communication in the form of structured and/or unstructured data feeds 3126, event streams 3128, event updates 3130, and the like on behalf of one or more users who can use computer system 3100.

By way of example, communications subsystem 3124 can be configured to receive data feeds 3126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 3124 can also be configured to receive data in the form of continuous data streams, which can include event streams 3128 of real-time events and/or event updates 3130, that can be continuous or unbounded in nature with no explicit end. Examples of applications that generate continuous data can include, for example, sensor data applications, financial tickers, network performance measuring tools (e.g. network monitoring and traffic management applications), clickstream analysis tools, automobile traffic monitoring, and the like.

Communications subsystem 3124 can also be configured to output the structured and/or unstructured data feeds 3126, event streams 3128, event updates 3130, and the like to one or more databases that can be in communication with one or more streaming data source computers coupled to computer system 3100.

Computer system 3100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 3100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, can be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention can be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes can be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments can be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations can be re-arranged. A process is terminated when its operations are completed, but could have additional steps not included in a figure. A process can correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc., can be passed, forwarded, or transmitted via any suitable means including memory sharing, message passing, token passing, network transmission, etc.

Furthermore, embodiments can be implemented by hardware, software, firmware, middleware, microcode, hardware description languages, or any combination thereof. When implemented in software, firmware, middleware or microcode, the program code or code segments to perform the necessary tasks can be stored in a machine readable medium. A processor(s) can perform the necessary tasks.

In the foregoing specification, aspects of the invention are described with reference to specific embodiments thereof, but those skilled in the art will recognize that the invention is not limited thereto. Various features and aspects of the above-described invention can be used individually or jointly. Further, embodiments can be utilized in any number of environments and applications beyond those described herein without departing from the broader spirit and scope of the specification. The specification and drawings are, accordingly, to be regarded as illustrative rather than restrictive.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes can be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments can be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations can be re-arranged. A process is terminated when its operations are completed, but could have additional steps not included in a figure. A process can correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc., can be passed, forwarded, or transmitted via any suitable means including memory sharing, message passing, token passing, network transmission, etc.

Furthermore, embodiments can be implemented by hardware, software, firmware, middleware, microcode, hardware description languages, or any combination thereof. When implemented in software, firmware, middleware or microcode, the program code or code segments to perform the necessary tasks can be stored in a machine-readable medium. A processor(s) can perform the necessary tasks.

In the foregoing specification, aspects of the invention are described with reference to specific embodiments thereof, but those skilled in the art will recognize that the invention is not limited thereto. Various features and aspects of the above-described invention can be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method of generating a graphical user interface performed by a processor, the method comprising:
   generating a first set of user interface elements configured to receive a first selection of an offset value for adjusting a color of a virtual object;
   generating a second set of user interface elements configured to receive a second selection of a gamma value for adjusting the color of the virtual object;
   generating a third set of user interface elements configured to receive a third selection of a gain value for adjusting the color of the virtual object; and
   generating a software switch for receiving a selection to enable or disable the offset value, the gamma value, and the gain value adjustments to the color of the virtual object.

2. The method of claim 1, further comprising: generating a fourth set of user interface elements configured to receive a fourth selection of at least one of an exposure, a saturation, and a contrast of the virtual object.

3. The method of claim 1, further comprising: generating a fifth set of user interface elements configured to receive a fifth selection of at least one of a mix, a softness, and a roundness of the virtual object.

4. The method of claim 1, further comprising: generating a plurality of software switches, the plurality of software switches comprising at least one of a bounds switch, an all projectors switch, and an all cameras switch.

5. The method of claim 1, wherein at least one of the first, the second, or the third set of user interface elements comprise at least one of a color wheel, a plurality of Red Green Blue sliders, a plurality of Hue Saturation Value sliders, and a color temperature slider.

6. The method of claim 1, further comprising generating a brightness slider for at least one of the first set of user interface elements, the second set of user interface elements, and the third set of user interface elements.

7. A method of generating a graphical user interface performed by a processor, the method comprising:
   generating a first set of user interface elements configured to receive a first selection of a color of a panosphere;
   generating a second set of user interface elements configured to receive a second selection of a position and an orientation of the panosphere; and
   generating a window containing preview the panosphere.

8. The method of claim 7, further comprising: generating a third set of user interface elements configured to receive a third selection of at least one of an exposure, a saturation, and a contrast of the panosphere.

9. The method of claim 7, wherein the first set of user interface elements configured to receive the first selection of the color for the panosphere comprise at least one of a color wheel, a plurality of Red Green Blue sliders, a plurality of Hue Saturation Value sliders, and a color temperature slider.

10. The method of claim 7, wherein the second set of user interface elements configured to receive the second selection of the position and an orientation of the panosphere comprise at least one of a pan wheel, a tilt wheel, and a height slider.

11. The method of claim 10, further comprising generating a switch to receive a selection to invert movement of direction of at least one of second set of user interface elements for the panosphere.

12. The method of claim 7, further comprising generating a switch to receive a selection for a fade to gray transition effect of the panosphere.

13. The method of claim 7, further comprising generating a software switch for receiving a selection to enable or disable adjustments to the panosphere.

* * * * *